United States Patent [19]
Okamoto et al.

[11] Patent Number: 6,035,156
[45] Date of Patent: Mar. 7, 2000

[54] IMAGE PROCESSING APPARATUS

[75] Inventors: Yuji Okamoto; Shuhji Fujii; Yuji Nakagawa, all of Soraku-gun, Japan

[73] Assignee: Sharp Kabushiki Kaisha, Osaka, Japan

[21] Appl. No.: 09/185,977

[22] Filed: Nov. 3, 1998

[30] Foreign Application Priority Data

| Nov. 6, 1997 | [JP] | Japan | 9-304256 |
| Dec. 17, 1997 | [JP] | Japan | 9-348322 |
| Dec. 19, 1997 | [JP] | Japan | 9-349879 |

[51] Int. Cl.[7] .................................................. G03G 15/00
[52] U.S. Cl. .............................................. 399/82; 399/367
[58] Field of Search ..................... 399/19, 16, 21, 399/75, 82, 83, 85, 86, 87, 362, 367, 368, 370, 371, 373, 374

[56] References Cited

U.S. PATENT DOCUMENTS

| 5,345,302 | 9/1994 | Hamakawa | 399/86 |
| 5,347,351 | 9/1994 | Morita et al. | 399/82 |
| 5,384,633 | 1/1995 | Boyd | 399/87 |
| 5,642,200 | 6/1997 | Kurihara et al. | 399/83 X |
| 5,671,463 | 9/1997 | Morikawa et al. | 399/86 |

FOREIGN PATENT DOCUMENTS 02066586  6/1990  Japan.

Primary Examiner—Sandra Brase
Attorney, Agent, or Firm—David G. Conlin; Richard E. Gamache

[57] ABSTRACT

An image processing apparatus reads and processes images on the documents successively presented to an original image reading section by means of an ADF. The operation of the image processing apparatus is controlled by a control section provided therein. The control section creates a management table for each document for storing processing information related to a document reading action, and manages the documents based on the content of the management tables. Consequently, the image processing apparatus can readily and precisely carry out the recovery when the documents or sheets are jammed.

56 Claims, 41 Drawing Sheets

F I G. 1 0

MANAGEMENT TABLE MARK

|  | MARK | USED WHEN |
|---|---|---|
| VALID | 1 | EXISTENCE OF DOCUMENT IS CONFIRMED |
| INVALID | 2 | DOCUMENT IS CANCELLED BECAUSE OF DOCUMENT JAM |
| UNKNOWN | 0 | EXISTENCE OF DOCUMENT IS UNKNOWN |
| EXPOSURE COMPLETED | 3 | EXPOSURE OF DOCUMENT IS COMPLETED |

| SB1 | LENS STATE | DEACTIVATED | 0 |
|---|---|---|---|
| | | OPERATING | 1 |
| SB2 | REQUEST FOR LENS OPERATION | NO | 0 |
| | | YES | 1 |
| SB3 | SCANNER MODE | FORWARD | 0 1 |
| | | FORWARD & BACKWARD | 1 1 |
| | | BACKWARD | 1 0 |
| SB4 | SCANNER STATE | DEACTIVATED | 0 0 0 |
| | | WARMING UP | 0 0 1 |
| | | FEEDING | 0 1 0 |
| | | RETURNING | 1 1 0 |
| | | HAS RETURNED | 1 0 0 |
| SB5 | COPY LAMP STATE | RISING-UP | 0 |
| | | NORMAL | 1 |
| SB6 | COPY LAMP STATE | OFF | 0 |
| | | ON | 1 |
| SB7 | LAST SCANNING | NO | 0 |
| | | YES | 1 |

FIG. 1 2 (a)

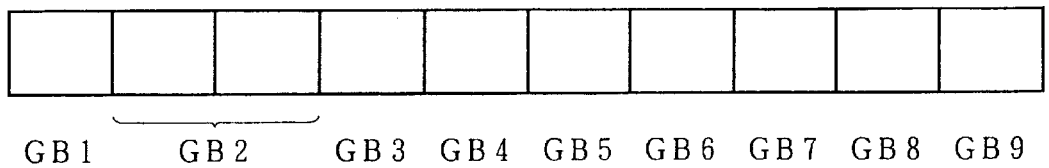

\*1 DOCUMENT MANAGING BIT

| | | | |
|---|---|---|---|
| GB1 | COMPLETION OF DOCUMENT SETTING | OTHER THAN EXPOSING POSITION | 0 |
| | | READY FOR EXPOSURE | 1 |
| GB2 | DOCUMENT POSITION INFORMATION | STAND-BY | 0 0 0 |
| | | PRE-FEEDING #1 IS COMPLETED | 0 0 1 |
| | | PRE-FEEDING #2 IS COMPLETED | 0 1 0 |
| | | FEEDING IS COMPLETED | 0 1 1 |
| | | FLIPPING IS COMPLETED | 1 0 0 |
| | | RELEASING IS COMPLETED | 1 1 0 |
| GB3 | LAST DOCUMENT JUDGMENT | OTHER THAN LAST DOCUMENT | 0 |
| | | LAST DOCUMENT | 1 |
| GB4 | INTERLEAVE MARK | OTHER THAN INTERLEAVE | 0 |
| | | INTERLEAVE | 1 |
| GB5 | JAM DETECTION | YES | 0 |
| | | NO | 1 |
| GB6 | RELEASING | INHIBITED | 0 |
| | | ALLOWED | 1 |
| GB7 | FLIPPING | INHIBITED | 0 |
| | | ALLOWED | 1 |
| GB8 | FEEDING | INHIBITED | 0 |
| | | ALLOWED | 1 |
| GB9 | PRE-FEEDING | INHIBITED | 0 |
| | | ALLOWED | 1 |

FIG. 20

• OC SS/DS MODE  A3R-DOCUMENT  A4-SHEET  100% BOOK COPY

| MANAGEMENT TABLE MARK | SCANNER MANAGEMENT SECTION | | | | | |
|---|---|---|---|---|---|---|
| | | ID | DOCUMENT SIZE | | SCANNER MODE | LAST DOCUMENT |
| VALID | | 0001 | A3R | MAIN | 11 | 1000 | 0 : 01 : 00000 |

| SCANNING REFERENCE POINT | START POSITION | END POSITION | SCANNING MAGNIFICATION |
|---|---|---|---|
| 00 | 0 | 210 | 100 |

| MANAGEMENT TABLE MARK | SCANNER MANAGEMENT SECTION | | | | | |
|---|---|---|---|---|---|---|
| | | ID | DOCUMENT SIZE | | SCANNER MODE | LAST DOCUMENT |
| VALID | | 0002 | A3R | MAIN | 11 | 1000 | 1 : 01 : 00000 |

| SCANNING REFERENCE POINT | START POSITION | END POSITION | SCANNING MAGNIFICATION |
|---|---|---|---|
| 00 | 210 | 420 | 100 |

FIG. 29

· SD MODE (RADF MODE)  6 DOCUMENTS

| MANAGEMENT TABLE MARK | START | END | MAGNIFICATION | ID | DOCUMENT SIZE | | DOCUMENT MANAGING BIT | |
|---|---|---|---|---|---|---|---|---|
| COMPLETED | 0 | 210 | 100 | 0003 | A4 | MAIN | 0 1 1 0 | ← DOCUMENT RELEASING IS COMPLETED |
| VALID | 0 | 210 | 100 | 0004 | A4 | MAIN | 1 0 1 1 | ← RECOVERY POINTER / SCANNER POINTER — DOCUMENT FEEDING IS COMPLETED & DOCUMENT SETTING IS COMPLETED |
| VALID | 0 | 210 | 100 | 0005 | A4 | MAIN | 0 0 1 0 | ← PRE-FEEDING #2 IS COMPLETED |
| UNKNOWN | 0 | 210 | 100 | 0006 | A4 | MAIN | 0 0 0 0 | ← DOCUMENT UPPERMOST STREAM POINTER — STAND-BY |

WHEN TRANSFER SHEET FOR DOCUMENT ID=0003 IS SHORT, EXPOSURE OF MAIN SIDE OF DOCUMENT ID=0003 IS DEEMED AS "INCOMPLETE", THUS 0006-0003=3. AT THIS POINT, MANAGEMENT TABLE MARK IS UPDATED TO "VALID" FROM "COMPLETED", AND RECOVERY POINTER IS RETURNED TO THE TOP "VALID" MANAGEMENT TABLE.

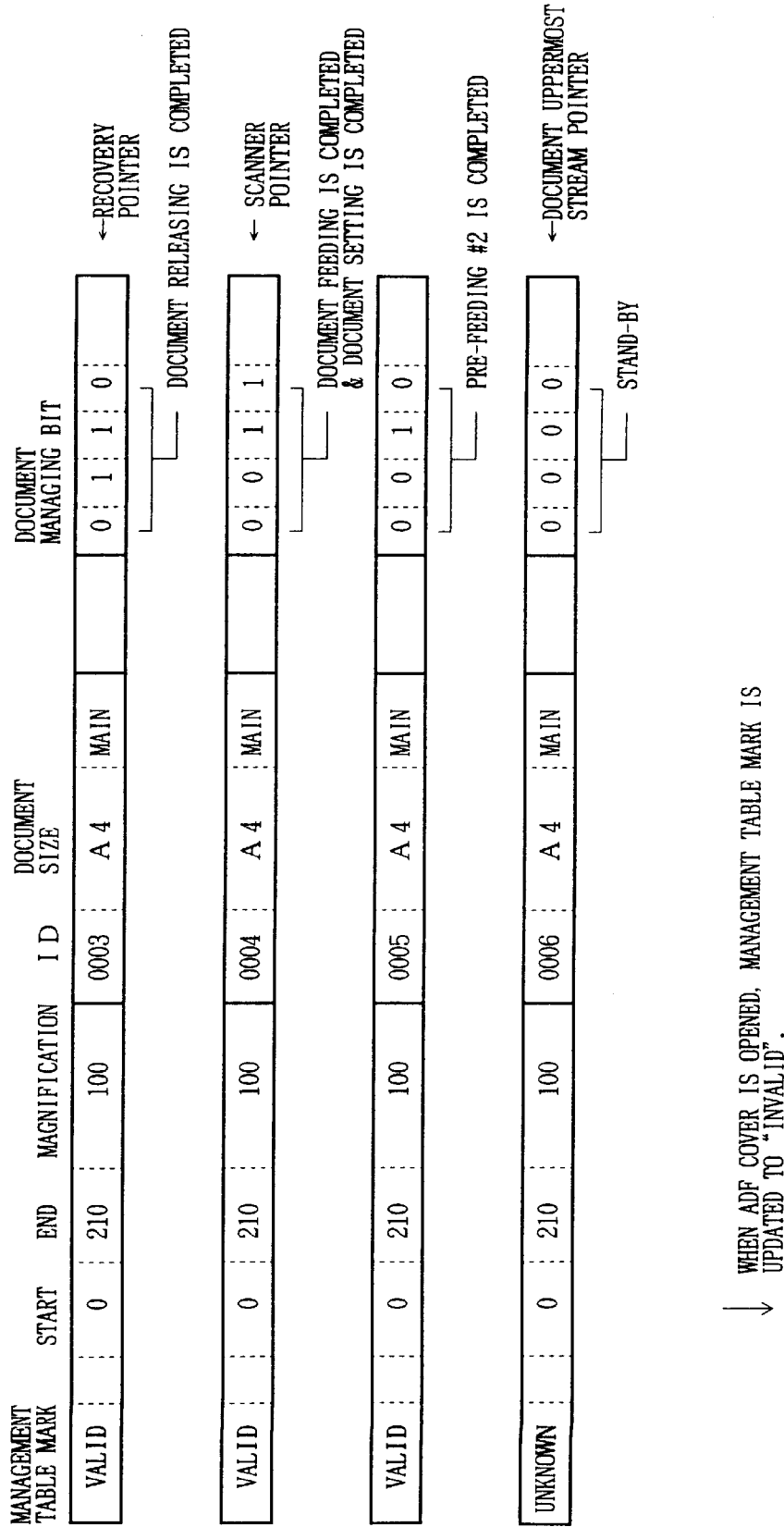

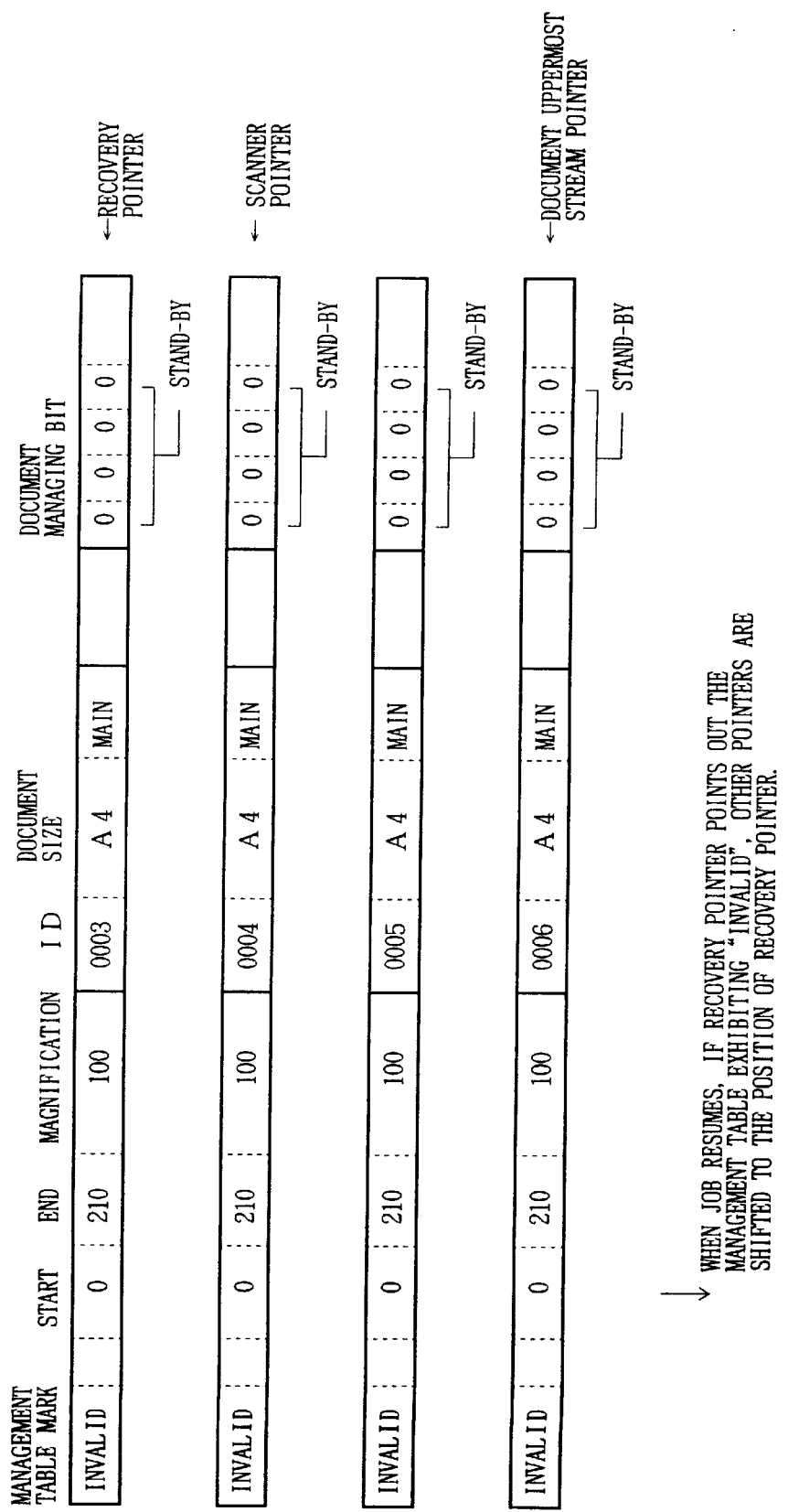

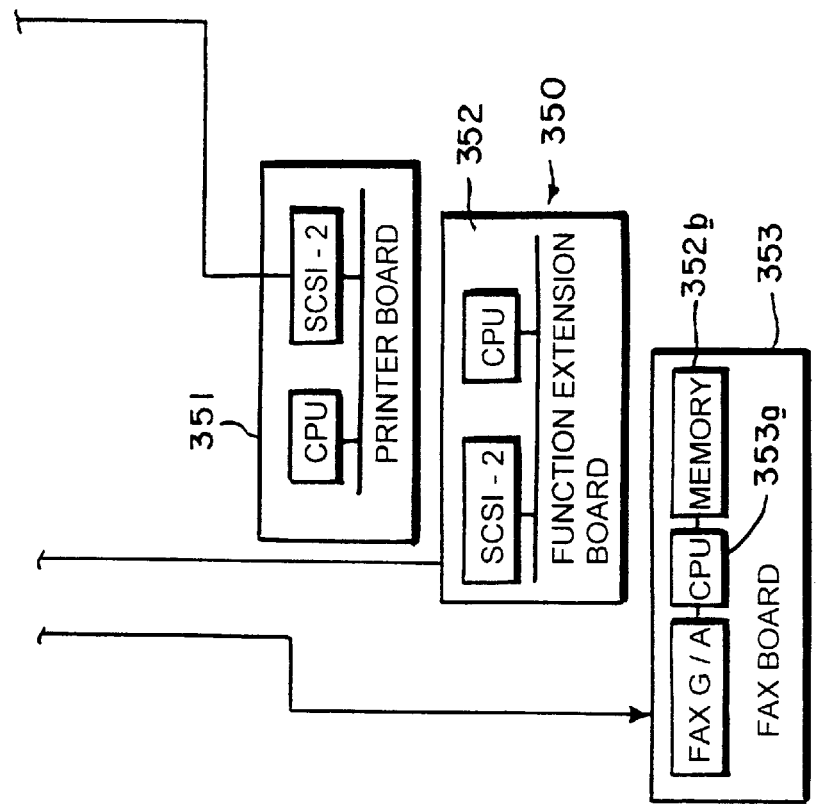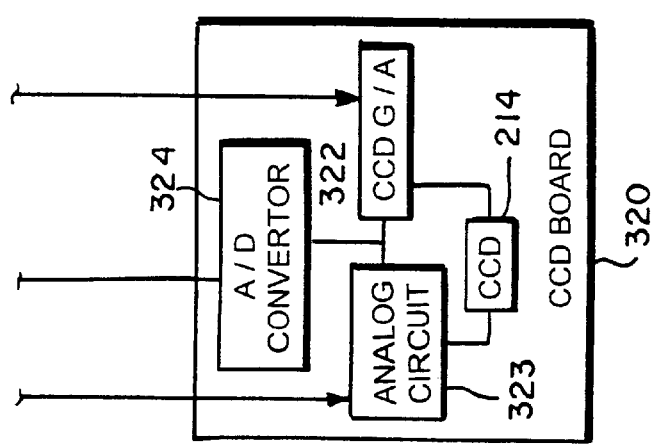
FIG. 35B

FIG.38 (a)

DOCUMENT MANAGEMENT TABLE 700

| | MANAGEMENT TABLE MARK SECTION | SCANNER MANAGEMENT SECTION | DOCUMENT MANAGEMENT SECTION | SCANNER MANAGING BIT | DOCUMENT MANAGING BIT |
|---|---|---|---|---|---|
| 1 | 1 | (FIG.38(c)) | (FIG.38(b)) | | |
| 2 | 0 | | | | |
| 3 | 0 | | | | |
| 48 | | | | | |
| 49 | 0 | | | | |
| 50 | 0 | | | | |
| | 701 | 702 | 703 | 704 | 705 |

FIG.38 (b)

| SCANNER MANAGEMENT SECTION | | DOCUMENT MANAGEMENT SECTION | | SCANNER MANAGING BIT | |
|---|---|---|---|---|---|
| 210mm | 100 | 001 | A4 | | |
| | | | | | |

| MANAGEMENT TABLE MARK SECTION | SCANNER MANAGEMENT SECTION | | | DOCUMENT MANAGEMENT SECTION | |
|---|---|---|---|---|---|
| 1 | 0 | 0mm | 210mm | 100 | 001 | A4 |
| 2 | | | | | |

701 / 702 / 703

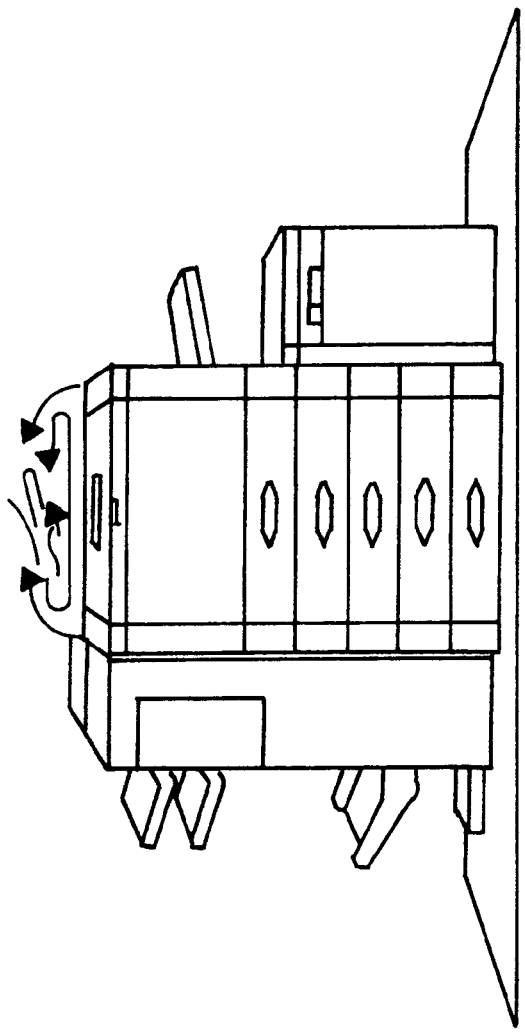

IMAGE PROCESSING APPARATUS

FIELD OF THE INVENTION

The present invention relates to an image processing apparatus equipped with an original image reading section for reading an original image, such as a printer, a scanner, a copying machine, and a copying•facsimile complex apparatus.

BACKGROUND OF THE INVENTION

In an image processing apparatus equipped with an automatic document feeder (hereinafter, referred to as ADF) for automatically feeding original documents (hereinafter, referred to simply as documents) to an original image reading section, such as a printer, a scanner, a copying machine, and a copying•facsimile complex apparatus, when the documents are jammed in the ADF or transfer sheets are jammed, a job so-called "recovery" must be carried out. In other words, after the jam is cleared, a certain number of the documents are returned to the set position, so that they are read again.

Japanese Laid-open Patent Application No. 66586/1990 (Tokukaihei No. 2-66586) discloses a "document recovery method", which relates to an invention for the recovery after the jam in the copying machine is cleared. According to this document recovery method, the number of the documents to be returned is computed based on the number of the documents which have been fed and the number of the transfer sheets which have been released. In this document recovery method, the suspended job is controlled based on only one kind of table exhibiting the job state when the jam occurred.

According to the above publication, the recovery of the documents is carried out based on the feeding state of the documents, which is obtained by discovering the current position of the documents using document counters.

More specifically, to obtain the feeding state of the documents, the following counters are provided as the document counters: a pre-feeding counter A for counting the action that a document is transported to a pre-feeding position in the ADF; a feeding counter B for counting the action that the document is transported to a document reading position in the ADF; a released document counter C for counting the action that the document is transported to a document releasing position in the ADF; and a released transfer sheet counter D for counting the action that a transfer sheet having formed thereon a copy image of the corresponding document is released outside of the apparatus.

In other words, it could be described as: when the pre-feeding is completed in the ADF, Pre-feeding Counter A=A+1; when the feeding in the ADF is completed, Pre-feeding Counter A=A−1 and Feeding Counter B=B+1; when the document releasing is completed in the ADF, Feeding Counter B=B−1 and Released Document Counter C=C+1; and when the transfer sheet releasing for the corresponding document is completed, Released Transfer Sheet Counter D=D−1.

Thus, when the transfer sheets are jammed, the number M of the documents to be returned in the SS (Simplex to Simplex) mode is computed as follows:

(1) when the released transfer sheet counter D does not exhibit "0" (zero), that is, when the copying job for all the released documents has not been completed, M=D+A+B; and (2) when the released transfer sheet counter D exhibits "0" (zero), that is, when the copying job for all the released documents has been completed, M=0.

The number of the documents to be returned is computed from the value of each counter in this manner, and subsequently the recovery of the documents is carried out.

However, in the above conventional document recovery method, the counters provided at portions having different time series count up/down by one to show the state of the documents and transfer sheets, and there may possibly arise inconveniences that one is subtracted from zero, that is, the counter exhibits a count value of "−1".

To be more specific, in case that the copying machine is of the type whose ADF can be opened/closed with respect to the document table at which each document is read, when the copying job is resumed in the ADF mode while a document is remaining on the document table, the copying machine releases that document from the document table as soon as the copying job is resumed. Here, the pre-feeding counter A counts down by one from the initial value "0" (zero), thereby exhibiting a count value of "−1". Since the count value of "−1" equals to FF (hexadecimal digit), there arises a problem that the copying machine issues a wrong instruction, "Please return 255 (FF) documents".

Some types of the known image processing apparatuses are furnished with various kinds of image processing functions. Thus, the image processing apparatuses of these types effect the selected image processing functions to an original image inputted from the original image reading section, and output a processed image from the printer section. Recently, there has been an increasing demand to provide abilities of efficiently processing a large volume of documents in a short time to the image processing apparatuses of these types, and digital copying machines or the like which can meet such a demand have been developed.

Also, some types of the commercialized complex digital copying machines can output, from the printer section, an image inputted from either its own original image reading section or an external device through a facsimile function or a printer function.

High speed, high quality, multi-function, low costs, low power consumption, etc. are basic requirements for these image processing apparatuses. Further, to meet the today's demand, these image processing apparatuses need to have the abilities of immediately and precisely carrying out not only a series of job events from reading an original image to outputting an input image, but also the recovery from a trouble, such as jam recovery.

For example, when the jam occurs in the duplex ADF employed in a digital copying machine while the documents are successively being read, the key factor to improve the work efficiency is whether or not the jam recovery can be carried out smoothly after the jam is cleared.

According to the arrangement of aforementioned Japanese Laid-open Patent Application No. 66586/1990 (Tokukaihei No. 2-66586), the copying machine checks the side (main or back side) of the first document fed when the copying job is resumed, and if the checked side is not the side to be copied next, it automatically flips the document, so that the operator can omit a tedious job of resetting the returned documents in an appropriate order.

More specifically, according to the arrangement of the above publication, the copying machine is furnished with: a document side detecting section for detecting the side of the document set on the platen; a document recovery processing section for comparing the detected side of the document and the document side to be copied next, and for flipping the document if the two sides do not coincide; and a copying job completion judging section for judging whether the copying job for the released document is completed or not. Thus, the copying machine flips the fed document if the side of the document detected when the copying job has resumed does not match with the document side to be copied next, and judges whether the document barge is necessary when the operation of the copying machine is suspended by computing the number of the documents to be returned based on the correlation between the transfer sheets and the documents. Consequently, the above arrangement is effective in that the operator can omit a tedious job of resetting the documents, and that the work efficiency in the jam recovery can be improved.

However, as previously mentioned, not only the abilities of handling a large volume of the documents, but also the abilities of processing an input image from an external device have been increasingly demanded to the image processing apparatus. Thus, to provide an apparatus which can overcome various kinds of troubles arising in any of the available modes, an input image should be processed by more complicated control managing techniques.

In other words, the above publication describes the improvement of the work efficiency in the jam recovery by correlating the transfer sheets to the documents, but fails to disclose an input image management technique which can overcome the troubles occurring with an image inputted from a facsimile machine and a personal computer. Thus, there still remains a problem that once a trouble occurs, the recovery takes a considerable time.

In addition, when a document feeding error occurs in the ADF while a large volume of documents are successively read, or a trouble like the jam occurs in the image output section while the input images processed in several modes are outputted successively, the correlation between the transfer sheets and the documents established up to the occurrence of the error/trouble becomes useless unless the jam recovery is carried out in an accurate manner in the original image reading step and image outputting step. If the correlation becomes useless, the images should be read and processed again, thereby wasting the processing up to the occurrence of the error/trouble. Hence, the conventional managing method has a problem that it can not improve the work efficiency.

Further, a control section for effecting the above managing technique becomes too complicated compared with a case where the above management is not carried out. Thus, to maintain the work efficiency, a high-performance processor and accompanying peripheral circuits are necessary, thereby posing a problem that the resulting apparatus becomes very expensive.

SUMMARY OF THE INVENTION

It is therefore an object of the present invention to provide an image processing apparatus which can readily and precisely carry out the recovery of the documents when the documents or transfer sheets are jammed.

To fulfill the above and other objects, an image processing apparatus of the present invention is furnished with:

an original image reading section for reading an image on a document;

an automatic document feeding device for successively presenting documents to the original image reading section; and a management table created for each document for storing processing information related to a document reading action.

According to the above arrangement, the management table stores the processing information related to the document reading action for each of the documents which are successively presented to the original image reading section by means of the automatic document feeding device. Thus, the document reading action can be controlled per document based on the content stored in the management tables.

Consequently, since the state of each document in the image processing apparatus can be obtained, if the documents are jammed in the automatic document feeding device, for example, it can be readily found which document (s) should be returned to a predetermined position in the automatic document feeding device to resume the document reading action only by referring to the management tables, thereby making it possible to carry out the recovery swiftly and precisely.

It is another object of the present invention to provide a highly reliable image processing apparatus which can:

minimize an increase of the costs;

carry out a series of job events from reading an original image to outputting an input image in a secure manner; and carry out swift and precise recovery not only from normal document feeding jam, but also from a scanner trouble or feeding jam occurring while inputting/outputting an image from/to a facsimile or a personal computer.

To fulfill the above and other objects, another image processing apparatus of the present invention is furnished with:

a mode setting section for setting a processing mode for a document;

an original image reading section for reading an image on the document;

a management table creating section for creating an information management table based on document information related to existence and characteristics of the document obtained from the original image reading section and document processing information related to the processing mode set by the mode setting section, the management table creating section also updating the document information in the information management table when the document information changes and determining the document processing information; and a reading action control section for controlling an action of the original image reading section based on the information management table.

According the above arrangement, the document management table created based on the document information and document processing information are updated precisely to the latest information confirmed in every step of the document reading action by the original image reading section. Thus, the control on the document reading action by the reading action control section and the control on the document reading action based on the document management table can be managed precisely in a secure manner.

For a fuller understanding of the nature and advantages of the invention, reference should be made to the ensuing detailed description taken in conjunction with the accompanying drawings.

BRIEF DESCRIPTION OF THE DRAWINGS

FIG. 10 is a view explaining the content of management table marks in the management tables of FIG. 9;

FIG. 12(a) is a view explaining a document managing bit of the management tables of FIG. 9;

FIG. 12(b) is a view explaining the content of the document managing bit of FIG. 12(a);

FIG. 20 is a view explaining still other examples of the management tables of FIG. 8;

FIG. 29 is a view explaining the states of the management tables when transfer sheets are short during a duplex copying job by the facsimile complex apparatus of FIG. 2;

FIG. 30 is another view explaining the states of the management tables when transfer sheets are short during a duplex copying job by the facsimile complex apparatus of FIG. 2;

FIG. 31 is still another view explaining the states of the management tables when transfer sheets are short during a duplex copying job by the facsimile complex apparatus of FIG. 2;

FIG. 38(a) is a view showing the steps of creating the document management table, and it schematically shows an arrangement of the entire document management table;

FIG. 38(b) is a view showing in detail a document management section and the vicinity thereof in the document management table of FIG. 38(a);

FIG. 38(c) is a view showing in detail a scanner management section and the vicinity thereof in the document management table of FIG. 38(a);

FIG. 42 is a view showing a display screen of the digital copying machine when a document feeding error occurs somewhere in an ADF transportation path.

DESCRIPTION OF THE EMBODIMENTS

Embodiment 1

Referring to FIGS. 1 through 33, the following description will describe an example embodiment of the present invention. In the present embodiment, a facsimile complex apparatus, which is equipped with an ADF (Automatic Document Feeder) for automatically presenting documents to an original image reading section and a facsimile function, will be explained as an example image processing apparatus.

Figure 2:
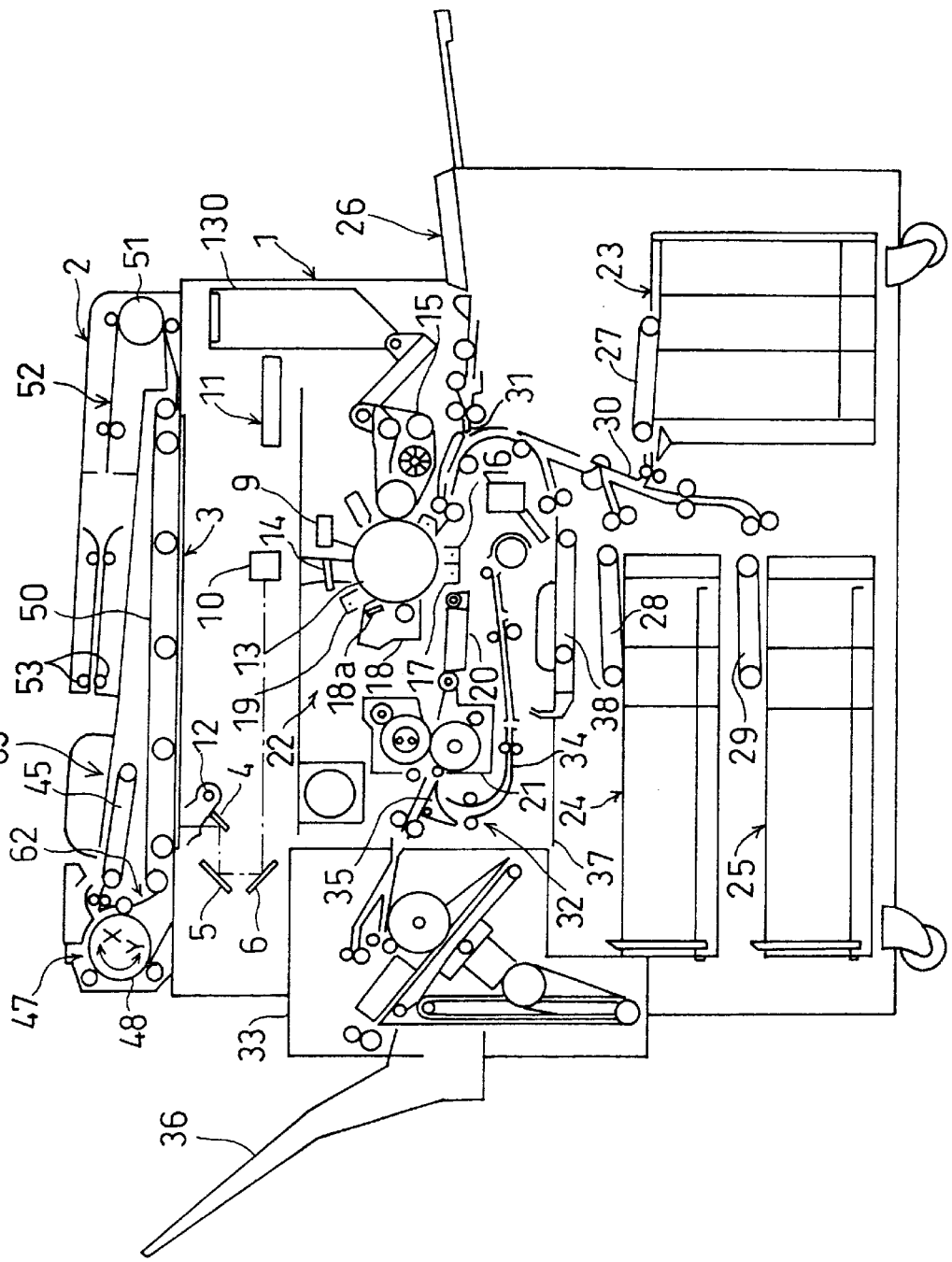
FIG. 2 is a view schematically showing an arrangement of a facsimile complex apparatus adopting the image processing apparatus of FIG. 1.

As shown in FIG. 2, a facsimile complex apparatus of the present embodiment includes an image forming apparatus for forming an image transmitted via a facsimile communication or making a copy image, and an ADF 2 for automatically feeding documents to be copied or to be sent via a facsimile communication to an original image reading section of the image forming apparatus 1. Hereinafter, the documents to be copied or sent via a facsimile communication are referred to simply as "documents" unless the context requires the specific distinction.

A document exposing section 3 is provided above the image forming apparatus 1. The document exposing section 3 includes a transparent plate 54 (FIG. 3) made of transparent glass of an adequate size to irradiate light to a document, whereby the document set thereon is exposed.

The ADF 2 is a device for automatically recirculating documents set in a document setting section by repetitively feeding the documents from the document setting section to the document exposing section 3, and then feeding back the exposed documents to the document setting section.

The ADF 2 is provided in such a manner to turn to cover the document exposing section 3, and it is closed to cover the document exposing section 3 when the document is exposed. The ADF 2 also serves as a lid in a platen mode in which the document is placed manually on the document exposing section 3 to be exposed. The operation of the ADF 2 will be explained in detail below.

Provided below the document exposing section 3 are an optical system composed of a copy lamp 12 serving as an exposing light source, mirrors 4–6, and a CCD (Charge Coupled Device) unit 10, and a facsimile unit 11.

The optical system optically scans the document with light irradiated from the copy lamp 12, and leads reflected light from the document to the CCD unit 10 through the mirrors 4–6, thereby functioning as a scanner.

The facsimile unit 11 pulls in image data transmitted from a communication correspondent through an unillustrated communication line, such as a telephone line, and on the other hand, it sends image data read by the optical system to the communication correspondent through the communication line.

Provided below the optical system and facsimile unit 11 are a photosensitive drum 13 and a laser unit 9 for converting the image data pulled in by the optical system and facsimile unit 11 into a laser beam, and for writing an electrostatic latent image on the surface of the photosensitive drum 13 in accordance with the image data by irradiating the laser beam thereon.

Also, provided around the photosensitive drum 13 are a charger 14, a developer 15, a transferring device 16, a separator 17, a cleaner 18, and a charge remover 19.

The developer 15 is equipped with a toner density sensor (not shown) for detecting the toner density of a toner image formed on the photosensitive drum 13. A toner hopper 130 for supplying the toner to the developer 15 is provided behind the developer 15. The toner hopper 130 is arranged to detect an amount of reserved toner by an unillustrated toner available amount detecting sensor.

The cleaner 18 includes a cleaning blade 18*a* for scraping off the residual toner on the photosensitive drum 13 by touching the surface thereof.

A transportation device 20 for transporting sheets having thereon transferred toner images by the transferring device 16, and a fuser 21 for fusing the toner images onto the transfer sheets transported by the transportation device 20 are provided near the separator 17.

The aforementioned components, including the photosensitive drum 13, form a copy processing section 22.

The copy processing section 22 forms an electrostatic latent image on the photosensitive drum 13 by irradiating a laser beam by means of the laser unit 9 in accordance with a signal from the optical system or facsimile unit 11, then develops the electrostatic latent image to a visible toner image by means of the developer 15, and transfers the toner image onto a transfer sheet supplied from feeding tray 23, 24, or 25 described below by means of the transferring device 16.

The transfer sheet having thereon transferred the toner image by means of the copy processing section 22 is separated from the photosensitive drum 13 by means of the separator 17, and transported further to the fuser 21 by means of the transportation device 20 provided near the separator 17. The fuser 21 fuses a toner image on the transfer sheet by heating or applying a pressure to fix the same thereon.

The feeding tray 23 is provided below the copy processing section 22, and the feeding trays 24 an d 25 are provided adjacently to the feeding tray 23. An unillustrated mechanism for detecting a sheet stock amount is provided to each of the feeding trays 23–25, and the sheet stock amount of each feeding tray is displayed on a display section formed on a manipulation panel described below based on the detected sheet stock amount.

Also, a manual feeding section 26 is provided at the side portion of the image forming apparatus 1 and in the upper stream of the flow of the transfer sheets in the copy processing section 22.

Each of the feeding trays 23–25 can withhold a plurality of transfer sheets used for the copying job, and the transfer sheets withheld in each of the feeding trays 23–25 are successively fed from the top to a transfer position in the copy processing section 22 through sheet feeding belts 27–29, respectively.

On the other hand, the manual feeding section 26 is provided to enable the operator to manually feed a transfer sheet used for the copying job. Note that a transfer sheet of any size can be set in the manual feeding section 26 to be supplied separately to the transfer position.

A transportation path 30 is provided from a space formed between the feeding tray 23 and the feeding trays 24 and 25 to somewhere above near the photosensitive drum 13.

The transportation path 30 is provided to lead the transfer sheet fed from any of the feeding trays 23–25, manual feeding section 26, and an intermediate tray 37 described below to the photosensitive drum 13. An opening end of the transportation path 30 near the transferring device 16 is equipped with a resist roller 31 for supplying the transfer sheet at predetermined timing.

A transportation switching section 32 is provided at a sheet releasing end of the fuser 21. The transportation switching section 32 is furnished with a gate flapper 35 for leading the transfer sheet to a finisher 33 in case of a simplex copy mode, and to a transportation path 34 in case of a duplex copy mode.

The finisher 33 is furnished with a function of releasing the transfer sheet to a releasing tray 36 and a staple function for stapling the transfer sheets together with staples when necessary.

The releasing tray 36 is arranged to be driven vertically, so that it can receive a plurality sets of the transfer sheets processed with the staple function by the finisher 33.

On the other hand, the transportation path 34 extends from the transportation switching section 32 to the lower portion of the photosensitive drum 13 in such a manner to go under the fuser 21 and transportation device 20, so that the transfer sheet is led from the fuser 21 to the intermediate tray 37.

The intermediate tray 37, provided below the fuser 21, is a tray for receiving the transfer sheets transported through the transportation path 34. Each transfer sheet transported to the intermediate tray 37 is placed thereon with being flipped. A transportation belt 38 is provided at the end of the transportation path 30 with respect to the intermediate tray 37, and the transfer sheets flipped and placed on the intermediate tray 37 are fed through the transportation path 30.

Figure 3:
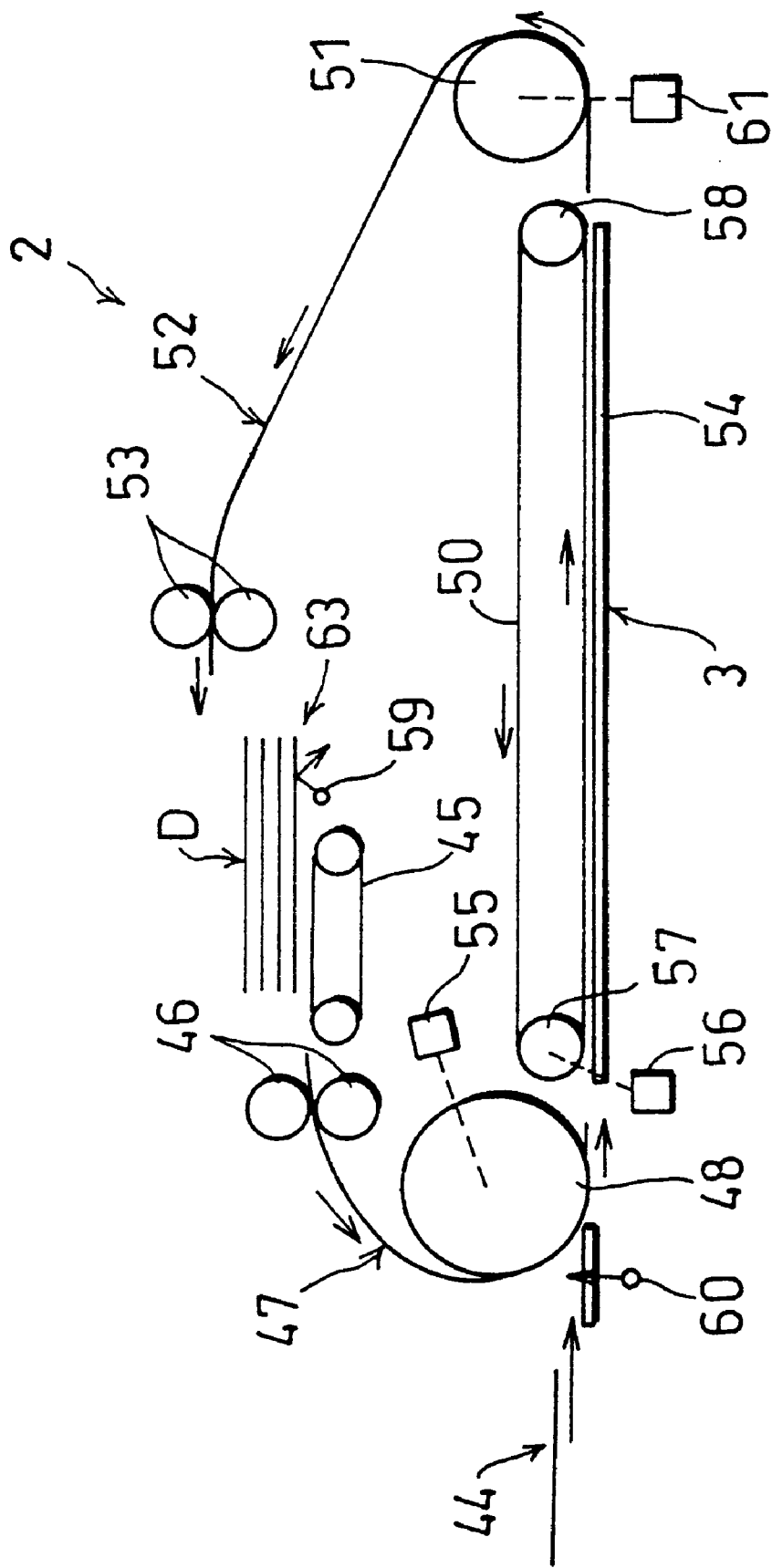
FIG. 3 is a view schematically showing an automatic document feeder provided to the facsimile complex apparatus of FIG. 2.

Here, an explanation of the ADF 2 will be given in the following with reference to FIG. 3. The ADF 2 shown in FIG. 2 and the ADF 2 shown in FIG. 3 are substantially the same, except that a flipping transportation path 62 used for flipping the documents illustrated in FIG. 2 is omitted in FIG. 3. The flipping transportation path 62 will be explained in detail below.

The ADF 2 can be set either in a recirculating document handling mode (hereinafter referred to as RDH mode) in which a set of the documents are fed per sheet from the bottom and returned on the top (bottom-to-top), or in a separate document feeding mode (hereinafter referred to as SDF mode) in which documents are set manually per page (sheet).

As shown in FIG. 3, the ADF 2 includes a document withholding section 63 for withholding a pile of documents D. The document withholding section 63 adopts the bottom-to-top method, and therefore, includes a detecting device 59 for detecting the sending of the document D withheld at the bottom.

Further, the ADF 2 includes a transportation mechanism composed of a sending belt 45, a pair of sending rollers 46, a feeding transportation path 47, a transportation roller 48, a transportation belt 50, a feeding roller 51, a returning transportation path 52, and a pair of returning rollers 48 to recirculate the documents D withheld in the document withholding section 63.

In other words, a set of the documents D withheld in the document withholding section 63 are sent successively from the bottom by the sending belt 45 provided directly below the document withholding section 63. Each document D sent out by the sending belt 45 passes through a space between the pair of the sending roller 46 provided at the downstream of a document feeding flow of the sending belt 45, and transported to the document exposing section 3 by means of the transportation roller 48 through the feeding transportation path 47.

The document D fed to the document exposing section 3 is transported onto the transparent plate 54 of the document exposing section 3, and pressed against the transparent plate 54 by the transportation belt 50. Then, the document D is exposed in an exposing area of the copy lamp 12 (FIG. 12) of the document exposing section 3.

The exposed document D is further transported by the transportation belt 50 and flipped by the feeding roller 51, after which the document D is returned to the top of the documents D withheld in the document withholding section 63 by way of the returning transportation path 52 and a pair of the returning rollers 53.

The transportation roller 48 is provided directly below the feeding transportation path 47 provided at the downstream of the sending rollers 46. The transportation roller 48 is arranged to be driven to rotate by a motor 55 whose axis is linked to the axis of the transportation roller 48, and to transport the document D transported through the feeding transportation path 47 to the document exposing section 3 while flipping the same.

The feeding roller 51 is arranged to be driven to rotate by a motor 61 whose axis is linked to the axis of the feeding roller 51, and to transport the document D transported from the transportation belt 50 to the document withholding section 63 by way of the returning transportation path 52 and the pair of the sending roller 53 while flipping the same.

A document placement section 44, on which each document D is placed manually, is provided at a position opposite to the document exposing section 3 with respect to the transportation roller 48, in other words, at the upper stream with respect to a transportation direction of the transportation roller 48. A detecting device 60 for detecting the manually placed document D is provided somewhere between the document placement section 44 and transportation roller 48.

The document placement section 44 is used when the documents are fed in the SDF mode. To be more specific, the document D placed on the document placement section 44 is transported by the transportation roller 48, and transported further to the document withholding section 63 through the same route as in the RDH mode.

The transportation belt 50 is provided endlessly across a driving roller 57 which is driven to rotate by a motor 56 and a sub-roller 58 provided to oppose the driving roller 57, and turned in a direction indicated by an arrow by the motor 56.

The transportation belt 50 is provided with many air through-holes. These air through-holes face an unillustrated air sucking duct provided in a space encircled by the transportation belt 50 across the driving roller 57 and sub-roller 58. Thus, since a sucking opening of the duct is made to touch the transportation belt 50 turning below the same from above, the document D transported from the transportation roller 48 is attracted to the transportation belt 50, so that the document D is transported to the feeding roller 51 without being slid.

Consequently, the transportation roller 48 serves as a common roller used in both the RDH mode and SDF mode. To be more specific, the transportation roller 48 transports the documents in the RDH mode, whereas it pulls in the documents in the SDF mode.

Further, in the present facsimile complex apparatus, sensors for detecting the current position of the document D are provided at predetermined positions in the transportation mechanism of the ADF 2. Thus, in the present facsimile complex apparatus, the documents are managed by obtaining the position information of the same based on a detection signal from the sensors and creating management tables for the documents using the position information. The management tables will be explained in detail below.

Figure 7A:
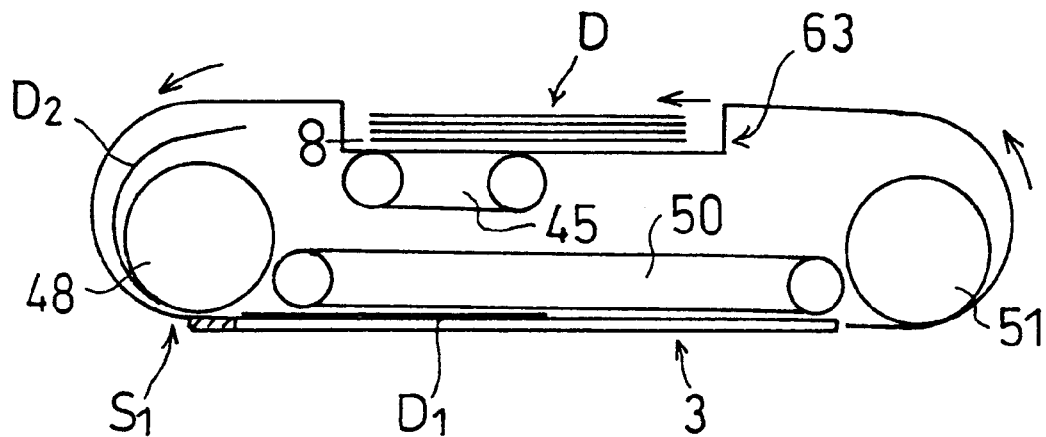
FIG. 7(a) is a view explaining an action for transporting a document to a document exposing section by means of the automatic document feeder provided to the facsimile complex apparatus of FIG. 2.

As shown in FIG. 7(a), while a document D1 is being copied, that is, while it is exposed by the document exposing section 3, a document D2 following the document D1 stands by at the pre-feeding position to speed up the document feeding job by the ADF 2. The pre-feeding position can be defined as a position at which the top end of the document stops at a position S1 between the document exposing section 3 and transportation roller 48.

Subsequently, as soon as the document D1 is transported back to the document withholding section 63 by means of the feeding roller 51, the document D2 which was standing by at the pre-feeding position is transported to the document exposing section 3 and then exposed.

Figure 7B:
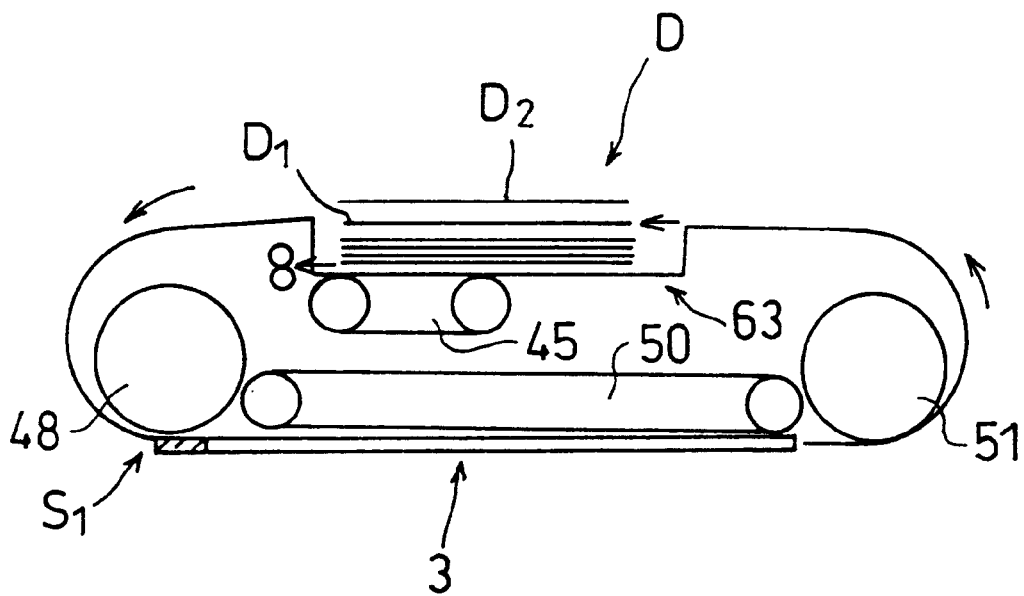
FIG. 7(b) is a view explaining an action for returning the document to a document withholding section from the state of FIG. 7(a)

When the exposure of the document D2 ends, the document D2 is placed on the document D1 withheld in the document withholding section 63 as shown in FIG. 7(b).

Therefore, the present facsimile complex apparatus is furnished with three sensors (not shown): a sensor for detecting the existence of the document D at the pre-feeding position; a sensor for detecting the existence of the document D at the exposing position of the document exposing section 3; and a sensor for detecting the releasing of the document D from the returning rollers 53, that is, the completion of the exposure, whereby the position of the documents is found based on the signal from each sensor.

Here, the control of the above-arranged facsimile complex apparatus will be explained with reference to FIG. 4.

Figure 4:
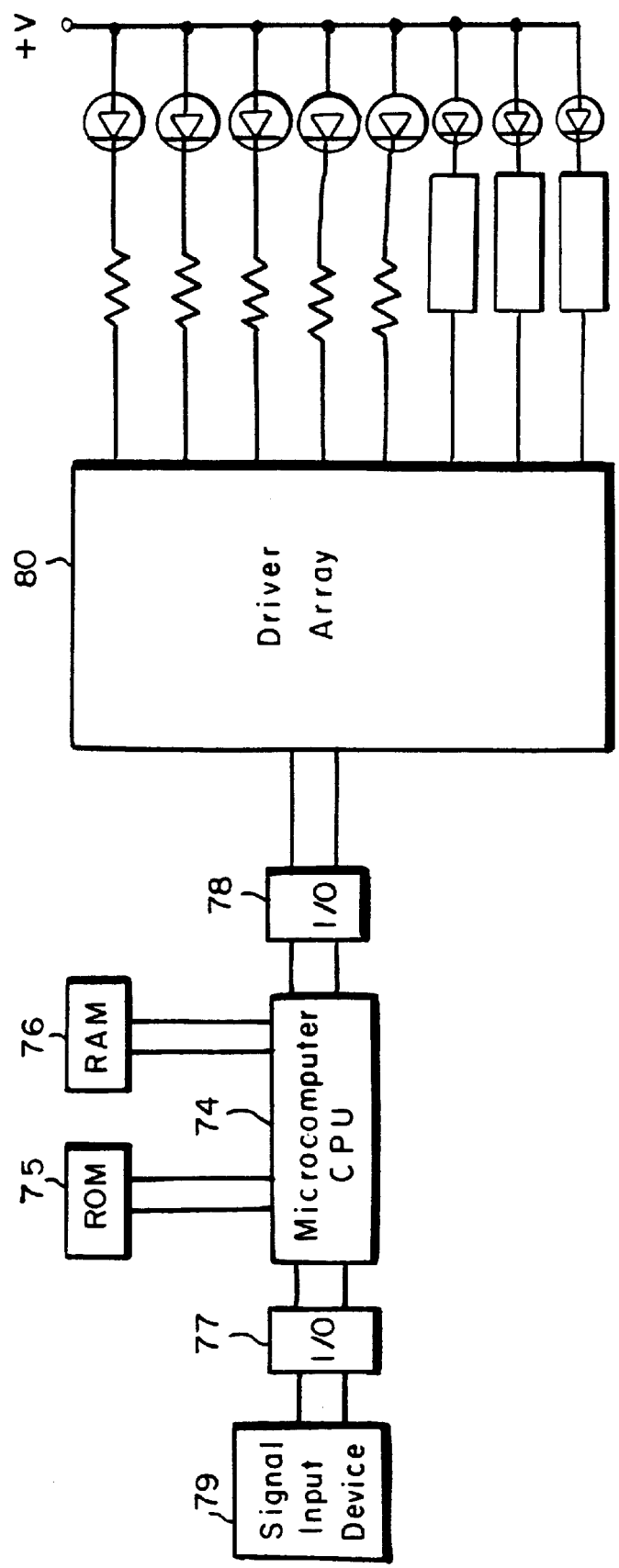
FIG. 4 is a control block diagram of the facsimile complex apparatus of FIG. 2.

As shown in FIG. 4, the present facsimile complex apparatus includes a microcomputer (hereinafter, referred to as CPU) 74 as control means responsible for all the controls including the copy control and facsimile control.

A ROM (Read Only Memory) 75 and a RAM (Random Access Memory) 76 are connected to the CPU 74. Moreover, a signal input device 79 is connected to the CPU 74 through an interface circuit (hereinafter, referred to as I/O) 77, and a driver array 80 is connected to the same through an I/O 78.

The ROM 75 pre-stores control programs, so that the CPU 74 carries out each control in accordance with these control programs.

The RAM 76 is used as a buffer memory, flags necessary for the copy control and facsimile control, and computing areas for other controls.

The signal input device 79 is a device for inputting a detection signal from the aforementioned sensors for detecting the position of the document D in the ADF 2, a detection signal from a key switch or a transfer sheet switch, etc., and it transfers the input signal to the CPU 74 through the I/O 77. In other words, in the present facsimile complex apparatus, a detection signal of the transportation position of the transfer sheet, a detection signal of the position of the photosensitive drum 13, etc. are sent to the CPU 74 through the I/O 77.

On the other hand, the driver array 80 receives a control signal from the CPU 74 through the I/O 78, so as to control the loads applied on a display circuit of a copy magnification or a reading magnification, other display circuits, and the main body of the facsimile complex apparatus.

Thus, each portion of the facsimile complex apparatus main body is driven under the control of the CPU 74.

Figure 5:
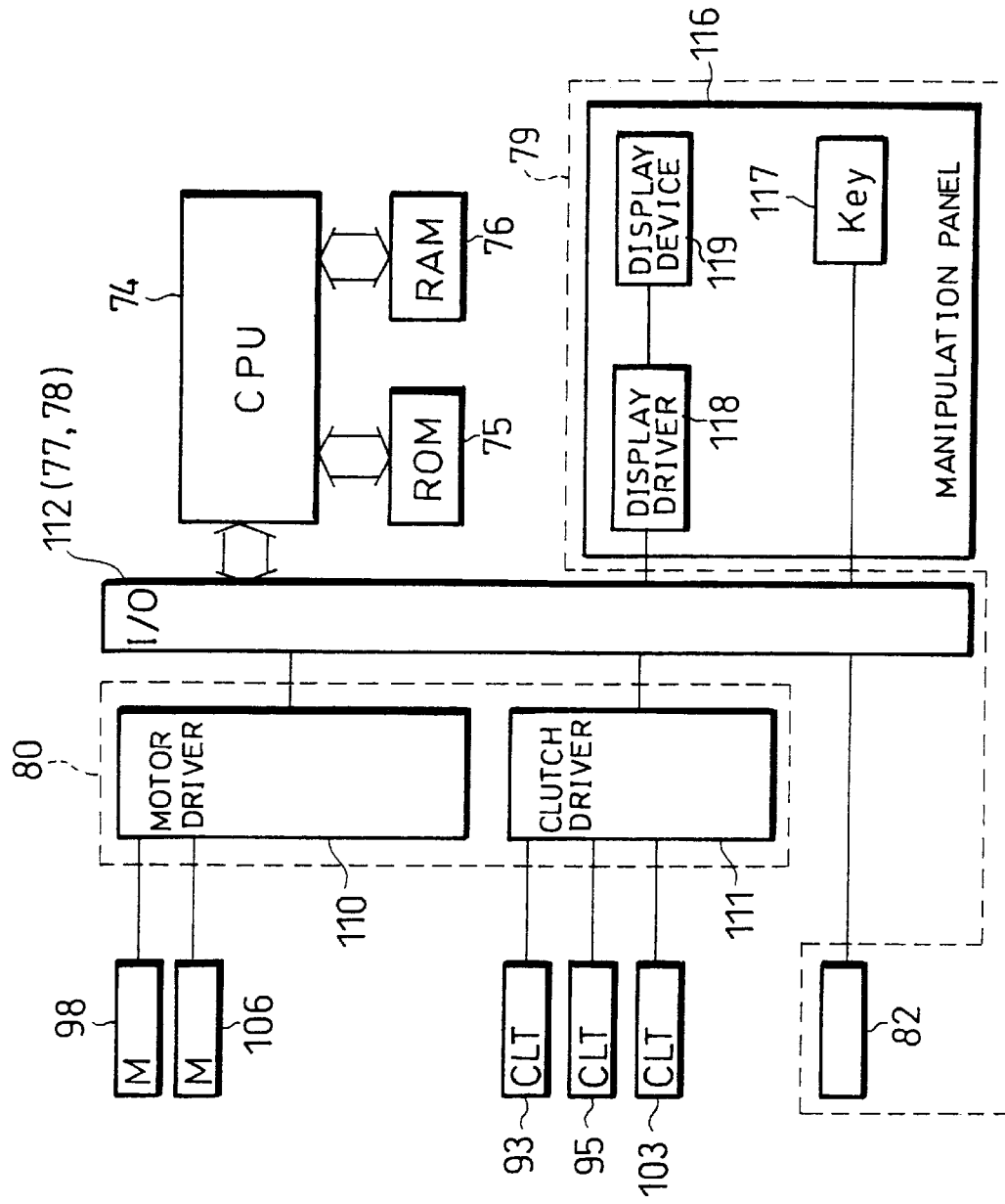
FIG. 5 is a block diagram more specifically showing the control block diagram of FIG. 4.

FIG. 5 shows specifically the control section as the control means of the present facsimile complex apparatus main body. The CPU 74 is connected to the driver array 80 and signal input device 79 through an I/O unit 112 composed of the I/O's 77 and 78 of FIG. 4.

The driver array 80 is composed of a motor driver 110 and a clutch driver 111. Motors (M) 98 and 106 are connected to the motor driver 110, and electromagnetic clutches (CLT) 93, 95, and 103 are connected to the clutch driver 111.

The signal input device 79 is composed of a detecting device 82 (state detecting means) as the input device of each kind of signal to the CPU 74 and a manipulation panel 116.

The detecting device 82 includes, for example, the aforementioned sensors provided in the ADF 2 for detecting the position of the document therein. Thus, upon detection of the position of the document, a detecting signal is sent from the sensor(s) to the CPU 74 through the I/O unit 112, and the CPU 74 writes position information of the document into the management table for managing the document, which will be described below.

Also, the detecting device 82 includes a sensor for detecting a signal for driving the motors (M) 98 and 106 and electromagnetic clutches (CLT) 93, 95, and 103 under the control. Thus, when the detection signal from each sensor is pulled into the CPU 74 through the I/O unit 112, the CPU 74 starts to drive the motors (M) 98 and 106 and electromagnetic clutches (CLT) 93, 95, and 103 under the control by means of the motor driver 110 and clutch driver 111.

The control programs for the CPU 74 are stored in the ROM 75, while a buffer memory and computation areas, such as flags, counters and timers, used for the copy control by the CPU 74 are stored in the RAM 76.

An operator manipulation key (Key) 117 on the manipulation panel 116 and a display driver 118 are connected to the I/O unit 112. A display device 119 made of a liquid crystal display or the like is connected to the display driver 118.

Figure 6:
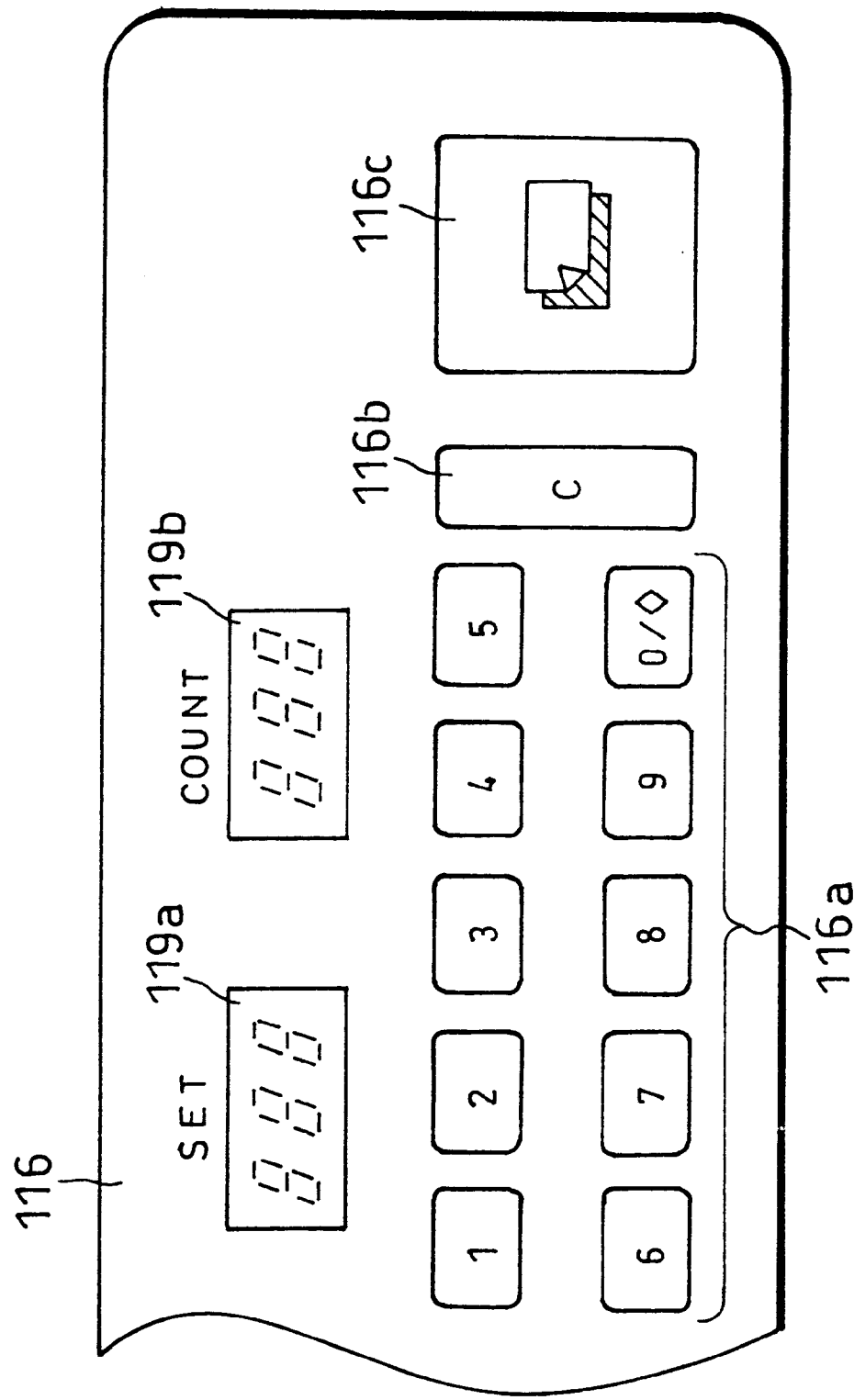
FIG. 6 is a view schematically showing an arrangement of a manipulation panel provided to the facsimile complex apparatus of FIG. 2.

As shown in FIG. 6, the manipulation panel 116 includes ten keys 116a for setting a desired number of copies, a clear key 116b for resetting the set number, a print switch 116c for starting the copying or document reading job, a set condition display section 119a for displaying the set number, a count display section 119b for displaying the current number of the transfer sheets, etc.

When the operator manipulates the manipulation panel 116, the CPU 74 shown in FIG. 5 controls the display driver 118 in such a manner that the number of copies set through the ten keys 116a is displayed on the set display section 119a. Also, when the print switch 116c is pressed, the CPU 74 carries out the copy control by controlling the mechanism, such as the copy processing section 22 of FIG. 2, while at the same time counting the current number of the transfer sheets and controlling the display driver 118 to display the count number on the count display section 119b. Further, when the count number reaches the set number, the CPU 74 controls the display driver 118 to display "0" (zero) on the count display section 119b.

In addition, although it is not shown in the drawing, the manipulation panel 116 includes manipulation keys for setting the facsimile mode and copy mode.

Thus, when the present facsimile complex apparatus is used as a facsimile machine, the operator manipulates the manipulation keys to set the apparatus to the facsimile mode, and transmits image information of the documents read by the document exposing section 3 from the facsimile unit 11 to a communication correspondence through an unillustrated communication line.

When the present facsimile complex apparatus is used as a copying machine, the operator manipulates the manipulation keys to set the apparatus to the copy mode, so that desired copy images are formed on the transfer sheet based on the image information of the documents read by the document exposing section 3.

When the present facsimile complex apparatus is used as a copying machine, four modes are available: a DD (Duplex to Duplex) mode for copying both sides of the document to both side of the transfer sheet; a DS mode for copying both sides of the document to the single side of the transfer sheets separately; an SS (Simplex to Simplex) mode for copying a single side of the document to a single side of the sheet; and an OC (Original Document) mode (platen mode) for exposing the document placed on the transparent plate 54 of the document exposing section 3.

The DD mode, DS mode and SS mode are the copy modes using the document feeding mechanism of the ADF 2, whereas the OC mode is the copy mode using the ADF 2 as a document pressing lid.

Also, when a plurality of copies are made using the document feeding mechanism of the ADF 2, two modes are available: the ADF mode in which copies are made by transporting the documents successively to the document exposing section 3 and exposing each document for a desired number of times; and the RDH mode in which a desired number of copies are made by feeding the documents to the document exposing section 3 for a desired number of times by recirculating the same.

As shown in FIG. 3, in the above-arranged ADF 2, the document D usually fed from the document withholding section 63 through the sending belt 45 is transported to the document exposing section 3 through the feeding transportation path 47 and transportation roller 48 in such a manner that it is exposed at the main (top) side. After the main side is exposed, the document D is transported back onto the top of a pile of the documents D in the document withholding section 63 with its exposed side facing upward.

In other words, according to the arrangement of FIG. 3, only the SS mode is available as the copy mode using the ADF 2. However, as previously mentioned, the present facsimile complex apparatus can operate in the copy modes for copying both sides of the documents, such as the DD mode and DS mode.

Thus, as shown in FIG. 2, the present facsimile complex apparatus is furnished with the flipping transportation path 62, which is omitted in FIG. 3, at an end opposite to the feeding transportation path 47 with the transportation roller 48 being provided inbetween. The documents are transported through the flipping transportation path 62 in the following manner.

A document sent from the document withholding section 63 by the sending belt 45 is transported to the feeding transportation path 47 in such a manner to be exposed at its main side, and transported further to the document exposing section 3 as the transportation roller 48 rotates in a direction Y indicated by an arrow. The document whose one of the sides, herein the main side, has been exposed is transported to the feeding roller 51 by the transportation belt 50, and transported further to the document withholding section 63 to be withheld therein by the feeding roller 51 by way of the returning transportation path 52 and returning rollers 53.

Subsequently, the document whose main side has been exposed is fed from the document withholding section 63 through the feeding transportation path 47 again by the sending belt 45. Here, the transportation roller 48 is arranged to rotate in a direction X which is opposite to the direction Y, whereby the document transported to the feeding transportation path 47 is further transported to the flipping transportation path 62. Then, the document is transported to the document exposing section 3 through the flipping transportation path 62, and the remaining back (bottom) side of the document is exposed by the document exposing section 3.

In this manner, both sides of the documents are automatically exposed in the above-arranged ADF 2.

In the above duplex document exposing manner, only one side is exposed while the document is fed from the document withholding section 63 and returned to the same. Thus, when a plurality of the documents are copied, all the documents are copied at one side first, thence at the other side.

In this case, the transfer sheets having formed thereon copies of the one side of the documents are transported to the transportation path 34 from the transportation device 20, and piled up successively on the intermediate tray 37 with being flipped. Then, as soon as the exposure of the other side of the documents starts, the transfer sheets in the intermediate tray 37 are successively transported to the copy processing section 22 from the bottom, and the copies of the other side of the documents are formed on these transfer sheets having already formed thereon copies of the opposing side of the documents. Finally, the transfer sheets having the copies formed on both sides are released to the finisher 33 from the fuser 21.

Incidentally, to expose both sides of the documents, the above method of exposing the documents successively at one side first, and thence at the other side (duplex document exposure in the RDH mode) is adopted. Alternatively, a method of exposing one document at both sides, replacing the document with the following document, and exposing the following document at both sides (duplex exposure in the ADF mode) can be adopted as well.

Each document can be exposed at both sides in the following manner.

For example, in the ADF 2 shown in FIG. 2, the document transported to the document exposing section 3 by the transportation roller 48 is exposed at one side, and transported to the feeding roller 51 by the transportation belt 50, and then transported to the document exposing section 3 through the unillustrated flipping transportation path while being flipped by means of the feeding roller 51.

The document is transported from the feeding roller 51 to the document exposing section 3 in a direction opposite to the direction when it is transported from the transportation roller 48 to the document exposing section 3.

Thus, according to the above duplex document exposing method, the duplex documents are copied at both sides while the documents are transported from the documents withholding section 63 and returned to the same.

In this case, the transfer sheets having formed thereon the copies of the documents on one side are transported to the transportation path 34 from the transportation device 20 and piled up in the intermediate tray 37, and as soon as the exposure of the other side of the documents starts, the transfer sheets on the intermediate tray 37 are transported to the copy processing section 22, whereby the copies on the other side of the document s are formed on the transfer sheets having already formed the copies of the documents at the opposing side. Finally, the transfer sheets having formed the copies on both sides are released to the finisher 33 from the fuser 21.

Herein, the exposure of the duplex documents in the above-explained RDH mode will be mainly explained, but it should be appreciated that the present invention is also applicable to the exposure of the duplex documents in the ADF mode.

As has been explained, if the flipping transportation path 62 of the ADF 2 is used, the documents are transported in such a manner to be exposed at both sides, thereby making it possible to automatically expose both sides of the documents withheld in the documents withholding section 63.

The above-arranged facsimile complex apparatus manages the operation pattern for the documents as the document processing information, that is, a series of job events related to the document exposure, in the form of document management tables.

Figure 1:
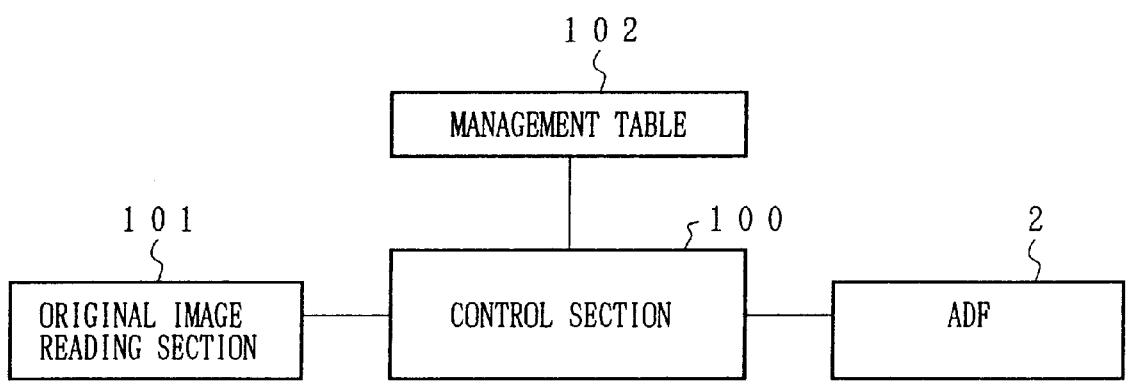
FIG. 1 is a block diagram schematically showing an arrangement of an image processing apparatus in accordance with an example embodiment of the present invention.

To be more specific, as shown in FIG. 1, the present facsimile complex apparatus is arranged to have a control section 100 (management table creating means, reading action control means) at the center, and an original image reading section 101, the ADF 2, and a management table 102 are connected to the control section 100. The control section 100 manages the documents based on the information recorded in the management tables 102.

The control section 100 also includes the CPU 74 shown in FIG. 4 in addition to storage means, such as the ROM 75 and RAM 76.

The original image reading section 101 includes the document exposing section 3 and the optical system of the image forming apparatus 1, and therefore, reads the documents. The original image reading section 101 outputs the reading action information thus obtained to the control section 100.

The ADF 2 outputs the detection signals from the sensors for detecting the document position information to the control section 100.

Thus, the control section 100 creates the document management information, such as the position information of the documents and jam information inside the work area of the RAM 76 based on the information obtained by the original image reading section 101 and the information obtained by the ADF 2 in accordance with the control programs in the ROM 75. Then, the control section 100 writes the document management information into the management tables 102 as the processing information so as to manage the documents based on the processing information.

Figure 8:
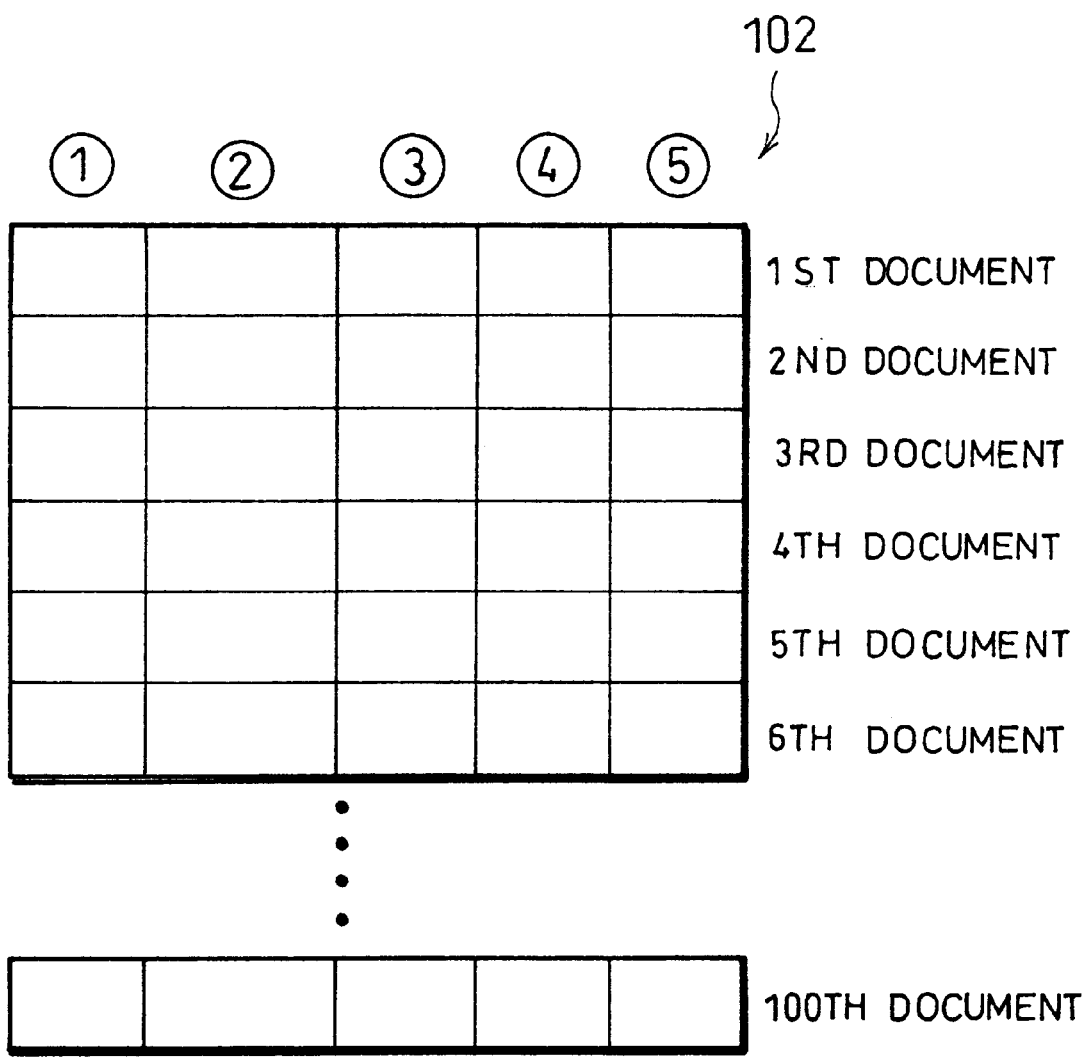
FIG. 8 is a view explaining management tables of FIG. 1 in detail.

As shown in FIG. 8, the management table 102 recording the document management information is created for each document. In the present embodiment, the explanation will be given on the assumption that the subject documents include 100 sheets (100-page document).

In the first place, the information stored in the management table 102 will be explained in the following.

The management table 102 is created when the ADF 2 is used, and provided with information storage sections (information bits) for storing: a management table mark ①, a scanner management section ②, a document management section ③, a scanner managing bit ④, and a document managing bit ⑤.

The information stored in the information storage sections ①–⑤ will be explained in the following with reference to FIGS. 9 through 12.

The management table mark ① is an information storage section for storing information indicating whether the corresponding management table 102 is valid, invalid, or unknown. When the existence of the document is unknown, an unknown mark is stored into the management table mark ①, and when the existence of the document is certain, a valid mark is stored into the management table mark ①. When the existence of the document is cancelled due to the document jam or the like, an invalid mark is stored into the management table mark ①.

As shown in FIG. 10, examples marks stored into the management table mark ① are: "1" as the valid mark; "2" as the invalid mark; "0" as the unknown mark; and "3" as an exposure complete mark indicating that the exposure of the document has been completed.

Figure 9:
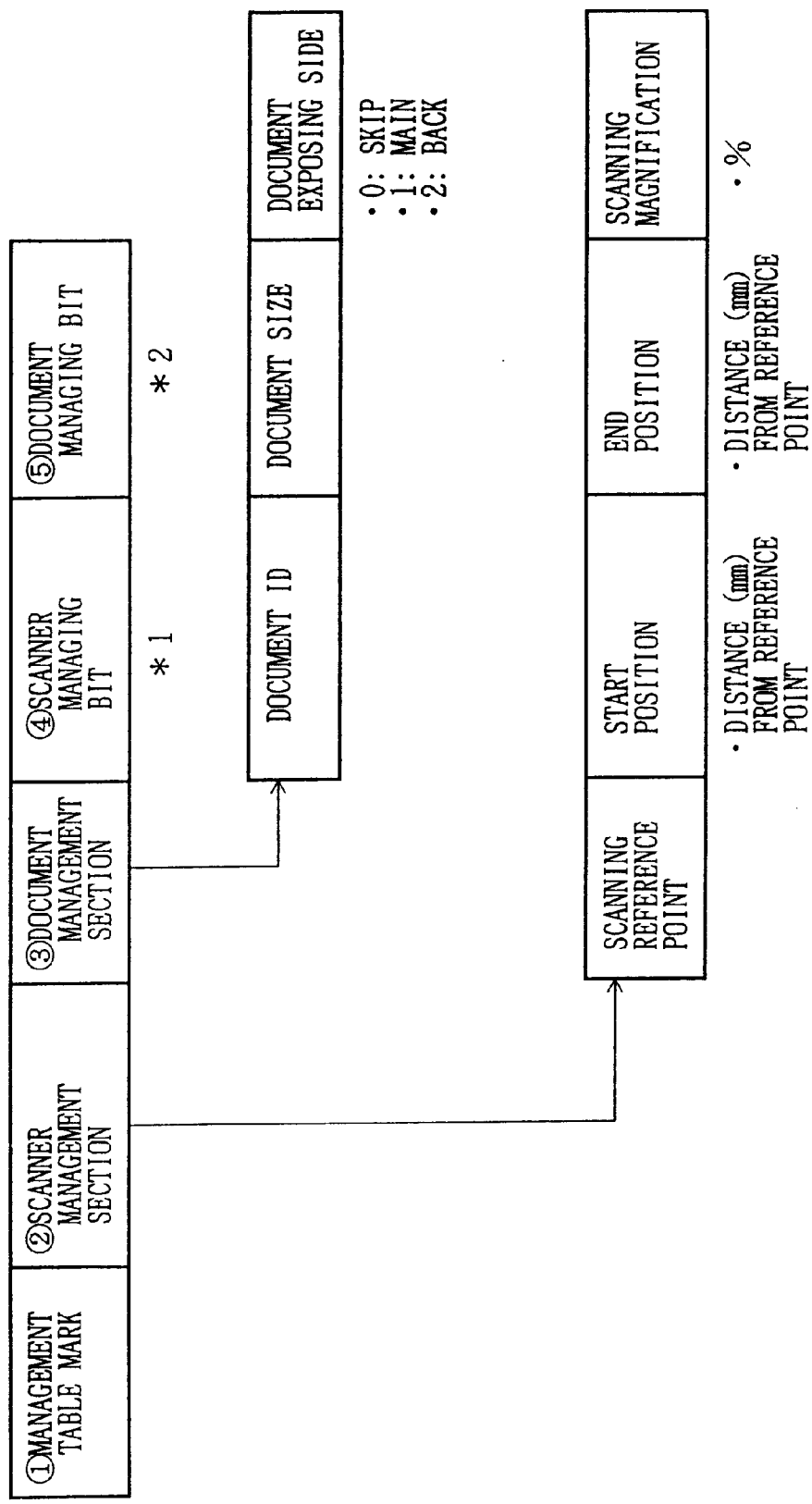
FIG. 9 is a view explaining the management tables of FIG. 8 more in detail.
Figure 11:
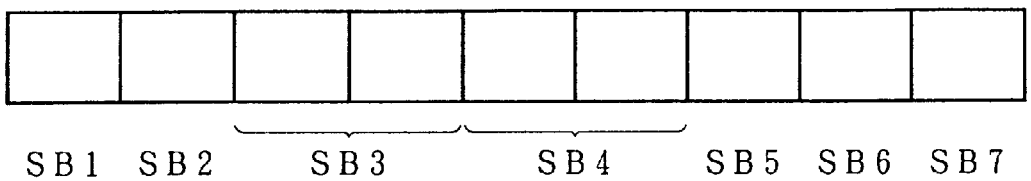
FIG. 11(a) is a view explaining a scanner managing bit of the management tables of FIG. 9.
FIG. 11(b) is a view explaining the content of the scanner managing bit of FIG. 11(a)

The scanner management section ② is an information storage section for storing information related to the optical system of the image forming apparatus 1, in short, so-called the scanner action. For example, as shown in FIG. 9, the scanner management section ② stores information including a scanning reference point, a start position (scanning start position), an end position (scanning end position), and a scanning magnification (%). The start position and end position represent a distance (mm) with respect to the reference point.

The document management section ② stores information related to the document. The document management section ③ is an information storage section for storing, for example, document ID information, document size information, and document exposing side information. One of the following is stored as the document exposing side information: "0" indicating the information for skipping the exposure of the document; "1" indicating the information for exposing the main side of the document; "2" indicating the information for exposing the back side of the document.

The scanner managing bit ④ is an information storage section for storing information related to the management of the scanner composed of the optical system of the image forming apparatus 1. The scanner managing bit ④ stores information from which the state of the scanner, the state of the copy lamp 12, and the state of the lens can be immediately judged.

The scanner managing bit ④ is composed of 7 bits denoted as SB1–SB7 as shown in FIG. 11(a), for example, and each bit stores information as shown in FIG. 11(b).

SB1 is a bit showing the state of the lens, and it stores either "0" indicating that the lens is not in operation (deactivated), and "1" indicating that the lens is in operation.

SB2 is a bit indicating an operation request to the lens, and it stores either "0" indicating that no operation request is issued or "1" indicating that an operation request is issued.

SB3 is a bit indicating a scanner mode, and it stores "01" indicating that the scanner reads only when it goes forward; "11" indicating that the scanner reads when it goes forward and returns backward; or "10" indicating that the scanner reads only when it goes backward.

SB4 is a bit indicating the state of the scanner, and it stores "000" indicating that the scanner is deactivated; "001" indicating that the scanner is warming up; "010" indicating that the scanner is feeding; "110" indicating that the scanner is returning to its home position; or "100" indicating that the scanner has returned to its home position.

SB5 is a bit indicating the state of the copy lamp 12, and it stores "0" indicating that the copy lamp 12 is in the start-up state (rising up) or "1" indicting that the copy lamp 12 is in the normal state.

SB6 is a bit also indicating the state of the copy lamp 12, and it stores "0" indicating that the copy lamp 12 stays OFF or "1" indicating that the copy lamp 12 stays ON.

SB7 is a bit indicating whether the current scanning is the last scanning or not, and it stores "0" indicating that the current scanning is the last or "1" indicating that the current scanning is not the last.

Also, the document managing bit ⑤ is an information storage section for storing information related to the position of the document to define the state of the document.

In other words, as shown in FIG. 12(a), the document managing bit ⑤ is composed of 9 bits denoted as GB1–GB9, and each bit stores information as shown in FIG. 12(b).

GB1 is a bit indicating the state when the document has been set, and it stores "0" indicating that the document is in the position other than the exposing position or "1" indicating that the document is set in the exposing position.

GB2 is a bit indicating the document position information, and it stores: "000" indicating that the document is in the stand-by position for the action, namely, the feeding action; "001" indicting that the completion of pre-feeding #1 at which the document is in a first pre-feeding position; "010" indicating that the completion of pre-feeding #2 at which the document is in a second pre-feeding position; "011" indicating that the document has been fed; "100" indicating that the document has been flipped; or "110" indicating that the document has been released.

GB3 is a bit indicting the last document judgment, and it stores "0" indicating that the document is the last document or "1" indicating that the document is not the last document.

GB4 is a bit indicating an interleaving mark for judging whether the document is an interleaved document or not, and it stores "0" indicating that the document is not an interleaved document or "1" indicating that the document is an interleaved document. The interleaved document is defined as a document inserted into a series of the documents by interruption.

GB5 is a bit indicating document jam detection, and it stores "0" indicating that no jam is occurring or "1" indicting that jam is occurring.

GB6 is a bit indicating the releasing of the document, and it stores "0" indicating the releasing of the document is inhibited or "1" indicating that the releasing of the document is allowed.

GB7 is a bit indicating flipping of the document, and it stores "0" indicting that the flipping of the document is inhibited or "1" indicating that the flipping of the document is allowed.

GB8 is a bit indicating the feeding of the document, and it stores "0" indicating that the feeding of the document is inhibited or "1" indicating that the feeding of the document is allowed.

GB9 is a bit indicating the pre-feeding of the document, and it stores "0" indicting that the pre-feeding of the document is inhibited or "1" indicating that the pre-feeding of the document is allowed.

Each document is managed separately based on the management table 102 storing the aforementioned information.

As described above, the document management table 102 is created for each of the documents to be copied, and the information of each document is stored/updated in accordance with the progress of the reading action, such as before and after the job starts. The content of the management table 102 is erased when all the documents have been read and copied.

Next, how the management table 102 is created and how the information is stored therein will be explained with reference to FIGS. 1, 8, and 13 through 15.

In the first place, how the management table 102 is created will be explained in the following.

Figure 13:
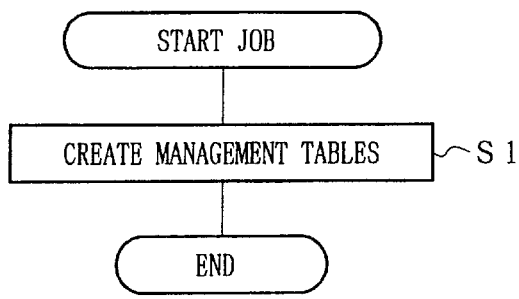
FIG. 13 is a flowchart detailing the procedure of creating the management tables of FIG. 8.

As shown in FIG. 13, the control section 100 creates the management table 102 by tabulating the operation patterns of each of document to be controlled when the job starts (S1). Here, as shown in FIG. 8, as many management tables 102 as the number of the documents to be copied are created, and hence, hundred management tables 102 are created for the first to hundredth documents.

Then, the management tables 102 thus created are stored in the RAM 76 in the control section 100. At this point, not all the bit information is stored in each management table 102. To be more specific, the bit information is stored therein and updated in response to the state of each device, such as the image forming apparatus 1 and ADF 2.

Next, how the content stored in the management table 102 is updated will be explained.

Figure 14:
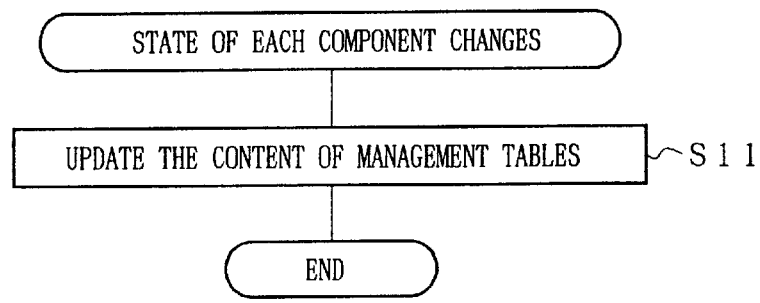
FIG. 14 is a flowchart detailing the procedure of updating the content of the management tables of FIG. 8.

As shown in FIG. 14, when the state of the ADF 2 or image processing apparatus 1 changes after the job (document reading action) starts upon detection of the existence of the document or the last document, the control section 100 updates the content of information stored in the management table 102, which has been created already in response to the event executed by the ADF 2 or image processing apparatus 1 (S11).

Next, the control routines, such as document handling and scanner control routines, carried out with reference to the information stored in the management table 102 will be explained in the following.

Figure 15:
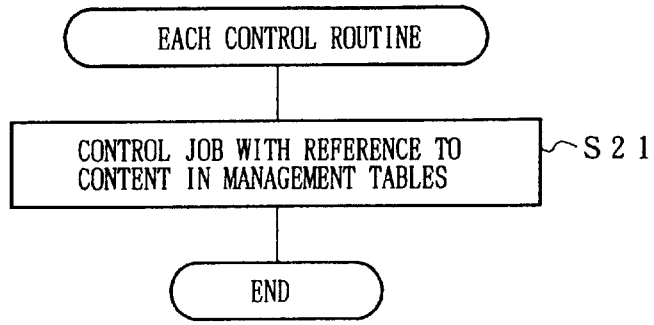
FIG. 15 is a flowchart detailing the procedure of controlling the automatic document feeder and image processing apparatus with reference to the content in the management tables of FIG. 8.

As shown in FIG. 15, the control section 100 executes the control routines, such as the document handling and scanner control routines, with reference to the content in the management table 102 during the job (S21).

Thus, each control routine for the copying job is executed based on the management table 102 created for each document. Hence, in case that the present facsimile complex apparatus is set in an interleave mode (a mode in which a document is inserted during a normal copying job by designating the serial page number of the documents and an interleave tray), of all the control routines, the routine for the sheet transportation refers to the above management table 102 by merely storing an interleave mark in the management table 102 for the interleaved document, more specifically, by storing "1" to GB4 shown in FIGS. 12(a) and 12(b), whereby the feeding tray can be readily switched to the interleave tray.

Thus, when the management table 102 is created for each document and each control routine is executed with reference to the management tables 102, the controls can be effected in the facsimile complex apparatus.

Here, the management table 102 will be explained more specifically.

In the first place, the management tables 102 at the start of the job for the A-4 size documents to be copied in the DD or DS mode in the ADF mode will be explained. Here, assume that the document management section ③ shown in FIG. 9 has areas for storing the document ID information, document size information, and document exposing side information, all of which are determined when the job starts.

Figure 16:
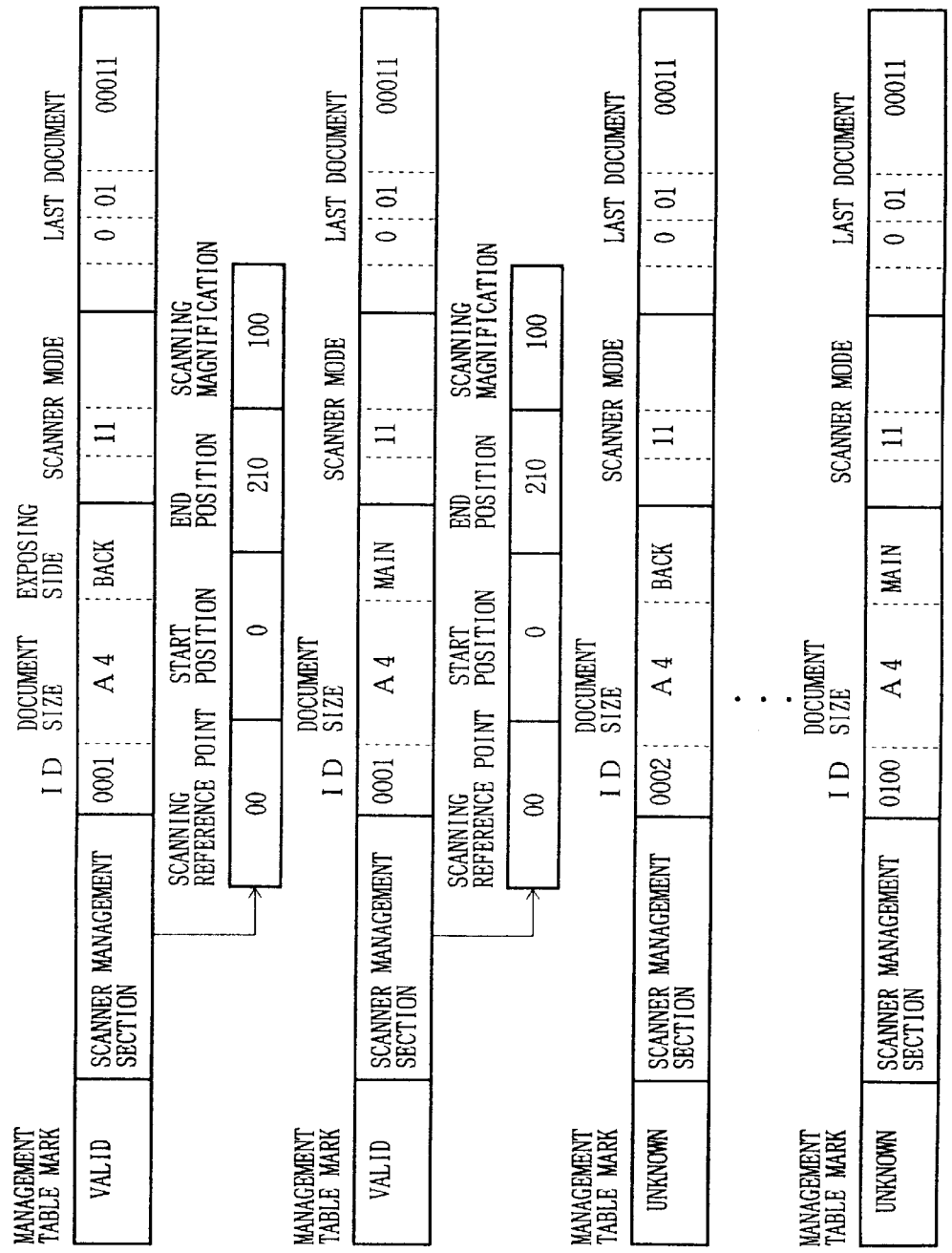
FIG. 16 is a view explaining examples of the management tables of FIG. 8.

When the job starts, as shown in FIG. 16, the document ID information for the first the document is written into the management tables 102 as "0001", and the document ID information for the second and following documents are written therein as "0002", "0003", . . . , "0100", respectively. When two management tables 102 are created for one document to indicate that both the main and back sides are the document exposing sides separately, it is arranged in such a manner that odd-numbered management tables 102 indicate that the back side is the document exposing side, and the even-numbered management tables 102 indicate that the main side is the document exposing side.

Here, in case of the duplex exposure for exposing each document at both sides, the two management tables 102 exhibiting "MAIN" and "BACK" as the document exposing side information for one document are identified by the same document ID information. In the present management tables 102, the maximum number of the documents is one hundred.

Further, the document size information stored in the document management section ③ is written when the job starts. The document size information is set for each document, and even if the document size information changes by the detection or the like during the document feeding, it can be readily found from the document ID information for which document the document size information is changed.

The document size information makes it faster to find the document size when the apparatus is set in the automatic sheet selection or automatic magnification selection mode. Thus, the apparatus can compute an adequate sheet size or magnification for the document in question smoothly, thereby operating as a highly reliable apparatus.

As has been explained, when the document is exposed at both sides in the ADF mode, the document is exposed at the back side first, and thence at the main side. In other words, in case of a plurality of documents, the exposure is carried in the following manner: the back side and main side of the first document, the back side and main side of the second document, . . . , and the back side and main side of the hundredth document. Incidentally, when the documents are exposed at both sides in the RDH mode, the documents are exposed in the following manner: the back side of the first document, the back side of the second document, . . . , the back side of the hundredth document, then the main side of the first document, the main side of the second document, . . . , and the main side of the hundredth document.

As previously mentioned, the document managing bit ⑤ in the management table 102 stores information as to whether the document in question is the last document. Since FIG. 16 shows the management tables 102 created when the job has started, the management table 102 for the hundredth document has not stored the bit indicating that it is the last document.

However, once the job starts and the documents are successively read, and when the hundredth document is judged as the last document in the document handling routine, the information indicating that it is the last document is immediately stored into the document managing bit ⑤ in the management table 102 for the hundredth document.

If the information of the last document is written into the management table 102 in the above manner, the completion of the job can be readily judged. Moreover, there is another advantage that the feeding trays can be switched easily when only the last document should be copied onto a covering sheet fed from a different feeding tray.

The present facsimile complex apparatus can be set in a document count mode in which the number of the documents is counted. The management table 102 in the document count mode will be explained in detail in the following.

Figure 17:
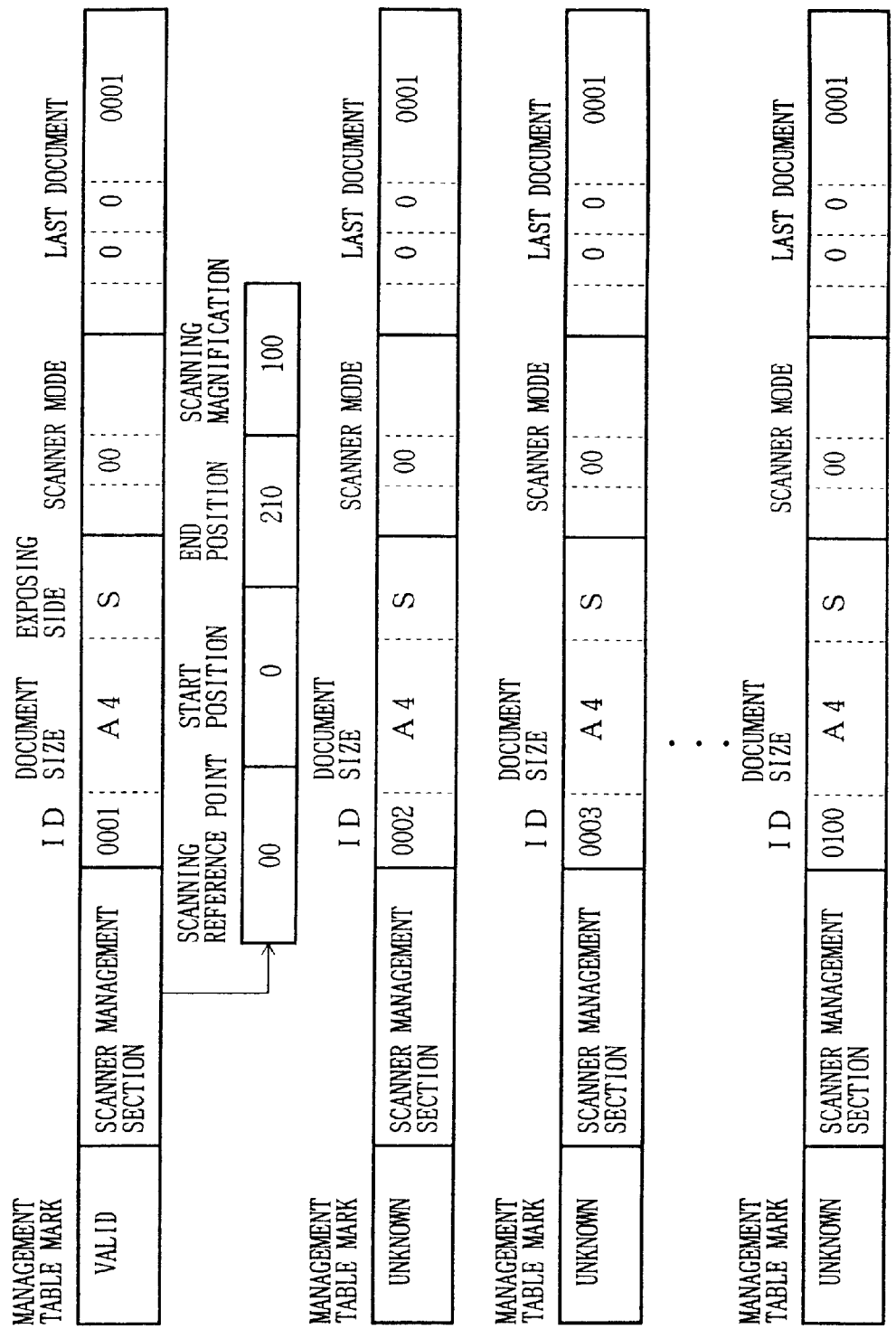
FIG. 17 is a view explaining other examples of the management tables of FIG. 8.

As shown in FIG. 17, each management table 102 in the document count mode store "S" indicating idle (skipping) transportation without reading to the information bit indicating the document exposing side of the corresponding document in the document management section ②. The idle feeding is continued until the last document is detected. When the last document is detected, the bit indicating the last document is written into the information bit in the management table 102 for the detected document. The value of the document ID information of the document detected as the last document corresponds to the number of the documents.

The present facsimile complex apparatus includes table referring means which shifts to the processing information in the management table 102 for a specific document in response to the progress in each event of the ADF 2 and image processing apparatus 1 to specify the above processing information. The table referring means is composed of the aforementioned CPU 74 of FIG. 5. The control section 100 controls the ADF 2 and image processing apparatus 1 based on the processing information of the management table 102 specified by the table referring means. The control section 100 can detect the state of the document by referring to the management table 102 specified by the table referring means.

The table referring means has a plurality of pointers for specifying the processing information recorded in the management table 102 for each event by the ADF 2 or image processing apparatus 1 for the document. Thus, the control section 100 controls the ADF 2 and image processing apparatus 1 based on the processing information in the management table 102 specified by the pointers.

For example, a document feeding pointer shifts to the processing information in the management table 102 for a specific document, and each device of the present facsimile complex apparatus is controlled based on the processing information in the management table 102 for the document specified by the document feeding pointer.

The document feeding pointer includes three pointers: a document feeding start pointer, a document release pointer, and a document release complete pointer. A scanner event pointer includes two pointers: a scanner pointer and a recovery pointer.

Each pointer exhibits "+1" when the event assigned to itself occurs, and shifts to the following management table 102. Thus, 'pointer exhibits "+1"' can be rephrased to 'the pointer shifts to the management table 102 for the next document'.

In the present embodiment, the document feeding start pointer exhibits "+1" when the feeding of the documents starts; the document release pointer exhibits "+1" when the releasing of the document starts; and the document release complete pointer exhibits "+1" when the releasing of the document has been completed. Consequently, it can be readily found that the documents corresponding to the management tables 102 existing between the document feeding start pointer and document release complete pointer are somewhere in the transportation path.

The scanner pointer exhibits "+1" each time the scanner has returned to its home position, and the recovery pointer exhibits "+1" when the document exposure is completed. Consequently, the document which is being exposed can be judged immediately by these two scanner event pointers.

Figure 18:
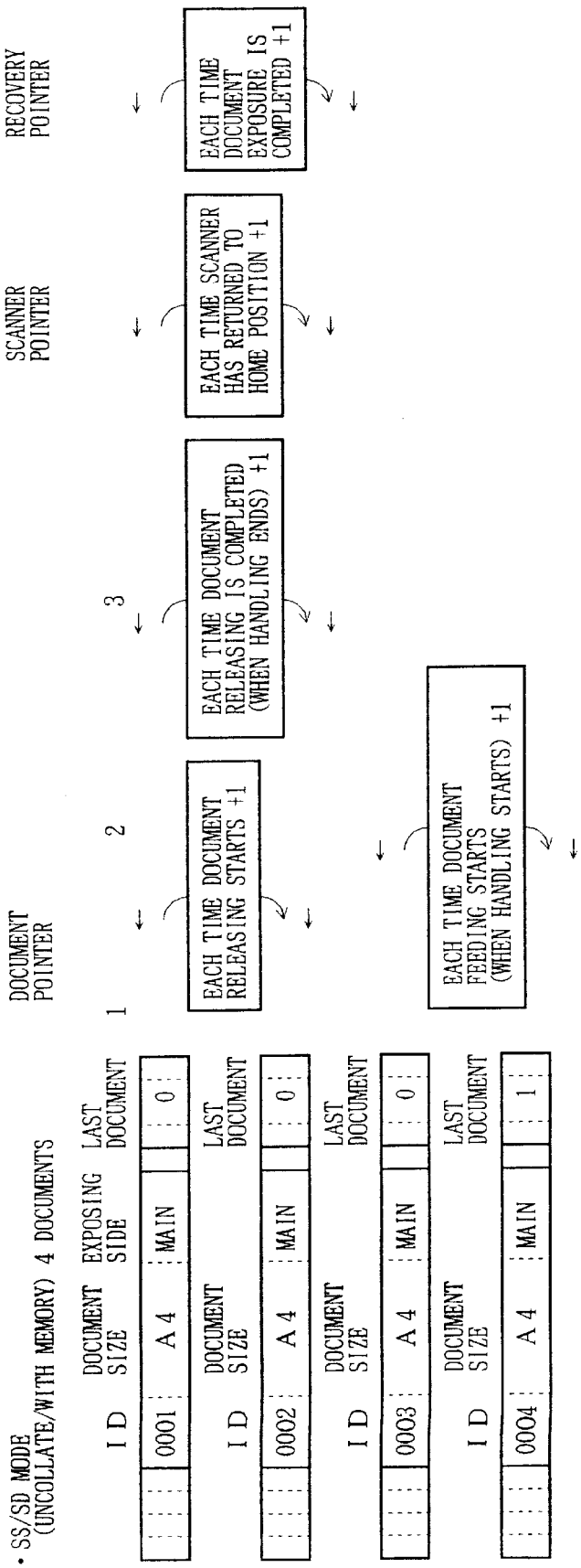
FIG. 18 is a view explaining further examples of the management tables of FIG. 8 and explaining pointers used when referring to the management tables.

FIG. 18 shows the management tables 102 and the position of each pointer when four documents are copied in the SS/SD mode as the document exposure mode.

The management tables 102 shown in FIG. 18 have recorded that the fourth document is the last document. Thus, under these conditions, each pointer exhibits "+1". In other words, the pointer shifts to the next management table 102 by exhibiting "+1" (specifying the next management table 102).

As shown in FIG. 18, when some of the documents have to be returned due to the document jam occurred in the above-arranged facsimile complex apparatus, the number of the documents to be returned can be readily computed by computing a difference between the values of the document ID information in the management tables 102 specified by the document uppermost stream pointer, that is, the pointer that exhibits "+1" when the document feeding starts, and the recovery pointer, that is, the pointer that exhibits "+1" when the transfer sheet corresponding to the document has been released. Moreover, since the document ID information is available, it can be readily judged which document(s) should be returned from the document ID information.

In FIG. 18, at least the pointers indicating the document uppermost stream, the completion of the releasing of the document, and the releasing of the document are necessary as the document feeding pointers. In other words, at least three pointers are necessary: the pointer which exhibits "+1" when the document feeding starts; the pointer which exhibits "+1" when the document has been released; and the pointer which exhibits "+1" when the releasing of the document has started.

For example, the number of the documents which are being handled can be found by computing a difference between the values of the document ID information in the management tables 102 existing between the release completion pointer and document feeding start pointer. In addition, the position of each document can be found accurately.

The number of the documents until the completion of the feeding can be judged from the values of the document ID information in the management tables 102 existing between the release start pointer and document feeding start pointer.

Since the pointers are designed to increment only by one constantly while the job is being carried out, the state of the document can be found readily and precisely compared with the conventional case where the same is computed by incrementing or decrementing the counters by one.

Furthermore, since the state of the document can be found by the pointers of the least number, the control can be carried out efficiently by omitting unnecessary pointers.

Next, the management table 102 in the OC mode will be explained in the following.

Figure 19:
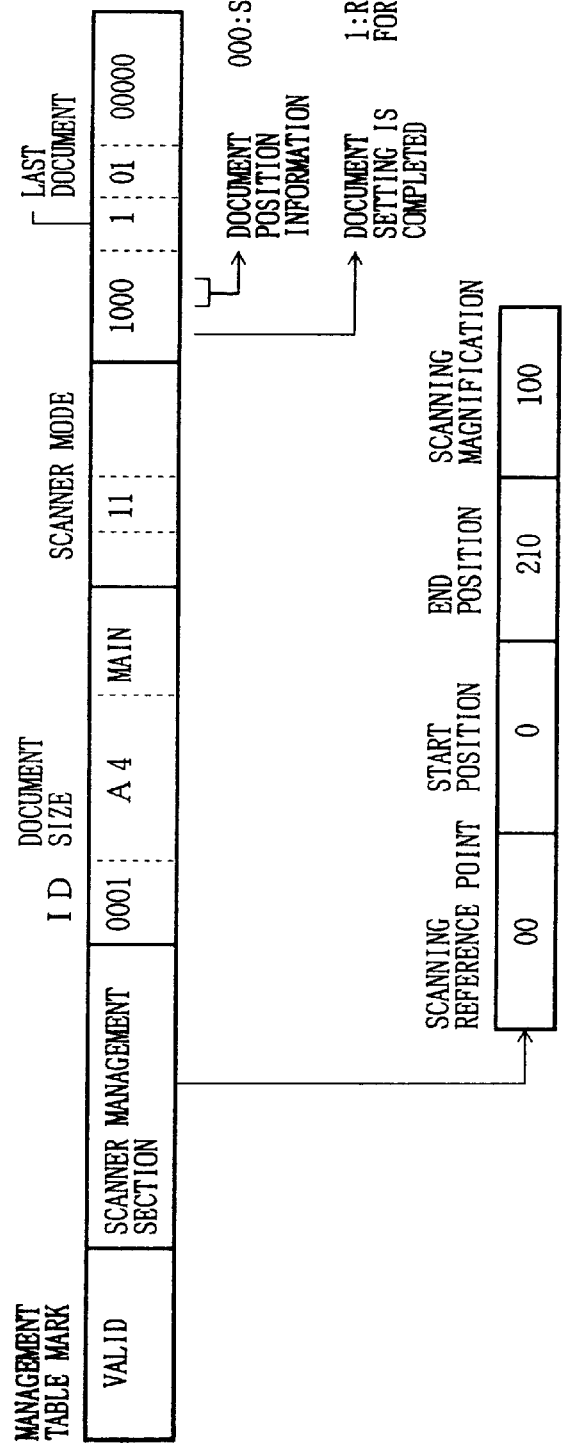
FIG. 19 is a view explaining still other examples of the management tables of FIG. 8.

As shown in FIG. 19, the document reading action control in the OC mode can be carried out by a single management table 102 by setting the information "1" indicating the last document to the document managing bit ⑤ and the valid mark to the management table mark ① when the job starts.

Next, the management tables 102 in a book copy mode will be explained in the following.

In the book copy mode, two pages of the opened book are copied as one document, and as shown in FIG. 20, two management tables 102 having different document ID information are prepared for one document, and the information indicating the last document is set in the management table 102 for the second page identified by the document ID information "0002".

In the management table 102 for the second page identified by the document ID information "0002", the start position of the scanner management section ② is set to the same value as the value for the end position of the scanner management section ② of the management table 102 for the first page identified by the document ID information "0001". For example, as shown in FIG. 20, in the management table 102 exhibiting the document ID information "0001", the start position and the end position of the scanning by the scanner are set to "0" and "210", respectively, whereas in the management table 102 exhibiting the document ID information "0002", the start position and ending position of the scanning by the scanner are set to "210" and "420", respectively.

Consequently, when the documents are re-copied from the second page in the book mode, only the management table 102 exhibiting the document ID information "0002" has to be referred to. Hence, only the pointer for specifying the management table 102 exhibiting the document ID information "0002" is necessary. Consequently, the document reading action can be controlled in a more reliable manner.

Note that the scanning width can be readily changed by changing the start and end positions set in each management table 102.

Figure 21:
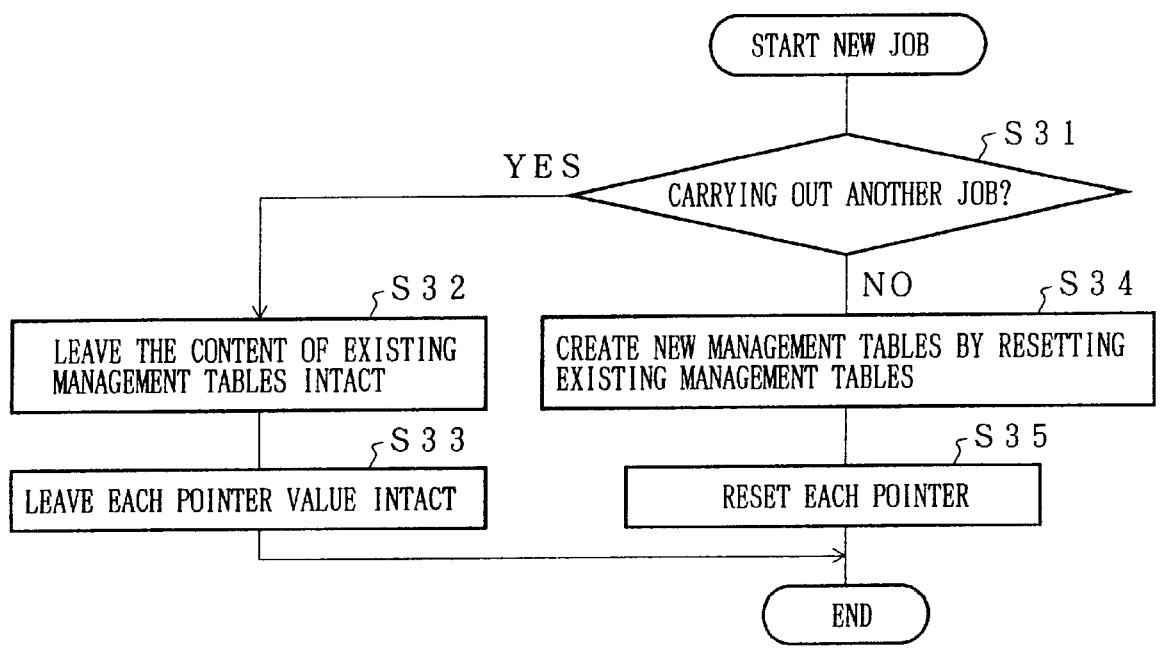
FIG. 21 is a flowchart detailing the procedure when a new job starts in the facsimile complex apparatus of FIG. 2.

Here, the process when the present facsimile complex apparatus starts the document reading action (job) for a new set of documents will be explained with reference to FIG. 21.

In the first place, whether the apparatus is carrying out another job or not is judged before it starts a new job (S31).

When it turns out that the apparatus is carrying out another job in S31, it is judged that the job is continuing, and the content of the management tables 102 is left intact (S32), and so is the value of each pointer (S33).

On the other hand, when it turns out that the apparatus is not carrying out any other job in S31, new management tables 102 are created by resetting the management tables 102 used for the preceding job (S34), and each pointer is reset as well (S35).

When the job for the documents, for which the management tables 102 have been created, has not been completed, the content in the management tables 102 and the value of each pointer are left intact. On the other hand, when a new job is started, the contents in the management tables 102 and the value of each pointer used in the preceding job are reset. Accordingly, whether a new job can be started or the preceding job is continuing can be judged by merely checking the job state.

Moreover, when the apparatus is not carrying out any other job when the job in question is started, the job in question is judged as a new job, whereupon new management tables 102 are created by clearing the management tables 102 and value of each pointer used in the preceding job. Thus, the new job can be carried out without being affected from the preceding job.

In the above-arranged facsimile complex apparatus, it is preferable to create as many management tables 102 as the number of the documents. However, since a memory capacity of the RAM 76 serving as the storage means equipped to the apparatus has a limit, the RAM 76 should be used efficiently.

Thus, how the RAM 76 is used efficiently will be explained in the following.

Herein, to use the RAM 76 efficiently, a maximum number of the management tables 102 which can be created in the RAM 76 is set. When the number of the management tables 102 for the documents exceeds a predetermined first value (which is smaller than the number of the documents), the management tables 102 created thus far are re-written to the state where the number of the management tables 102 exceeds a predetermined second value (which is smaller than the number of the documents and larger than the first value). When the number of the management tables 102 for the documents exceeds the second value, the management tables 102 existing between the first and second values are re-written as explained below.

Figure 22:
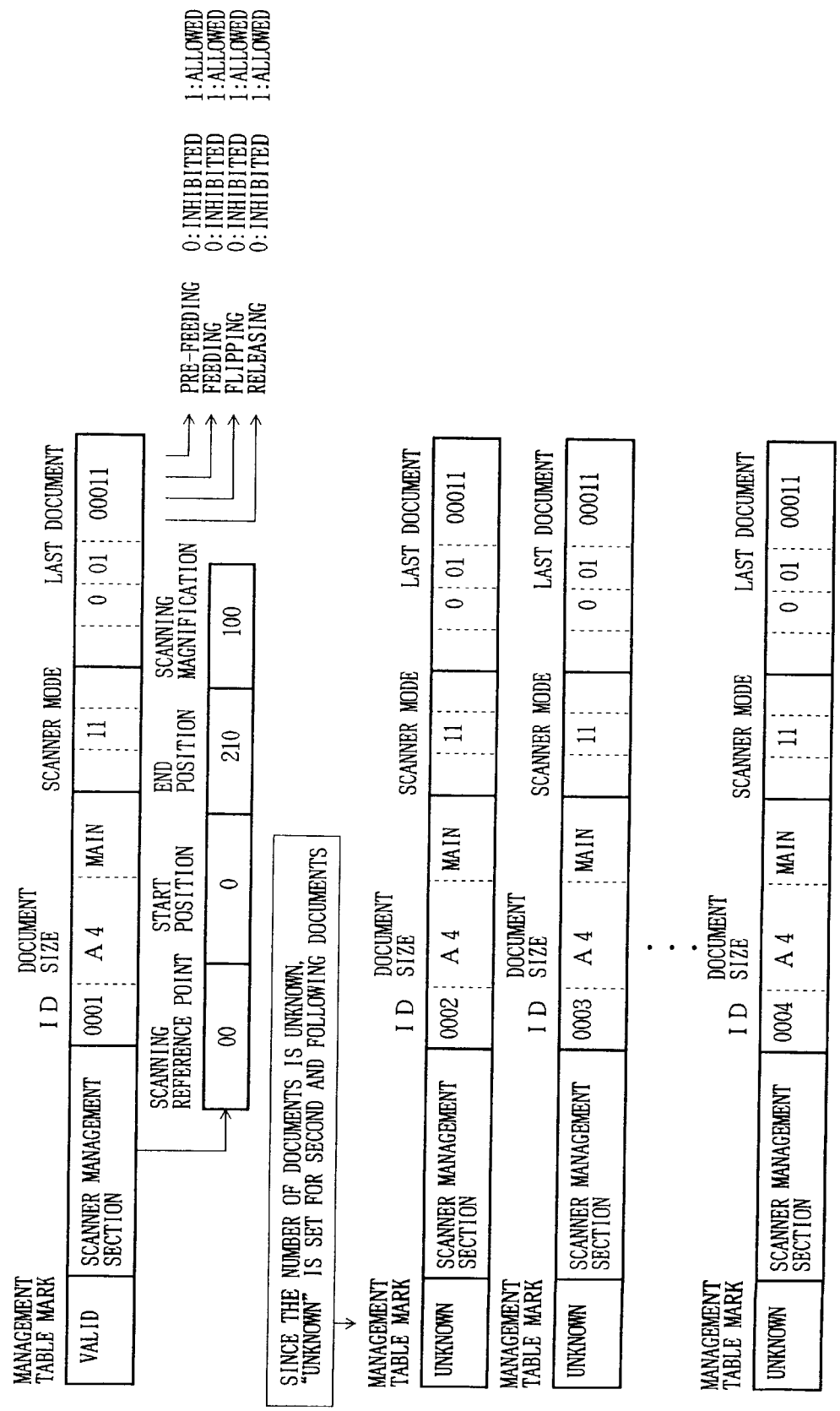
FIG. 22 is a view explaining the management tables used to explain the efficient use of a storage area in a RAM provided to the facsimile complex apparatus of FIG. 2.

Incidentally, when the documents outnumbers the management tables 102 which can be created in the RAM 76, the present facsimile complex apparatus judges that the number of the documents is unknown. Accordingly, as shown in FIG. 22, the management tables 102 created in the RAM 76 exhibits "UNKNOWN" for the second and following documents when the first document is read, because the number of the documents is unknown. Thus, the information "0" indicting "UNKNOWN" is stored in the management table mark ① for each of the second and following documents.

Figure 23:
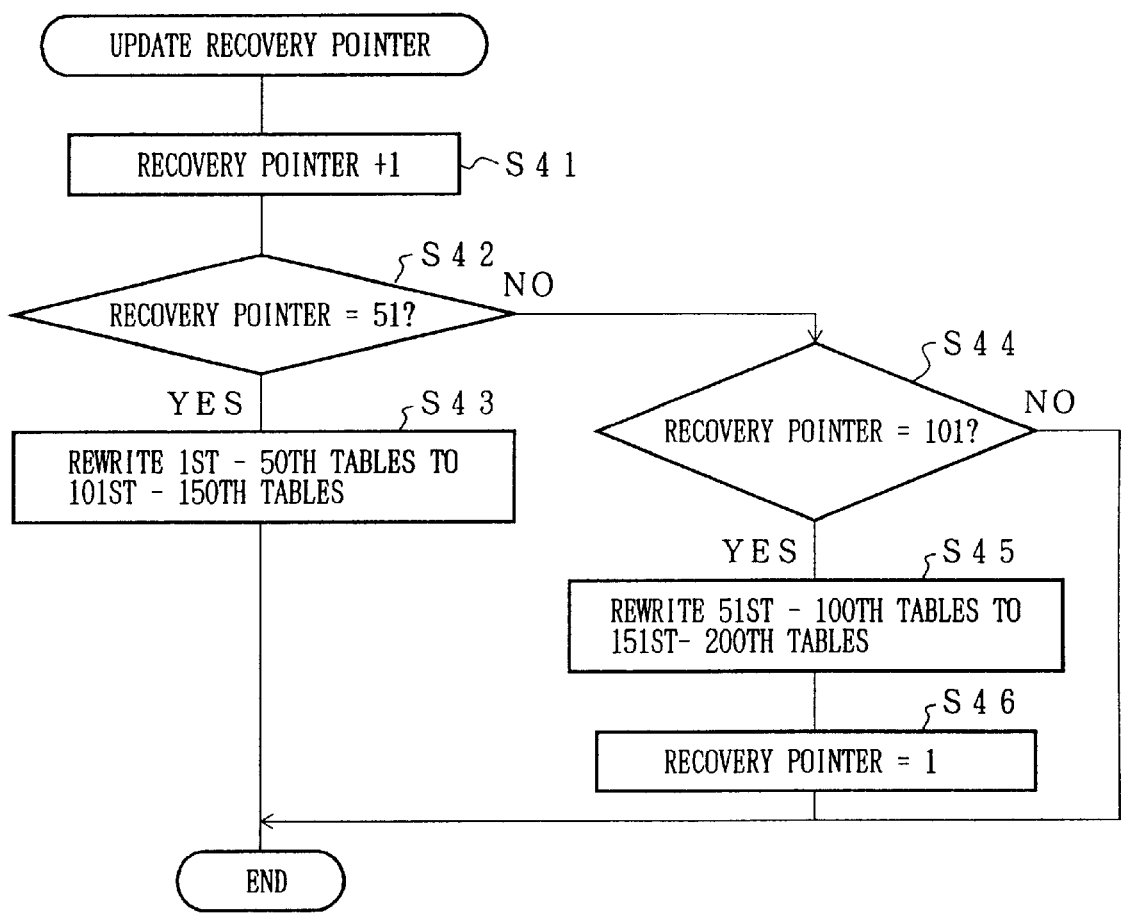
FIG. 23 is a flowchart detailing the procedure taken based on the management tables of FIG. 22.

Here, how the management tables 102 are created when the documents outnumbers the management tables 102 which can be created in the RAM 76 will be explained with reference to FIGS. 22 and 23. In the following explanation, assume that the first value is set to 50 (150), the second value is set to 100 (200), and the maximum number of the management tables 102 which can be created in the RAM 76 is set to 100.

Also, assume that the management tables 102 shown in FIG. 22 are set in the SS mode or SD mode in the ADF mode, the document size and the sheet size are set to A4, and the magnification is set to 100%. The second value equals to the maximum number of the management tables 102 which can be created in the RAM 76.

In this process, each time the value of the recovery pointer exceeds the first value, 50 (150), up to the fiftieth (hundred and fiftieth) management table 102 are re-written to those exhibiting the document ID information=0101 (0201) . . . , and 150 (0250). Further, when the value of the recovery pointer exceeds the second value, 100 (200), the fifty-first to hundredth (hundred and fifty-first to two hundredth) management tables 102 are re-written to those exhibiting the document ID information=151 (251), . . . , The value of the recovery point is a remainder when the current pointer value is divided by 100.

To be more specific, the first to hundredth management tables 102 have been already created. Under these conditions, when the value of the recovery pointer exceeds 50, the content in the first to fiftieth management tables 102 is no longer necessary, and therefore, the first to fiftieth management tables 102 are re-written for managing the hundred-first to hundred and fiftieth documents. In other words, the content of the above management tables is re-written to manage the documents read by the original image reading means in the order exceeding the order manageable with the number (100) of the management tables.

Then, when the value of the recovery pointer exceeds 100, the content in the fifty-first to hundredth management tables 102 is no longer necessary. Thus, the fifty-first to hundredth management tables 102 are re-written for managing the hundred fifty-first to two hundredth documents. In other words, the content of the above management tables is re-written to manage the documents read by the original image reading means in the order exceeding the order manageable with the number (100) of the management tables.

Then, when the value of the recovery pointer exceeds 150, the content in the hundred-first to hundred and fifty-first management tables 102 is no longer necessary. Thus, the hundred-first to hundred and fifty-first management tables 102 are re-written for managing the two hundred-first to two hundred and fiftieth documents.

Then, when the value of the recovery pointer exceeds 200, the content in the hundred and fifty-first to two hundredth management tables 102 is no longer necessary. Thus, the hundred and fifty-first to two hundredth management tables 102 are re-written for managing the two hundred and fifty-first to three hundredth documents. The above control is repeated until all the documents are processed.

Consequently, the number of the management tables 102 never exceeds 100, and only the document ID information are transferred. Further, since the management tables 102 are updated in response to the document ID information, the control is simplified and the reliability can be improved. The program for creating the management tables 102 in the above manner are stored in the ROM 75 and retrieved when necessary.

Next, how the management tables 102 are created when the number of the documents is 200 whereas the maximum number of the management tables 102 which can be created is 100 will be explained with reference to the flowchart of FIG. 23.

In the first place, when the recovery pointer is updated, a program for creating the management table 102 is retrieved from the ROM 75, and the recovery pointer is incremented by one each time one management table 102 is created (S41).

The recovery pointer is updated at a point when the transfer sheet is released and the document becomes no longer necessary, or in case of a digital system, at a point when the exposure is completed and the exposed image data are stored in the RAM 76.

Then, whether the value of the recovery pointer reaches 51 or not is judged (S42). When the value of the recovery pointer reaches 51, the contents of the first to fiftieth management tables 102 are re-written in such a manner to correspond to the hundred-first to hundred and fiftieth management tables 102 (S43).

When it turns out that the value of the recovery pointer has reached 51, whether the value of the recovery pointer has reached 101 or not is further judged (S44). Here, if the value of the recovery pointer has not reached 101, the operation ends.

When it turns out that the recovery pointer has reached 101 in S44, the content of the fifty-first to hundredth management tables 102 are re-written in such a manner to correspond to the hundred and fifty-first to two hundredth management tables 102 (S45).

Then, the value of the recovery pointer is reset to "1", in other words, the current value of the recovery pointer "101" is divided by 100, and the remainder "1" is set as the value of the recovery pointer (S46), whereupon the operation ends.

If the creation of the management tables 102 are controlled in the above manner, the number of the management tables 102 can be, at most, equal to the second value 100, the maximum number of the management tables 102 which can be created in the RAM 76, thereby realizing the efficient use of the RAM 76.

Figure 24:
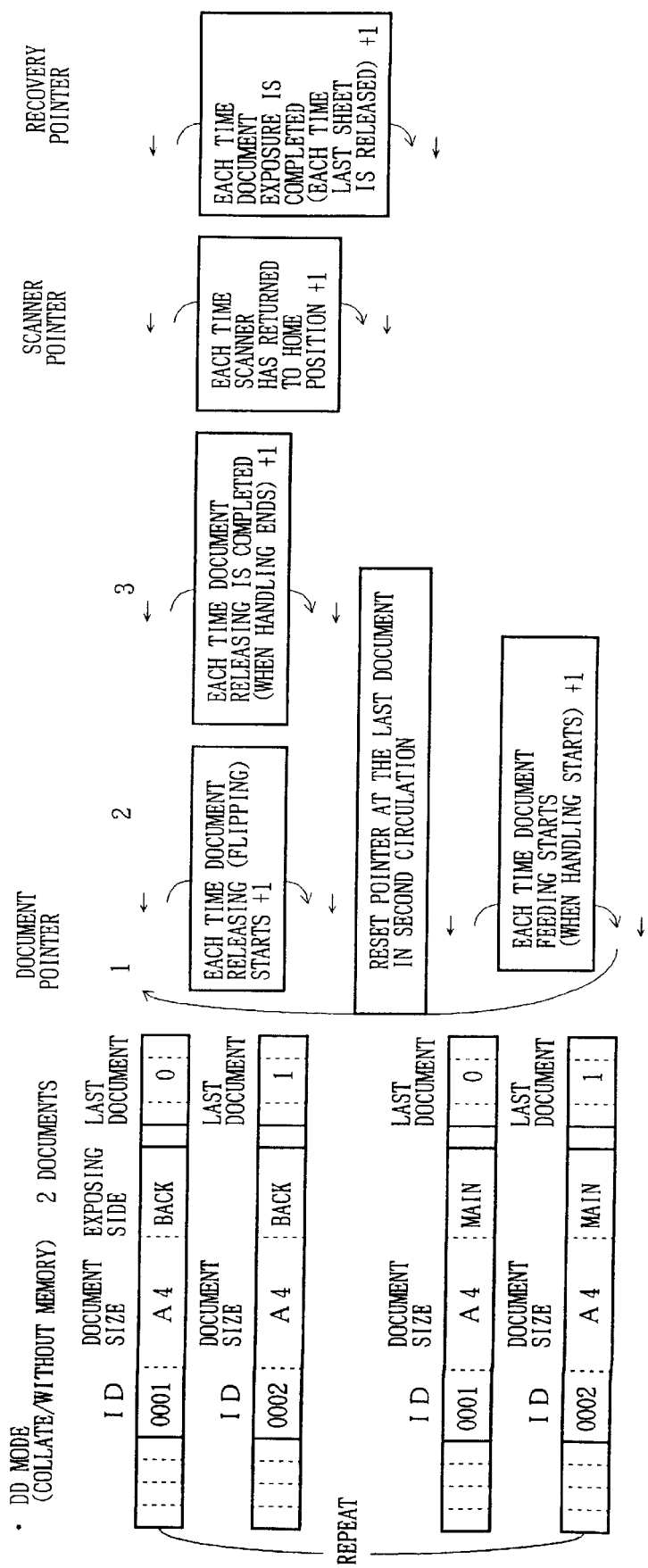
FIG. 24 is a view explaining still other examples of the management tables of FIG. 8 and explaining pointers used when referring to the management tables.
Figure 25:
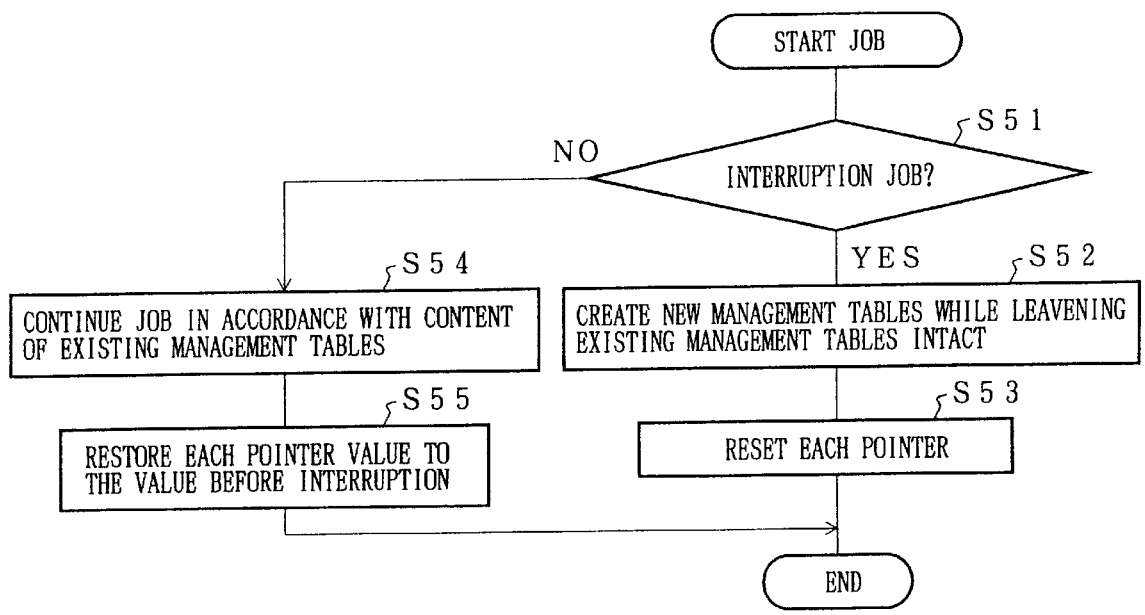
FIG. 25 is a flowchart detailing the procedure of an interruption job by the facsimile complex apparatus of FIG. 2.

Here, the content of the management tables 102 and the operation in the RDH mode for the copying job will be explained with reference to FIG. 24 showing the management tables 102 and the shift of each pointer when two documents are copied in the DD mode.

In the DD mode, two documents are exposed in the following manner: the back side of the first document, the back side of the second document, the main side of the first document, and the main side of the second document. In other words, the documents identified respectively by the document ID information "0001" and "0002" are copied at the back side in the first circulation and, in the next circulation, the same are copied at the main side.

Thus, if the above cycles are repeated as many as the desired number of copies, a desired number of sets of copies can be obtained. In other words, in the DD mode, the documents can be controlled in a reliable manner by resetting all the pointers when the last document is exposed in the second circulation, and by recirculating the content of the management tables 102 for each set of the documents.

The DD mode was explained above as an example, but it should be appreciated that the present invention is not limited to the DD mode and it is available in the SS mode as well if the pointer is reset at the exposure of the last document in the first circulation.

The present facsimile complex apparatus can carry out interruption job, in which a document is copied while the apparatus is carrying out a copying job for other documents. The interruption job processing will be explained in the following with reference to FIG. 25.

In the first place, when the job starts, whether the job in question is an interruption job or not is judged (S51). If the job in question is judged as the interruption job, the content of the management tables 102 for the job being carried out is saved temporarily, and a new management table 102, that is, the management table 102 for the interruption job is created (S52), and each pointer is reset (S53).

The interruption job is controlled using the management table 102 for the interruption job as explained above.

Then, if it turns out the job in question is not an interruption job in S51, the interruption job is judged as having been completed, and the interrupted copying job is resumed with the content in the management tables 102 saved before the interruption (S54), while at the same time, the value of each pointer is restored to the values before the interruption (S55).

Consequently, the interrupted copying job can be resumed without being affected by the interruption job, thereby making it possible to control each copying job in a reliable manner.

Next, the recovery at the document or sheet jam in the above-arranged facsimile complex apparatus will be explained in the following with reference to FIGS. 26 through 28. In the following explanation, assume that seven documents are copied under the condition that the ADF 2 is set to the ADF mode and the copy mode is set to the SS mode.

Explained in the first place is a case where the document jam occurs under the following conditions while the copying job for the seven documents is carried out: the document identified by the document ID information "0006" has not been scanned; the document identified by the document ID information "0007" has been fed; and the document identified by the document ID information "0004" has been copied.

Figure 26:
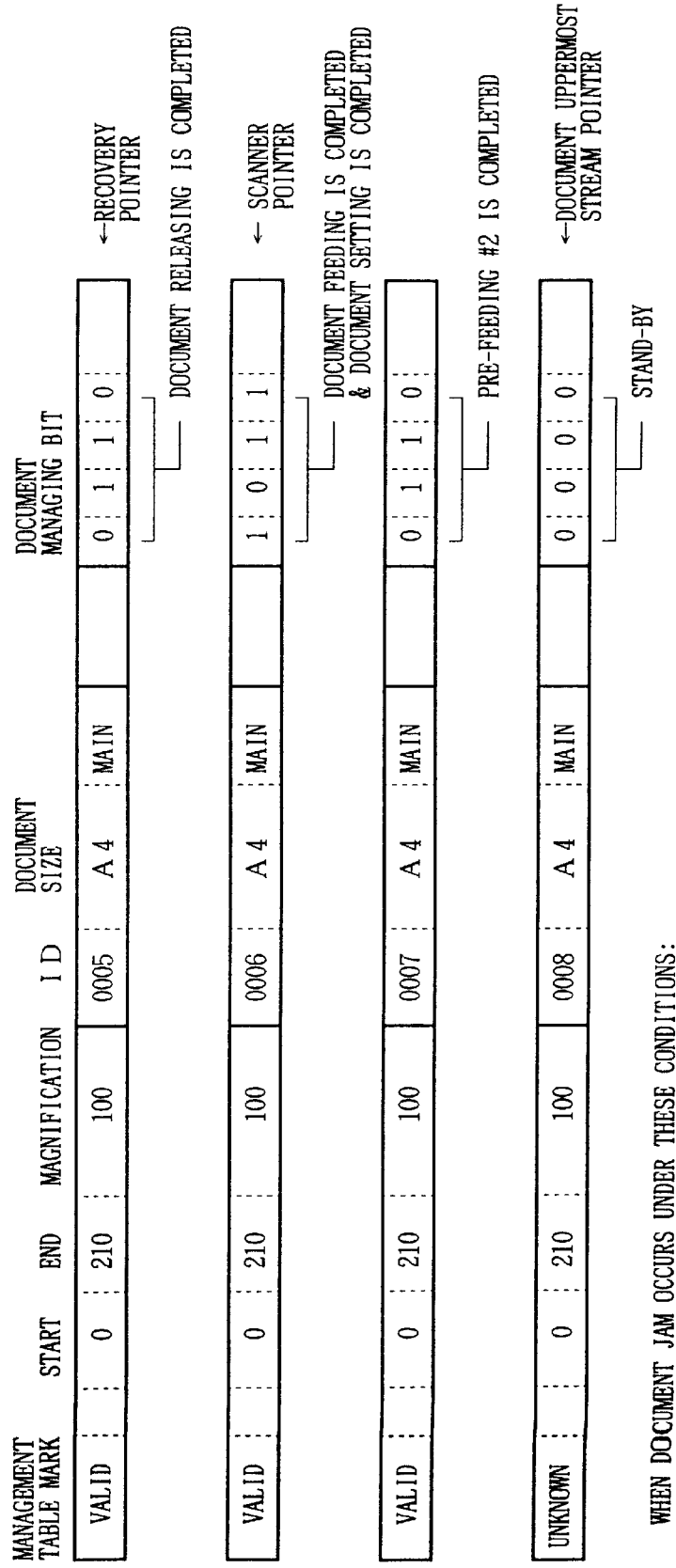
FIG. 26 is a view explaining the states of the management tables when the recovery is carried out in the facsimile complex apparatus of FIG. 2.

Under these conditions, each management table 102 has the content as shown in FIG. 26. To be more specific, the management table 102 exhibiting the document ID information "0005" indicates that the corresponding document has been released; the management table 102 exhibiting the document ID information "0006" indicates that the corresponding document has been fed and set; the management table 102 exhibiting the document ID information "0007" indicates that the corresponding document has been fed to the second pre-feeding position (the pre-feeding #2 has been completed); and the management table 102 exhibiting the document ID information "0008" indicates that the corresponding document is in the stand-by state for the action.

Thus, the recovery pointer specifies the management table 102 exhibiting the document ID information "0005". The scanner pointer specifies the management table 102 exhibiting the document ID information "0006", and the document uppermost stream pointer specifies the management table 102 exhibiting the document ID information "0008".

In this manner, each pointer specifies the table which should be controlled next. Thus, in the document jam state shown in FIG. 26, the number of the documents to be returned can be found by computing a difference between the values of the document ID information in the management tables 102 specified by the document uppermost stream pointer and the recovery pointer. That is, the number of the documents to be returned is 8−5=3. Consequently, the documents to be returned for the recovery are the documents whose management tables 102 exhibit the document ID information "0007", 0006", and "0005", respectively.

Thus, the number of the documents for the recovery can be readily computed using a difference between the values specified by the pointers.

Figure 27:
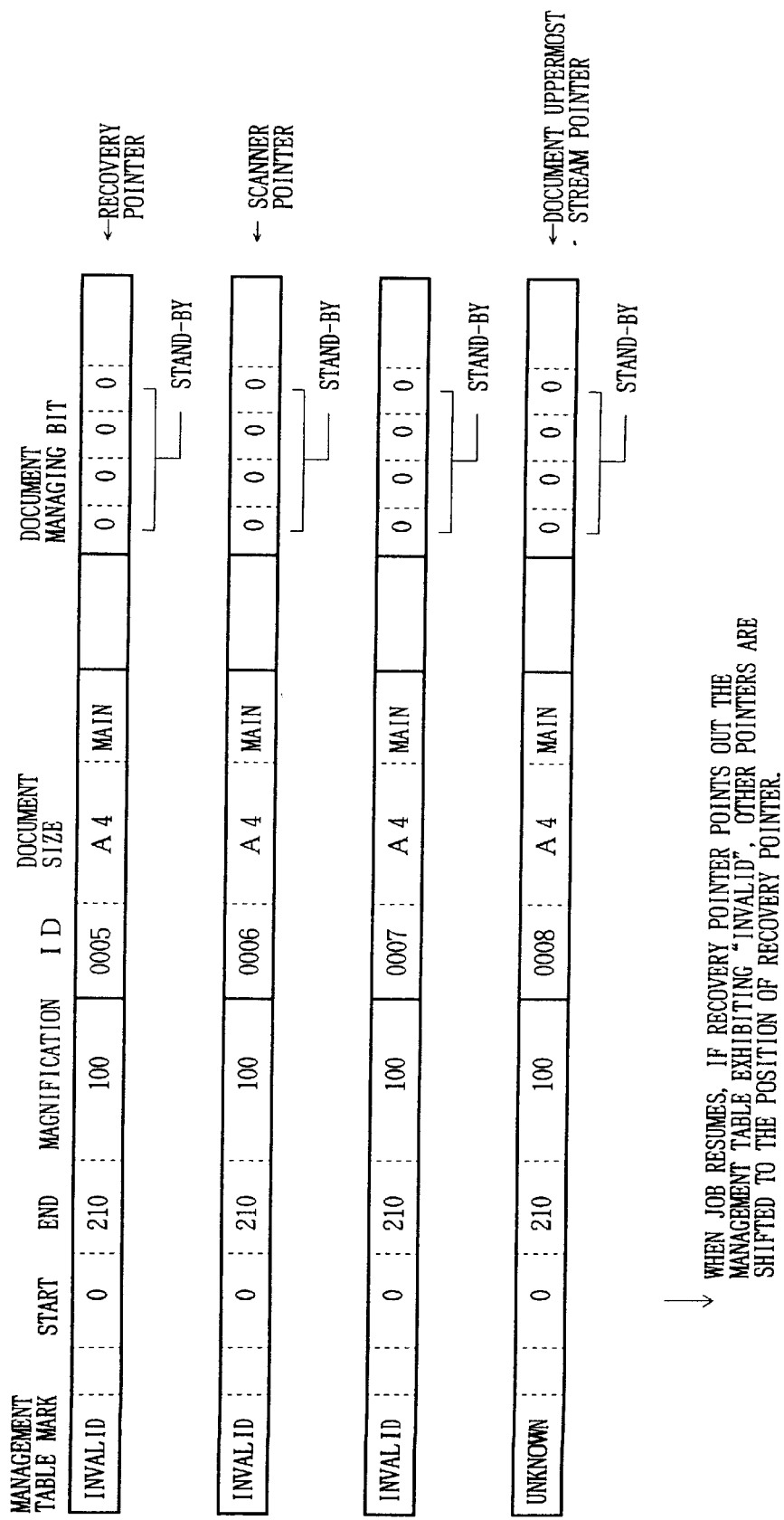
FIG. 27 is another view explaining the states of the management tables when the recovery is carried out in the facsimile complex apparatus of FIG. 2.

When the document jam is cleared by opening the cover of the ADF 2, as shown in FIG. 27, the invalid marks are set in the management tables 102 for the documents whose management tables 102 exhibit the document ID information "0007", "0006", and "0005", respectively. Thus, in these management tables 102, the stand-by is set in the document managing bit.

Figure 28:
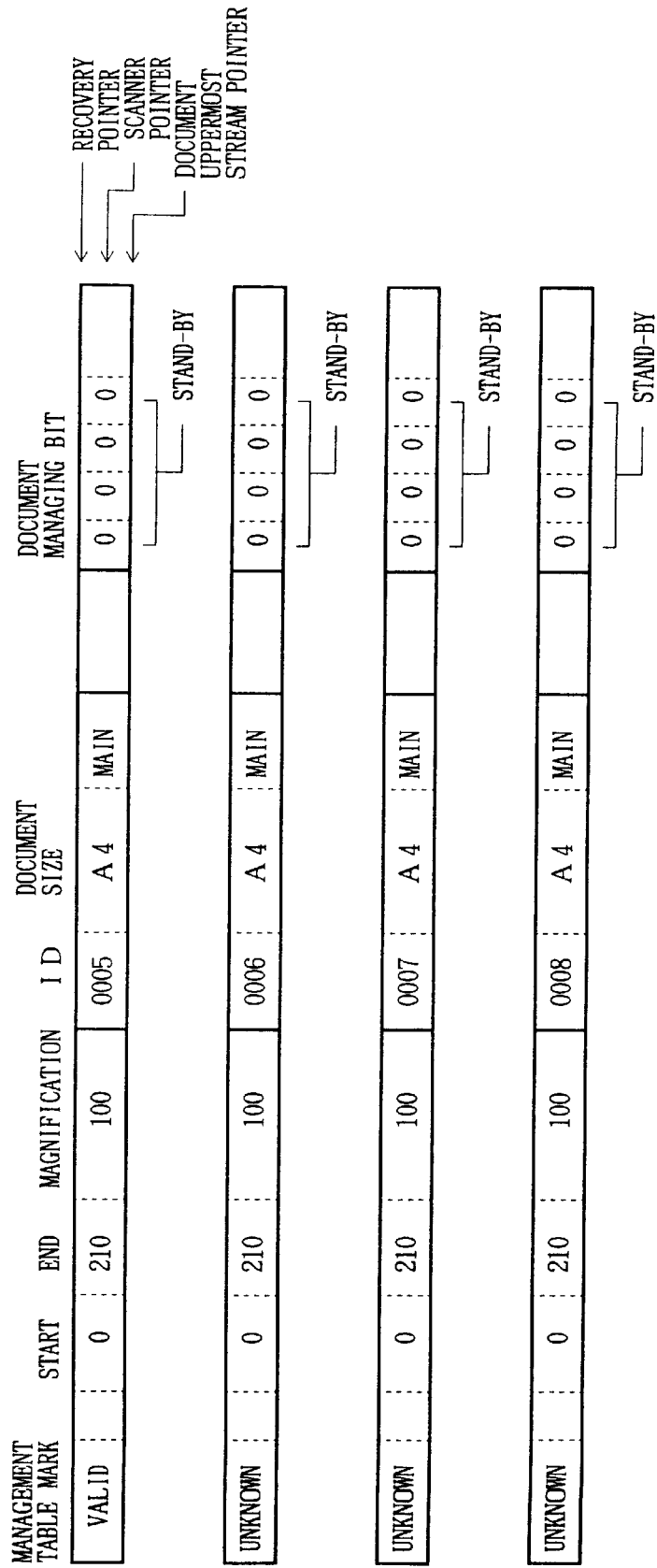
FIG. 28 is still another view explaining the states of the management tables when the recovery is carried out in the facsimile complex apparatus of FIG. 2.

Subsequently, after the document jam is cleared, and when the job is resumed by setting the documents whose management tables 102 respectively exhibit the document ID information "0007", "0006", and "0005" again, as shown in FIG. 28, each pointer shifts to the position of the recovery pointer to specify the management table 102 which the recovery pointer is currently specifying.

Here, the invalid mark in the management table mark of each management table 102 is updated to either "VALID" or "UNKNOWN". More specifically, in case of FIG. 28, the management table mark in the management table 102 exhibiting the document ID information "0005" is updated to "VALID", and the management marks in the other management tables 102 exhibiting the document ID information "0006"–"0008" are updated to "UNKNOWN".

The recovery position can be specified by adjusting each pointer to the position of the recovery pointer when the copying job is resumed in the above manner. In other words, the recovery can be readily carried out precisely by resuming the feeding and scanning of the documents from the document whose management table 102 exhibits the document ID information "0005".

When the above-arranged facsimile complex apparatus is set in the duplex mode for forming images on both sides of the transfer sheet, namely either in the DD mode or SD mode, the copying job must be resumed from the back side of the transfer sheet if the transfer sheets piled in the intermediate tray 37 (FIG. 2) are removed or short due to the double feeding or the like.

The process in the above case using the management tables 102 will be explained with reference to FIGS. 29 through 32. In the following explanation, a case where the transfer sheets in the intermediate tray 37 becomes short while six documents are copied in the SD copy mode will be explained.

When the copying job is suspended in the state shown in FIG. 29, if the transfer sheet which should have been withheld in the intermediate tray 37 for the document whose management table 102 exhibits the document ID information "0003" is not in the intermediate tray 37, the copying job must be resumed from the document whose management table 102 exhibits the document ID information "0003".

Thus, as shown in FIG. 29, in the management table 102 exhibiting the document ID information "0003", a complete mark indicating that the exposure has been completed is set in the management table mark, and information indicating that the document has been released is set in the document managing bit. Therefore, the recovery pointer shifts to the management table 102 for the following document whose management table 102 exhibits the document ID information "0004".

Thus, to resume the copying job from the document whose management table 102 exhibits the document ID information "0003", a valid mark is set in the management table mark in the management table 102 exhibiting the document ID information "0003" as shown in FIG. 30. Further, the recovery pointer is returned to the top management table 102 among the management tables 102 in which "VALID" is set in the management table marks.

The number of the documents to be returned in the above case is a difference between the values of the document ID information in the management tables 102 specified by the document uppermost stream pointer and recovery pointer, that is, 6−3=3. In other words, the document whose management table 102 exhibits the document ID information "0003" is copied on the back side of the second transfer sheet in the duplex mode. Thus, when the transfer sheet for the document whose management table 102 exhibits the document ID information "0003" does not exist, the copy side of the transfer sheet for the document whose management table 102 exhibits the document ID information "0003" is set as "incomplete". Consequently, the number of the documents to be returned can be computed as 0006−0003=3.

When the cover of the ADF 2 is opened to return the documents, as shown in FIG. 31, the invalid marks are set in the management table marks of the management tables 102 exhibiting the document ID information "0003"–"0006".

Figure 32:
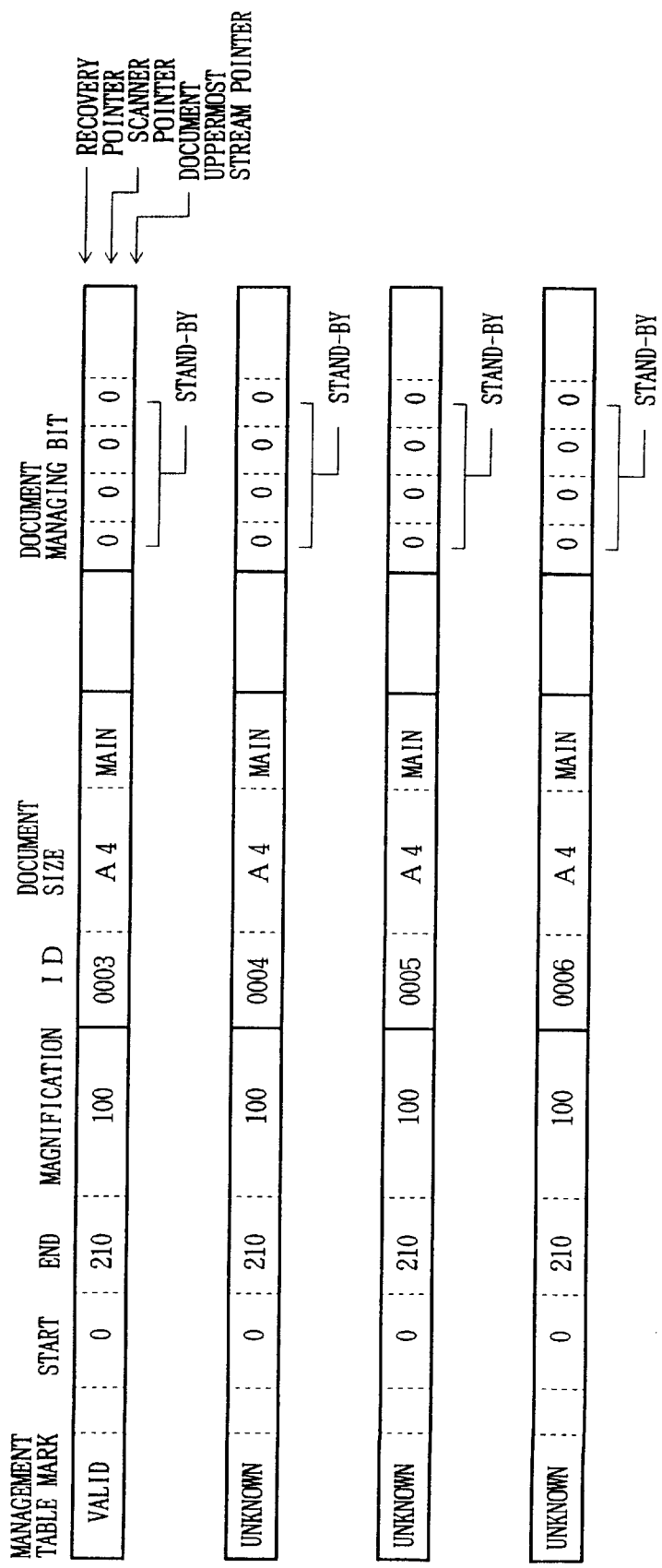
FIG. 32 is still another view explaining the states of the management tables when transfer sheets are short during a duplex copying job by the facsimile complex apparatus of FIG. 2.

Thus, the copying job is resumed in the state where the invalid mark is set in the management table mark of the management table 102 for each of the documents to be returned. Here, as shown in FIG. 32, the document uppermost stream pointer and scanner pointer have shifted to specify the management table 102 the recovery pointer is currently specifying.

Thus, when the copying job must be resumed from the back side of the transfer sheet in the duplex mode because the transfer sheets withheld in the intermediate tray 37 are removed or short due to the double feeding or the like, all the pointers are returned to the management table 102 the recovery pointer is specifying to resume the job, whereby the copying job can be realized without causing any trouble.

Next, the recovery processing in the copying job by the above-arranged facsimile complex apparatus when the document reading mode is set to the RDH mode and the copy mode is set to the DD mode will be explained in the following with reference to FIG. 33.

When the apparatus is set in the RDH mode and DD mode for copying six documents, the control section 100 successively creates the management tables 102 exhibiting the document ID information "0001"–"0006" and "BACK" as the document exposing side information. Then, the control section 100 successively creates the management tables 102 exhibiting the document ID information "0001"–"0006" and "MAIN" as the document exposing side information.

Thus, in the copying job in the RDH mode and DD mode, the documents are copied at the back side first, and thence at the main side based on the reference management tables 102, whereby both sides of each document are copied to both sides of the transfer sheet, respectively. In other words, all the documents are copied at the back side in the first circulation, and at the main side in the second circulation.

When the copying job in the RDH mode and DD mode is suspended due to the document jam or the like, the recovery pointer indicates the management table 102 (right side in the drawing) to start the recovery, that is, the management table 102 exhibiting the document ID information "0003" and "MAIN" as the document exposing side. At this point, the documents are returned to the original set position when the copying job is suspended in the RDH mode. Thus, when the copying job is resumed, the documents are transported from the first document.

For this reason, of all the documents which should be set in such a manner to be exposed at the main side, the documents whose management tables 102 respectively exhibit the document ID information "0001" and "0002" are transported idly without being exposed, and the exposure is resumed from the document whose the management table 102 exhibits the document ID information "0003". In other words, when the recovery starts, the recovery management tables 102 are created separately from the reference (original) management tables 102, and the copying job is controlled based on the recovery management tables 102.

In the recovery management tables 102 corresponding to the management tables 102 exhibiting the document ID information "0001" and "0002" and "MAIN" as the document exposing side information, "SKIP" is set as the document exposing side information, and in the recovery management tables 102 corresponding to the management tables 102 exhibiting the document ID information "0003"–"0006", "MAIN" is set as the document exposing side information.

The document feeding pointer (document pointer) is returned to the management table 102 for the document whose management table 102 exhibits the document ID information "0001" in accordance with the current document state, and the transportation starts. More specifically, the document whose management table 102 exhibits the document ID information "0001" and the document whose management table 102 exhibits the document ID information "0002" are transported idly without being exposed, and the exposure resumes from the main side of the document whose management table 102 exhibits the document ID information "0003".

Further, when the pointer shifts to the management table 102 exhibiting the document ID information "0006", that is, the management table 102 for the last document, the pointer returns to the reference management tables 102, whereupon the recovery ends.

According to the above control, the recovery can be carried out readily and precisely in the RDH mode by creating the recovery management tables 102 separately from the reference management tables 102 and by controlling the copying job based on these management tables 102.

Figure 33:
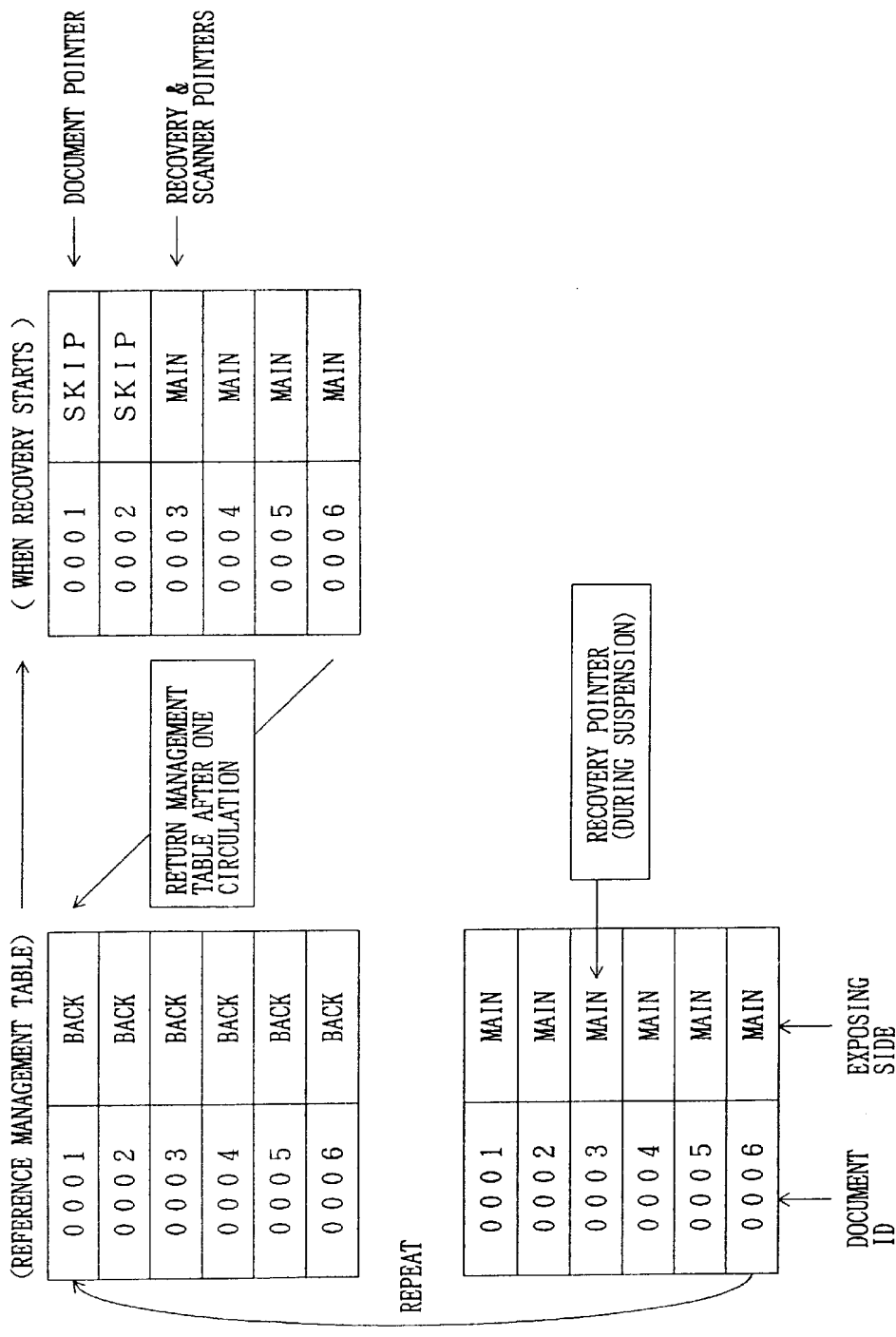
FIG. 33 is a view explaining the states of the management tables when the recovery is carried out in the facsimile complex apparatus of FIG. 2.

As shown in FIGS. 18 and 33, the management tables 102 in the RDH mode and DD mode are aligned in such a manner that the documents are exposed on the back side alone in the first circulation and at the main side alone in the second circulation. Consequently, the operation pattern in the copying job is in the order that the documents are presented to the document exposing section 3 in time series, thereby realizing more accurate control.

As shown in FIG. 16, the management tables 102 in the ADF mode and DD mode are aligned to expose both the back and main sides of each document successively. In this case, the operation pattern in the copying job is the page order of the documents in time series, thereby also realizing more accurate control.

Embodiment 2

Referring to FIGS. 34 through 42, the following description will describe another example embodiment of the present invention.

In the present embodiment, a digital copying machine is used as an example image processing apparatus. Also, in the present embodiment, a case where the present invention is applied to the digital copying machine will be explained, but it should be appreciated that the application of the present invention is not limited to the digital copying machine, and it can be applied to various types of image processing apparatuses equipped with an image reading section which needs the management of images before and after they are read.

Figure 34:
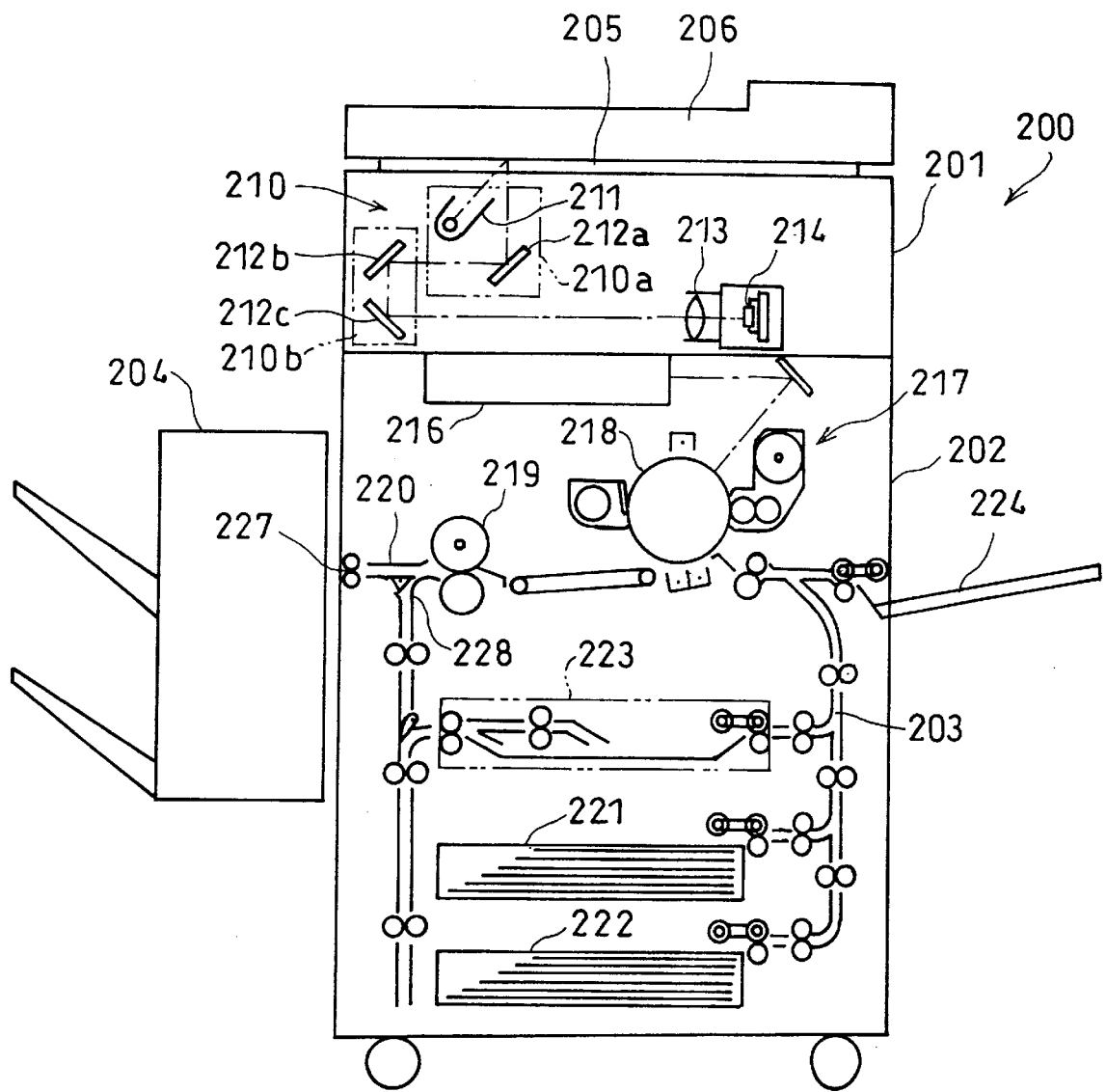
FIG. 34 is a view showing an arrangement of an entire digital copying machine as an image processing apparatus in accordance with another example embodiment of the present invention.

The digital copying machine of the present embodiment can be set to a copy mode, a printer mode, a facsimile mode, etc. An overall arrangement of the digital copying machine is depicted in FIG. 34.

A digital copying machine 200 is basically composed of a scanner section (original image reading means) and a laser recording section 202.

The scanner section 201 is composed of a document table 205 made of transparent glass, a duplex automatic document feeder (hereinafter, referred to as ADF) 206 for automatically feeding the documents onto the document table 205, an original image reading unit, namely, a scanner unit 210, for scanning and reading an image on the document placed on the document table 205.

The original image read by the scanner section 201 is sent to a main image processing board and a sub-image processing board described below as image data, and processed in a predetermined manner.

The ADF 206 is a device, which automatically feeds a plurality of documents set on an unillustrated document tray per page (sheet) to the document table 205 of the scanner unit 210.

Although it is not illustrated in the drawing, the ADF 206 is composed of a transportation path for a simplex document, a transportation path for a duplex document, transportation path switching means, a sensor group for obtaining and managing the document state passing through each portion, a control section, etc., so that the scanner unit 210 can read the document at either one side or both sides at the operator's choice. Since many patent applications have been filed as to the ADF 206, and many of which have been already commercialized, the explanation of which is omitted herein.

The scanner unit 210 is composed of a first scanning unit 210a, a second scanning unit 210b, an optical lens 213, a CCD 214, etc.

The first scanning unit 210a includes a lamp reflector assembly 211 for exposing the surface of the document, and a first reflection mirror 212a for reflecting light reflected from the document to lead a reflected light image from the document to a photoelectric transfer element (hereinafter, referred to as the CCD) 214. The second scanning unit 210b includes a second reflection mirror 212b and a third reflection mirror 212c for leading the reflection light image from the first scanning unit 210a to the CCD 214. The optical lens 213 forms the reflection light image from the document onto the CCD 214 through the aforementioned reflection mirrors.

The scanner section 201 is arranged to read the documents by an associated operation of the ADF 206 and scanner unit 210. More specifically, the scanner unit 210 is moved along the bottom surface of the document table 205 while the documents to be read are placed successively thereon.

In particular, the first scanning unit 210a is controlled to run from left to right along the document table 205 at a constant rate V, and the second scanning unit 210b is run in the same direction at a rate of V/2. Consequently, an image on the document placed on the document table 205 is read by being formed on the CCD 214 per line.

The image data obtained by reading the original image by means of the scanner unit 210 are sent to the main image processing board 330 and sub-image processing board 340 described below, and after being processed in predetermined manners, the image data are stored in a memory of the image processing boards temporarily. Later, the image data are retrieved at an output command, transferred to the laser recording section 202, and formed as an image on a recording (transfer) sheet.

The laser recording section 202 includes a transportation system 203 for transporting a sheet P as a recording material on which an image is formed, a laser scanning unit 216, and an electrophotographic processing section 217 for forming an image.

Although it is not illustrated in the drawing, the laser scanning unit 216 includes a semiconductor laser beam source, a polygonal mirror, an f-θ lens, etc. The semiconductor laser beam source emits a laser beam in accordance with the image data retrieved from the memory or the image data transferred from an external device. The polygonal mirror deflects the laser beam emitted from the semiconductor laser beam source at an isometric velocity. The f-θ lens corrects the above deflected laser beam to be deflected at an isometric velocity on a photosensitive drum 218 of the electrophotographic processing portion 217.

The electrophotographic processing section 217 is of a known arrangement, in which a charger, a developer, a transfer device, a separator, a cleaner, and a charge remover are provided around the photosensitive drum 218.

On the other hand, the transportation system 203 for the sheet includes a transportation section 203, cassette feeders 221 and 222, a manual feeder 224, a fuser 219, a re-feeding path, and a duplex unit 223. The transportation section 203 transports a sheet P to a transfer position in the electrophotographic process section 217 where the transfer device is provided. The cassette feeders 221 and 222 send the sheet P to the transportation section 203. The manual feeder 224 is provided to feed a sheet of a desired size. The fuser 219 fuses an image, especially a toner image, transferred onto the sheet P to fix the same thereon. The re-feeding path is provided to feed the sheet P again to form an image on the back side thereof. The duplex unit 223 flips and transports the sheet P so that the images are formed on both sides thereof.

A post-processing device 204, composed of a finisher, a sorter and the like, for receiving the sheet P having thereon formed an image and for processing the sheet P in a predetermined manner, is provided at the downstream end of the fuser 219.

The laser scanning unit 216 and electrophotographic processing section 217 form an electrostatic latent image on the surface of the photosensitive drum 218 by scanning a laser beam in accordance with the image data retrieved from the image memory. The electrostatic latent image is turned into a visual toner image by the developer. The toner image is electrostatically transferred from the photosensitive drum 218 onto the sheet P transported from any of the multi-stage cassette feeders 221 and 222 and the manual feeder 224, and fused thereon by the fuser 219.

The sheet P having formed thereon an image in the above manner is transported into the post-processing device 204 from the fuser 219 by way of a releasing roller 227.

(Circuitry of Image Processing Section)

Next, the arrangement and function of an image processing section for processing the original image information read in the digital copying machine 200 will be explained.

Figure 35A:
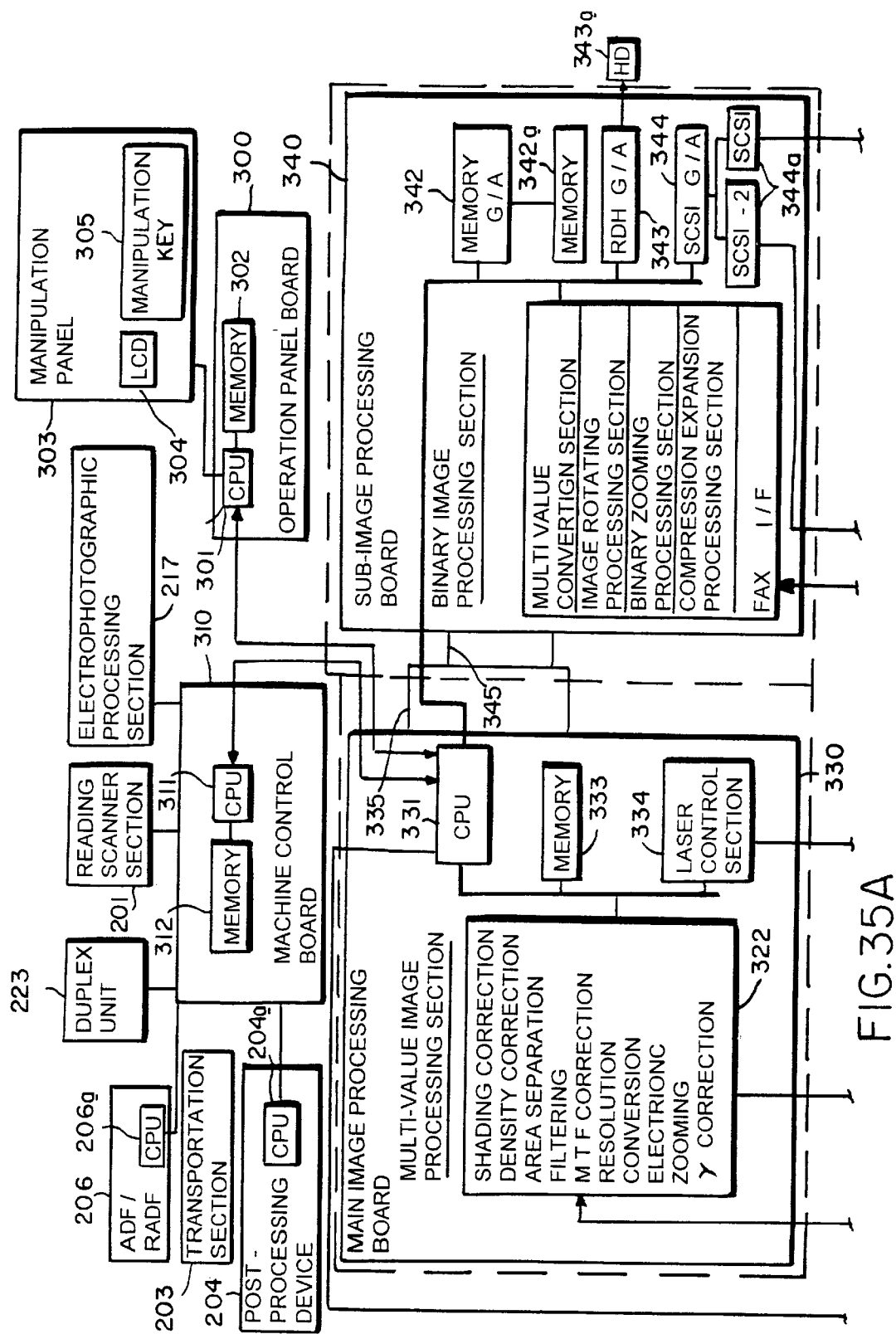
FIG. 35 is a block diagram depicting a circuit arrangement in an image processing section of the digital copying machine of FIG. 34 and an arrangement of an overall control section.

FIG. 35 is a block diagram depicting the entire digital copying machine 200 of FIG. 34, namely, unit sections and the image processing section. A main central computing processor (hereinafter, referred to as main CPU) 401 placed at about the center of the drawing manages the operation of the image processing section in association with a sub-central computing processor (hereinafter, referred to as sub-CPU).

The image processing section is mainly composed of an operation panel board 300 positioned in the upper right in the drawing, a machine control board 310 positioned in the upper left in the drawing, a CCD board 320 including the CCD 214 positioned in the lower left in the drawing, the main image processing board 330 positioned substantially at the center of the drawing, the sub-image processing board 340, an extension board group 350 including a printer board 351, a function extension board 352, a facsimile board 353, etc. which is positioned in the lower right of the drawing and connected to the sub-image processing board 340 through an interface.

The operation panel board 300 manages an operation panel 303 (mode setting means) under the control. The machine control board 310 manages each unit forming the digital copying machine 200 under the control. The CCD board 320 reads the original image electrically and converts the same to electronic data. The main image processing board 330 effects predetermined image processing to an original image converted to the electronic data by the CCD board 320. The sub-image processing board 340 further effects predetermined image processing to the image information processed by the main image processing board 330. In the following, the management under the control by each board will be explained.

(Operation Panel Board)

The operation panel board 300 is basically placed under the control of the sub-CPU 301, and manages a screen of an LCD display section 304 provided on the manipulation panel 303, manipulation input from a manipulation key group 305 through which a command as to the modes is inputted. The operation panel board 300 includes a memory 302 for storing control information of various kinds used for the manipulation panel 303, such as the data inputted through the manipulation key group 305 and information to be displayed on the LCD display section 304.

In the above arrangement, the sub-CPU 301 directs an operation of the digital copying machine 200 by transmitting control data mutually with the main CPU 331.

Also, the current state of the digital copying machine 200 is shown to the operator on the LCD display section 304 on the manipulation control panel 303 by transferring a control signal indicating the operation state of the digital copying machine 200 from the main CPU 331 to the sub-CPU 301.

(Machine Control Board)

The machine control board 310 is controlled thoroughly by the sub-CPU 311, and it manages the automatic document feeder, such as the ADF and RADF (hereinafter, collectively referred to simply as ADF) 206, scanner section 201, electrophotographic processing section 217, transportation section 203, duplex unit 223, and post-processing device 204 for effecting the post-processing, such as stapling, to the sheet P having recorded thereon an image.

(CCD Board)

The CCD board 320 is composed of the CCD 214 for reading an original image electrically, a circuit for driving the CCD 214, namely, a CCD gate array 322, an analog circuit 323 for adjusting the gain of the analog data outputted from the CCD 214, and an A/D convertor 324 for converting the analog output from the CCD 214 to a digital signal to be outputted as electronic data. The CCD board 320 is managed by the main CPU 331 under the control.

(Main Image Processing Board)

The main image processing board 330 is placed under the control of the main CPU 331, and it is composed of a multi-value image processing section 332, a memory 333, a laser control section 334, etc. The multi-value image processing section 332 processes the multi-value image data by effecting the shading correction, density correction, segment separation, filtering, MTF correction, resolution conversion, electronic zooming (scaling processing), gamma correction based on the electronic data of the original image sent from the CCD board 320, so that the image can be displayed in a desired gray scale. The memory 333 stores the control information of various kinds, such as image data processed by the multi-value image processing section 332 and data as to the processing procedure. The laser control section 334 transfers the data to the laser scanning unit 216 end to reproduce an image based on the processed image information under control.

(Sub-Image Processing Board)

The sub-image processing board 340 is connected to the main CPU 331 through a connector 345, and it is composed of a binary image processing section 341 controlled by the main CPU 331 of the main image processing board 330, a memory 342a for storing and managing the processed binary image information or control information used for the processing, a gate array 342 for controlling the memory 342a, a hard disk 343a for making a plurality of copies by reading a plurality of original images for a desired number of times, and a gate array 343 for controlling the hard disk 343a, an SCSI 344a serving as an external interface, and a gate array 344 for controlling the SCSI 344a.

The binary image processing section 341 is composed of a multi-binary value converting section for converting the multi-value image information to the binary image, an image rotation processing section for rotating the image, a binary scaling (zooming) processing section for effecting the scaling processing to the binary image. Further, the binary image processing section 341 includes a facsimile interface section for sending/receiving a facsimile image through communication means.

(Extension Board)

Examples of the extension board 350 include: the printer board 351 for outputting data sent from a personal computer or the like from a printer section of the digital copying machine 200 in the printer mode; the function extension board 352 for extending the edit functions of the digital copying machine 200 to efficiently use the feature functions of the digital copying machine 200; and the facsimile board 353 for sending an original image read by the scanner section 201 of the digital copying machine 200 to a correspondent or outputting the image information sent from the correspondent from the laser recording section 202 of the digital copying machine 200.

In the following, the image data processing and the flow of the image data when the digital copying machine 200 operates in each of the copy mode, facsimile mode, and printer mode will be explained.

(Copy Mode)

The documents set in a predetermined position in the ADF 206 of the digital copying machine 200 are successively fed onto the document table 205 of the scanner unit 210. An image on each document is read by the aforementioned scanner unit 210, and transferred successively to the main image processing board 330 in the form of 8-bit electronic data.

The 8-bit electronic data transferred to the main image processing board 330 are processed in predetermined manners on the multi-value image processing unit 332 in the form of 8-bit electronic image data. The 8-bit electronic image data are processed further by the gamma correction or the like, and sent to the laser scanning unit 216 through the laser control section 334. Consequently, the original image read by the scanner section 201 is outputted as a gray scale copy image from the laser recording unit 202.

(Electronic RDH Function in Copy Mode)

The documents set at a predetermined position in the ADF 206 of the digital copying machine 200 are successively fed onto the document table 205 of the scanner unit 210. An image on each document is read by the arrangement of the aforementioned scanner unit 210, and sent to the main image processing board 330 as 8-bit electronic data.

The 8-bit electronic data sent to the main image processing board 330 is processed in predetermined manners on the multi-value image processing section 332 as 8-bit electronic image data.

The 8-bit electronic image data are sent from the main image processing board 330 to the sub-image processing board 340 through the connectors 335 and 345, and the error diffusion processing or the like is applied to the same by the multi-binary value converting section of the binary image processing section 341, while being converted to 2-bit electronic image data.

The 8-bit electronic image data are converted to the processing such as the error diffusion, because the image quality may possibly deteriorate if the 8-bit electronic image data are directly converted to the 2-bit electronic image data. In addition, an image storage capacity is concerned as well.

The 2-bit electronic image data thus obtained are transferred to the hard disk 343a per document and stored and managed temporarily therein.

When all the documents set in the ADF 206 are read, the 2-bit electronic image data stored in the hard disk 343a are repetitively retrieved as many times as the designate number of copies under the control of the gate array 343. The 2-bit electronic image data thus retrieved are sent to the main image processing board 330 through the connectors 345 and 335, and after the processing like the gamma correction is applied, the 2-bit electronic image data are sent to the laser scanning unit 216 through the laser control section 334.

In the above explanation, the image data are repetitively retrieved for a desired number of times after all the documents are read, but the first copies of the documents may be outputted consecutively each time a predetermined amount of image data become available.

Consequently, the original image read by the scanner section 201 of the digital copying machine 200 is outputted as a gray scale copy image from the laser recording section 202.

(Printer Mode)

An image sent from an external device, such as a personal computer, connected to the digital copying machine 200 through a network is developed as an image on the printer board 351 per page. Later, the image is transferred to the sub-image processing board 340 end through the SCSI 344a serving as the interface and then stored into the hard disk 343a.

At the sub-image processing board 340 end, the received page image is not subjected to the binary image processing, and directly stored into the hard disk 343a temporarily. Likewise, the received page image is not subjected to the binary image processing when it is retrieved from the hard disk 343a.

The image information temporarily stored into the hard disk 343a is retrieved from the hard disk 343a in a predetermined page order, and sent to the main image processing board 330, where the gamma correction is effected. Then, the image information is sent to the laser control section 334, which controls the writing action of the laser scanning unit 216 to reproduce the image.

(Facsimile Mode)

The facsimile mode includes two actions: the sending of the document to a correspondent, and the receiving of the document from the correspondent.

In the first place, the sending of the document to the correspondence will be explained. The documents set at a predetermined position in the ADF 206 of the digital copying machine 200 are successively fed onto the document table 205 of the scanner section 201. An image on each document is read by the scanner unit 210, and sent to the main image processing board 330 as 8-bit electronic data.

The 8-bit electronic data sent to the main image processing board 330 are processed in predetermined manners on the multi-value image processing unit 332 as 8-bit electronic image data.

The 8-bit electronic image data are sent from the main image processing board 330 to the sub-image processing board 340 through the connectors 335 and 345, and the error diffusion processing and the like is applied to the same by the multi-binary value converting section of the binary image processing section 341, while being converted to 2-bit electronic image data.

The 8-bit electronic image data are converted to the 2-bit electronic image data while effecting the processing such as the error diffusion, because the image quality may possibly deteriorate if the 8-bit electronic image data are directly converted to the 2-bit electronic image data. In addition, an image storage capacity is concerned as well.

The binary images of the subject documents thus obtained are compressed in a predetermined format and stored into the memory 342a.

Later, the transmission procedure is taken with the correspondent, and when the transmission state is secured, the images are retrieved from the memory 342a, and transferred to the facsimile board 353. Then, after the processing like the modification of the compression format is effected on the facsimile board 353, the images are successively sent to the correspondent through the communication line.

Next, the processing of the original image sent from the correspondent will be explained.

When the documents are sent from the correspondent through the communication line, the facsimile board 353 receives the original images while taking the communication procedure. The received images, which are compressed in the predetermined format, are sent to the binary image processing section 341 in the sub-image processing board 340 through a facsimile interface. The binary image processing section 341 reproduces the original images sent as the page images by a compression/expansion processing section.

Then, the original images reproduced as images per page are sent to the main image processing board 330, where the gamma correction is effected. Later, the image information is sent to the laser control section 334, which controls the writing action of the laser scanning unit 216 to reproduce the image.

As has been explained, in the digital copying machine 200, the image processing section for effecting predetermined processing to the image information is mainly divided into the main image processing board 330 and sub-image processing board 340.

In other words, the main image processing board 330 processes the original image read by and inputted from the scanner section 201 as the multi-value image information. The sub-image processing board 340 effects the binary processing to the original image information processed as the multi-value image information by the main image processing board 330, or effects predetermined processing to the image information sent from a connected device through the external interface, and transfers the image information to the multi-value image processing section 332 of the main image processing board 330.

The main image processing board 330 includes the laser control section 334 for controlling the image information writing action of the laser scanning unit 216 to reproduce the image on the photosensitive drum 218 of the electrophotographic processing section 217.

According to the above arrangement, the digital copying machine 200 reproduces the original image read by and inputted from the scanner section 201 as a copy image from the laser recording section 202 without deteriorating the features of the multi-value image. A large volume of the original images are outputted at a high speed by using the sub-image processing board 340 and hard disk 343a.

Also, the digital copying machine 200 can process and output the image information inputted from the external device, such as a facsimile machine and a printer. Further, as far as the image information from the external facsimile machine is concerned, the digital copying machine 200 can process the image information adequately using the feature functions furnished to the same, for example, applying the binary processing to the documents to which the multi-image processing has been applied, that is, the documents sent while maintaining the characteristics of the original images.

Further, since the image processing section is divided into the main image processing board 330 and sub-image processing board 340, the digital copying machine 200 can be modified in diversified manners (a wide range of line-up is available), and the digital copying machine can be set in any manner to meet the user's demand. Moreover, an apparatus can be constructed by incorporating the digital copying machine thus set.

Since the main CPU 331 of the main image processing board 330 manages the sub-image processing board 340 under the control as well, it can manage the flow of the images processed continuously at each processing section, whereby the data are processed and flown smoothly and no image data will be lost.

(Manipulation Panel Section)

Figure 36:
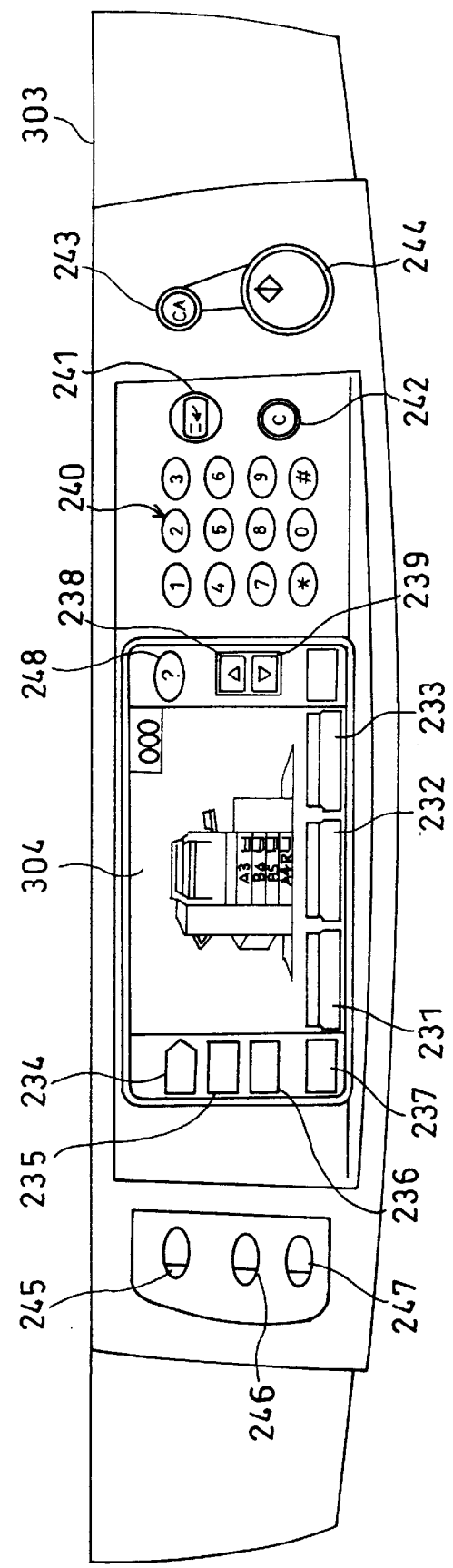
FIG. 36 is a plane view showing an example manipulation panel of the above digital copying machine.

FIG. 36 shows the manipulation panel 303 of the digital copying machine 200. The LCD display section 304 used as a touch panel is provided at the center of the manipulation panel 303. A mode setting key group is provided around the LCD display section 304.

The screen of the LCD display section 304 normally displays an initial start screen for enabling the operator to select the mode he wishes to use. The LCD display section 304 is arranged in such a manner that the liquid crystal screen switches successively, so that the operator can select and specify the mode he wishes to use by pressing a corresponding area on the screen with his finger. The operator further touches an area where the function he wishes to use is displayed in the selected mode, whereupon the edit function is set.

The setting key group provided on the manipulation panel 303 will be explained briefly.

A schematic outward appearance of the digital copying machine 200 is displayed substantially at the center of the LCD display section 304, and a copy density setting key 231 for setting desired copy density, a sheet size setting key 232 for setting a desired sheet size, and a magnification setting key 233 for setting a copy magnification are provided below the outward appearance.

Also, provided on the manipulation panel 303 are: a special function mode key 234 for switching the screen on the LCD display section 304 to the edit mode setting screen for setting the edit function for an original image, a duplex copy mode key 235 for switching the screen on the LCD display section 304 to the setting screen for setting the processing mode to the duplex copy mode, a key 236 for switching the screen on the LCD section 304 to a specific screen for specifying the output mode, such as the sorter and stapling, and a setting confirmation key 237 for confirming the mode(s) currently set.

Further, provided on the manipulation panel 303 are: a manipulation guide key 248 for displaying the guidance information, such as the manipulation method, on the screen, scroll keys 238 and 239 for vertically scrolling the guidance information displayed on the screen by the manipulation of the manipulation guide key 248 to enable the operator to see the display entirely, ten keys 240 for inputting numerical information, such as the number of copies, an interruption key 241 for executing a copy mode while another copy mode is being carried out, a clear key 242 for resetting the conditions which have been inputted by the ten keys 240, an all-clear key 243 for resetting all the set conditions of the digital copying machine 200 to the initial state, and a start key 244 for starting the processing in the mode(s) set by the above key(s).

Also, provided to the manipulation panel 303 at the left side in the drawing are, from the top: a facsimile mode key 245, a printer mode key 246, and a copy mode key 247 for switching the digital copying machine 200 to the facsimile mode, printer mode and copy mode, respectively. These keys are collectively illustrated as the manipulation key 305 in FIG. 35.

The manipulation panel 303 and the keys provided thereon are illustrated and explained as an example embodiment, and it should be appreciated that the same can be modified in accordance with the functions furnished to the digital copying machine 200.

Figure 37:
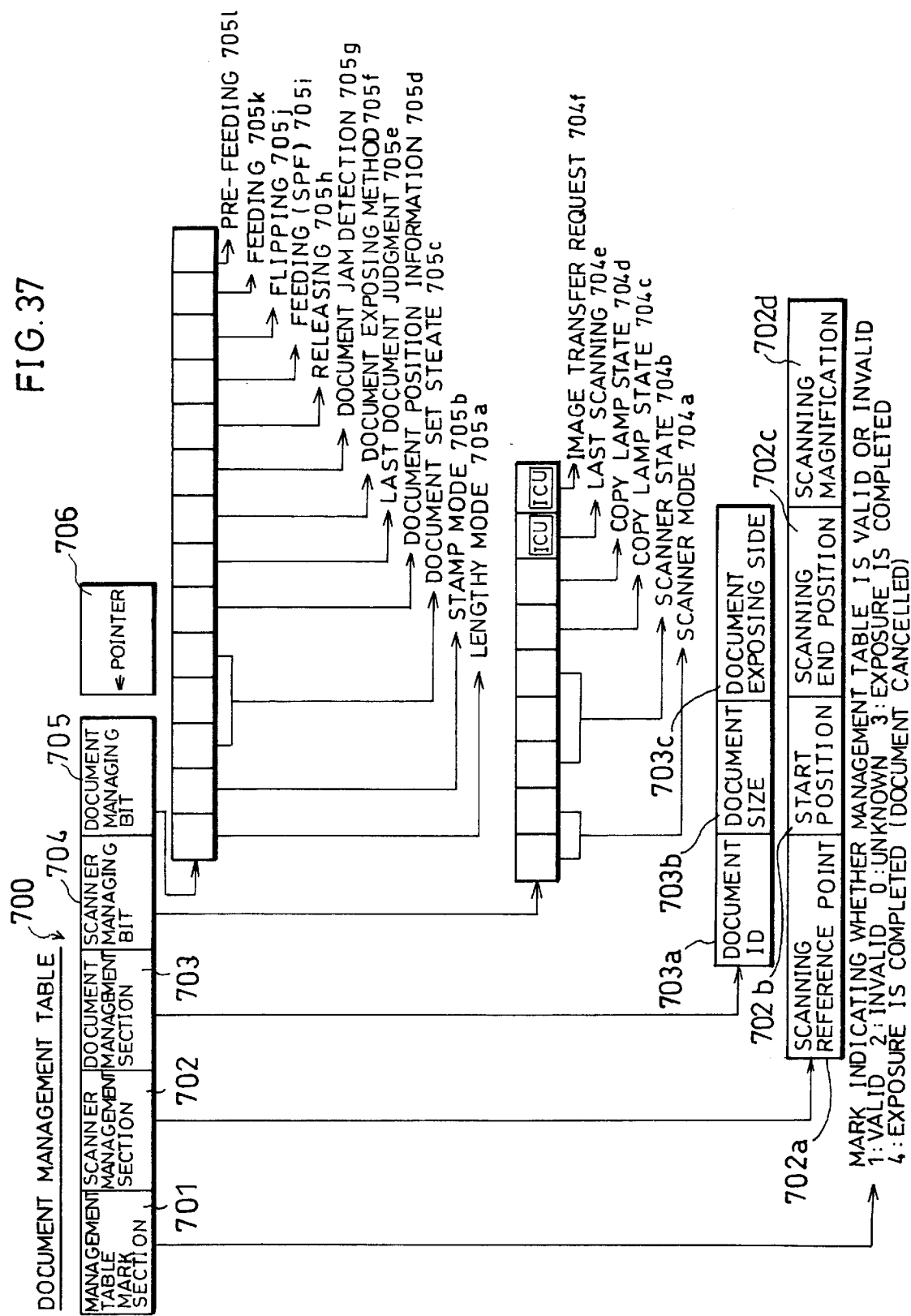
FIG. 37 is a view showing an example document management table provided to the above digital copying machine.

FIG. 37 schematically shows the content and structure of the information related to the original images managed separately in a document management table provided to the digital copying machine 200.

A document management table 700 of the present embodiment stores and manages the information as to the characteristics of the original images and the information as to the processing of the original images. It should be appreciated that, according to the management method of the present invention, one document management table can be created for one image, or one document management table can be created for a plurality of the original images.

In the following, the document management table 700 will be explained with reference to FIG. 37.

The document management table 700 includes, from left to right, a management table mark section 701, a scanner management section 702, a document management section 703, a scanner managing bit 704, and a document managing bit section 705, in which data, a pointer, a flag and the like are correlated to a signal image.

The document management table 700 includes a pointer management table 706, into which the pointer is set. A scanner pointer indicating the original image being processed by the scanner section 201, a document pointer indicating the document to be processed, a recovery pointer for managing the recovery at the occurrence of a trouble are written therein in response to the current state, and therefore, the pointer shifts as the procedure advances (along with the progress of events).

The management table mark section 701 puts a mark to show whether the management table is valid or invalid.

Since the existence of the documents is unknown at the initial stage, "0" indicating "UNKNOWN" is set in the management table mark section 701, and when the existence of the document is confirmed, "1" indicating the validity of the management table for the existing document is set therein. The mark is represented by numerals "0" or "1" herein for the explanation's conveniences, but it can be represented in any other format as long as the processing means can distinguish five states (0, 1, 2, 3, and 4) in each recording medium or memory means.

When the document can not be read because of a feeding error in the ADF 206 while the document is being read, or the opening of the ADF 206 during the feeding, "2" indicting the invalidity of the reading is set in the management table mark section 701. When an image on the document is read by the predetermined reading action, the reading of the original image is judged as being completed, whereupon "3" indicating the completion of exposure is set in the management table mark section 701.

Further, for the document which have been read by the predetermined reading action and causes a feeding error while it is being released from the ADF 206 to the outside of the machine, "4" indicating the validity of the original image is set in the management table mark section 701.

As has been explained, the reading state of the original image and the releasing state of the document can be confirmed by checking the information managed in the management table mark section 701.

The scanner management section 702 is composed of further detailed information management tables for controlling: scanning reference point information 702a indicating the position (home position) where the scanner unit 210 stops; start position information 702b indicating a scanning starting position of the scanner unit 210; scanning end position information 702c indicating the scanning end position of the scanner unit 210; and scanning magnification information 702d indicating magnification at which the document is scanned by the scanner unit 210.

As previously mentioned, the scanning reference point information 702a shows a position used as the reference position where the scanner unit 210 stands by for an original image scanning action. The start position information 702b is the information indicating a distance to the scanning starting position of the scanner unit 210 from the scanning reference point information 702a, to which numerical information represented by millimeters or the corresponding information is set.

Likewise, the scanning ending position information 702c shows the information representing a distance to the scanning end position of the document by the scanner unit 210 from the scanning reference point information 702a or the corresponding information. The scanning ending position information 702c can be found based on the document size or an image size (found by dividing the sheet size by the copy size) whichever is the smaller. Numerical information represented by millimeters or the corresponding information are set as the scanning ending position information 702c, for example.

Further, a copy magnification value set by magnification setting means on the manipulation panel 303 of the digital copying machine 200 or the corresponding information is set in the scanning magnification information 702d.

If the scanner unit 210 is controlled to scan the original image based on all kinds of information set in the document management table 700 in the above manner, the scanning unit 210 can start from the predetermined scanning starting position 702b while accelerating to a scanning rate in response to the scanning magnification information 702d, and when it reaches the document top area, it can scan the original image at a predetermined scanning rate in a stable manner.

Then, the scanner unit 210 is controlled to reduce the scanning rate based on the scanning ending position information 702c set from the information as to the copy magnification, document size or the largest scanning area to return to its home position, whereupon the read scanning for one original image is completed.

The document management section 703 is composed of a plurality of management tables for respectively managing: document ID information 703a for identifying the information set in the document management table 700 as the information for individual documents to manage the same separately; document size information 703b for managing the size of the document; and document exposing side information 703c for managing the side of the document to be exposed.

As previously mentioned, the document ID information 703a is the identification information provided to identify and manage the information set in the document management table 700 as the information created for each original image. Also, the document size information detected by document size detecting means provided to a document feeding section in the ADF 206 are set as the document size information 703b.

The information exhibiting whether "MAIN" or "BACK" is set in the document exposing side information 703c to indicate whether an image on the main side or back side of the document should be exposed. For example, the document feeding mode of the ADF 206 is switched by selecting whether the document is duplex or simplex by the document reading mode setting key (duplex copy mode key 235) on the manipulation panel 303. The document exposing side information 703c is set depending on whether the main side or back side of the fed document should be read.

The scanner managing bit 704 is composed of a scanner mode bit 704a for managing the scanning mode of the original image, a scanner state bit 704b for managing the state of the scanner section 201, copy lamp state bits 704c and 704d for managing the state of the copy lamp, a last scan bit 704e for managing whether the document scanning should be continued at a command from the ICU (image control unit) end, an image transfer request bit 704f for managing the presence/absence of an image transfer request from the ICU end.

More specifically, when "01" is set in the scan mode bit 704a, the scanner unit 210 scans when it is moved forward, when "11" is set, the scanner unit 210 scans when it is moved forward and backward, and when "10" is set, the scanner unit 210 scans when it is moved backward.

Bit information indicating the state of the scanner section 201 is set in the scanner state bit 704b. More specifically, "000" is set when the scanner section 201 is stopping at its home position, "0001" is set when the scanner section 201 is warming up, "010" is set when the scanning section 201 is feeding, "110" is set when the scanner section 201 is returning, and "100" is set when the scanner section 201 has returned to its home position.

The copy lamp state bits 704c and 704d include a bit indicating whether the light source is ON or OFF, and a bit indicating whether the light source is warming up or in the predetermined state. To be more specific, when "0" is set as the firstly mentioned bit, the light source stays OFF, and when "1" is set as the firstly mentioned bit, the light source stays ON. Also, when "0" is set as the secondly mentioned bit, the light source is rising up to the predetermined emitting state, and when "1" is set as the secondly mentioned bit, the light source is in the predetermined emitting state.

The last scan bit 704e is the bit for managing whether the document scanning should be continued or not. More specifically, "1" is set when the scanning should be continued for the following document, and "0" is set when the scanning should be stopped at a command from the ICU end.

The image transfer request bit 704f stores whether any original image transfer request is issued to the scanner unit 210 from the ICU end or not. More specifically, "0" indicates that no transfer request is issued, and "1" indicates that a transfer request is issued.

When "1" is set in the image transfer request bit 704f, the issuance of the image transfer request from the ICU end is confirmed. Thus, the scanner unit 210 is activated to scan the original image, and the image information is transferred to the ICU end.

The scanning conditions and state of the scanner unit 210 in the scanner section 201 can be confirmed by checking the above bits before the scanning, during the scanning, and after the scanning, thereby making it possible to scan the original images successively.

The document managing bit 705 is a bit for managing information related to the documents, such as the feeding method or state of the documents, and it is composed of, from left to right, a lengthy mode 705a, a stamp mode 705b, a document set state 705c, document position information 705d, a last document judgment 70ee, a document exposing method 705f, a document jam detection 705g, and bits 705h–705l managing the feeding action of the document or the like.

The lengthy mode bit 705a is a bit for managing whether an image on the lengthy document should be read in the continuous reading mode by the ADF 206. More specifically, "0" indicates that the continuous feeding mode is not used, and "1" indicates that the documents are fed and read in the continuous reading mode.

The stamp mode bit 705b indicates whether a "READ" mark should be stamped on the document which has been fed by the ADF 206 and read. More specifically, "0" indicates that the mark should not be stamped, and "1" indicates that the mark should be stamped.

The document state bit 705c is used for checking whether the document is placed at the exposing position. More specifically, "0" is set therein when the document has not reached the exposing position, and "1" is set when the document has reached the exposing position.

The document position information bit 705d manages the position and state of the document in the ADF 206. More specifically, "000" indicates the stand-by state for the action; "001" and "010" indicate the pre-feeding completion state; "011" indicates the feeding complete state where the document has been fed normally; "100" indicates the state where the document has been flipped; "101" indicates the feeding complete state in an SPF section of the ADF 206; and "110" indicates the releasing complete state where the document has been released from the ADF 206 without causing any trouble.

The last document judging bit 705e manages whether the document in question is the last document or not. More specifically, "0" indicates that the document in question is not the last document and "1" indicates that the document in question is the last document.

The document exposing method bit 705f manages the reading mode of the ADF 206 and scanner unit 210, and either "0" or "1" is set therein. Here, "0" indicates a mode for reading an image by the sub-scanning of the scanner unit 210 while the document is suspended, and "1" indicates a mode for reading an image by feeding the documents while the scanner unit 210 is stopped.

The document jam detecting bit 705g manages whether the document feeding jam occurs or not in the ADF 206. Either "0" indicating a normal state or "1" indicating the occurrence of the jam is set therein.

The document feeding action bits 705h–705l manage action enable signals for each part of the ADF 206 to activate the same in a predetermined procedure, so that the documents are fed, transported, and released. More specifically, "0" is set when prohibiting the action by a pre-feeding section, a feeding section, a flipping section, an SPF feeding section, and a document releasing section, and "1" is set when allowing the action by these sections.

Each step of the feeding action of the ADF 206 is managed and the procedure up to the reading of an original image is completed based on the information managed by these document managing bits.

Thus far, each management section forming the document management table 700 have been explained.

Figure 39:
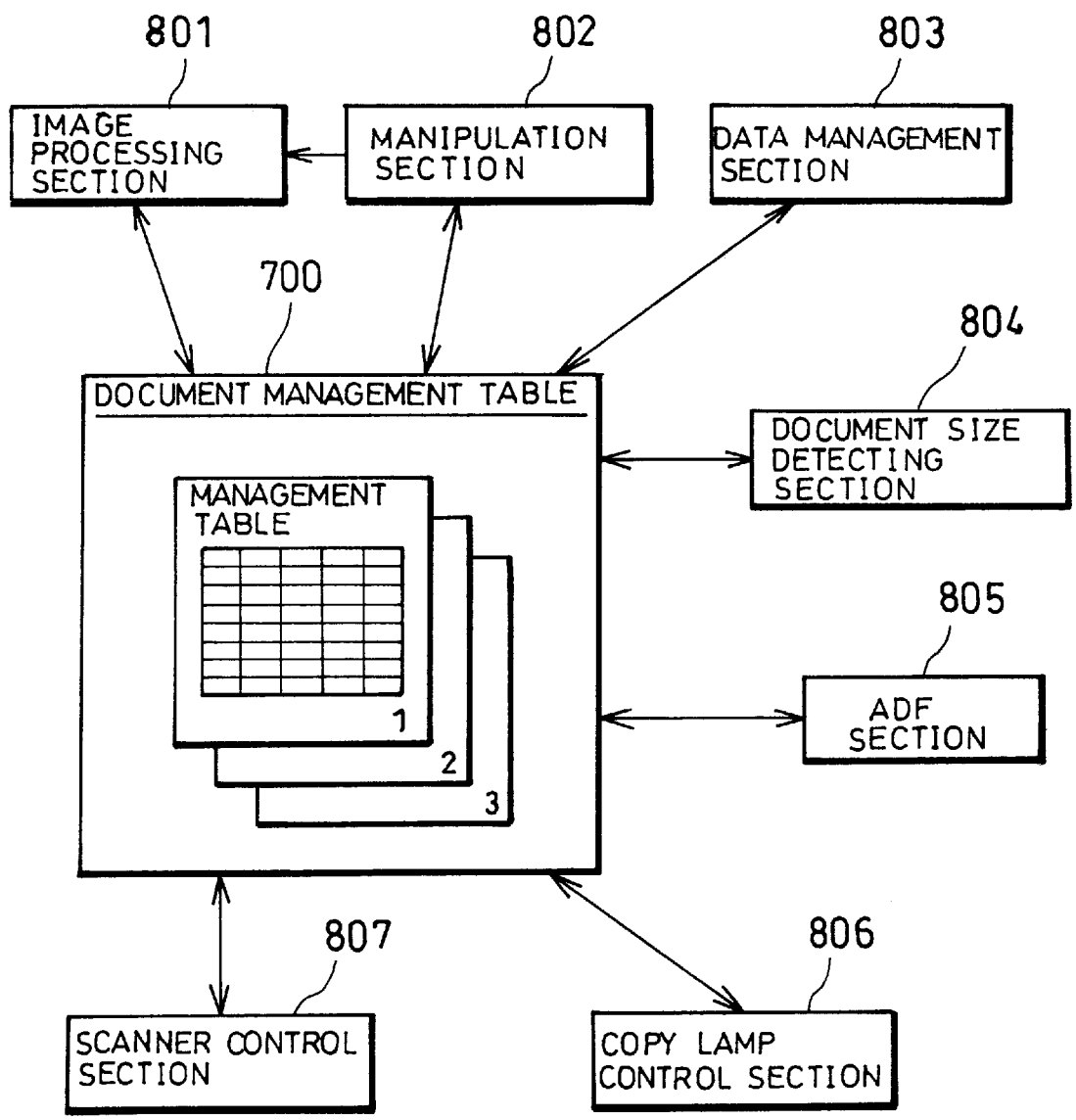
FIG. 39 is a view explaining the state where an original image inputting section is operating based on the information managed by the document management table.

As has been explained above, the document management table 700 in the present embodiment manages the information per image, and it is managed by both the CPU which manages the scanner section 201 and the RAM which is managed by the CPU, and hence, it corresponds to a data management section 803 of FIG. 39.

FIG. 38(a) shows the state of the document management table 700 which manages a plurality of original images. Here, a predetermined number of management tables are secured therein so that information related to original images of up to a predetermined number can be managed.

Herein, 50 rows are secured in the management table 700, because the maximum capacity of the ADF 206 is 50 pages of the documents. However, in case that both sides of the documents are read or a more than 50-page documents are read, the capacity can be increased as occasion demands.

The document management table can be enlarged automatically when the number of available management tables becomes small while the images on the documents are successively read, or a large number of management tables may be provided from the start.

When the document detection sensor or the like detects that the document is set at the predetermined position in the ADF 206, as shown in FIG. 38(a), "1" indicating the validity of the management table is set in the management table mark 701 based on the judgement of the existence of at least one document.

As shown in FIG. 38(b), in the document management section 703, "0001" indicating the first original image is set, and the size information 703b, for example "A4", detected by the document size detecting sensor provided above the document tray in the ADF 206 is set as the document size. Also, "0" (MAIN) is set therein to indicate that the main side (first side) of the document is the document exposing side Then, as the copy mode for the original image is set on the manipulation panel 303, as shown in FIG. 38(c), the data, such as the copy magnification 702d, scanning start position 702b, and scanning ending position 702c, are set in the scanner management section 702 based on the copy mode set on the manipulation panel 303.

Further, the information necessary for controlling the document feeding is set in the document managing bit 705 by the mode processing the document in the ADF mode (either in the duplex document mode or simplex document mode).

When the start key 244 on the manipulation panel 303 is pressed down, "1" indicating the issuance of an image transfer request from the ICU end to the scanner managing bit 704 is set to the bit management section 704f. Subsequently, the document feeding by the ADF 206, and the document reading by the scanner unit 210 for reading an image on the fed document are carried out in accordance with a predetermined sequence.

The document feeding command and feeding state of the ADF 206 are managed by the document managing bit 705. The scanning command and state of the scanning action of the scanner unit 210 for reading an image on the document fed to a predetermined position of the scanner section 201 are managed by the scanner managing bit 704.

The image-carrying side of the document is fed to the reading position of the scanner section 201 by the ADF 206, and read as an original image by the scanning of the scanner unit 210, after which the document is released from the ADF 206.

The information "A4" is managed as the document size fed by the ADF 206 as the detection result when the document is set on the document tray. However, if it turns out that the document size found based on the passing time during the feeding is "A3", the document size information 703b managed by the document management section 703 and the document scanning end position information in the scanner management section 702 are changed at a predetermined timing. For example, the document scanning end position information in the scanner management section 702 is changed to "420 mm".

When the original image is read based on the management data managed in the scanner management section 702, scanner managing bit 704, and document managing bit 705, the original image is stored into the image memory in relation with the document management table 700. When the release of the document from the ADF 206 is confirmed, the management table mark section 701 is updated to "3" from "1" as the original image has been read.

On the other hand, after the first document is fed by the ADF 206, the existence of another document on the document tray is confirmed, the information is set in each table and bit in the same manner as the first original image. For example, "1" is set into the next management table mark section 701 and "0002" is set in the document ID information, whereby the management table for the information of the second original image is created.

When the first document has been read, the second document is fed by the ADF 206 in such a manner to be replaced with the first document on the document table 205.

The documents can be read successively by being replaced one with another while manually opening/closing the ADF 206 which serves as the document cover.

In this case, the management data are set in the management table mark section 701, scanner management section 702, document management section 703, scanner managing bit 704 in the manner described above.

In the document managing bit 705, all the managing bit data are set to "0", so that the ADF 206 is deactivated and used as the document cover which can be opened/closed with respect to the document table 205.

FIG. 39 shows the correlation among the document feeding over the scanner section 201, the document management table 700 for managing the reading action of each image, and modules 801–807 for the procedure from the document feeding action to the document reading action based on the information of each image managed by the document management table 700.

As has been explained, the document management table 700 is managed by the data management section 803. The document management table 700 is created based on the copy mode specified from the manipulation section 802 (manipulation panel 303), the document size detected by the document size detecting section 804, etc. Once the image processing section 801 outputs the image request signal to the document management table 700 end when a predetermined preparation for outputting the read image is confirmed through the manipulation of the start key 244 provided on the manipulation section 802, each unit necessary for reading the original image, such as the scanner control section 807, copy lamp control section 806, and ADF section 805, carries out the document feeding action by means of the ADF 206 and the original image reading action by means of the scanner unit 210 based on the data managed by the document management table 700.

While the original image is being read, the state of the ADF 206, the state of the scanner unit 210, the state of the document are managed on the document management table 700 as the document data. Moreover, the pointers provided in the document management table 700 shift based on the management data.

Thus, in case that there occurs a document feeding error in the ADF 206, when the original image reading action is resumed after clearing the feeding error state, the recovery from the trouble can be carried out based on the pointer information managed on the management table.

The components in FIGS. 39 and 35 correspond as follows: the image processing section 801 corresponds to the main image processing board 330 and sub-image processing board 340, the operation section 802 corresponds to the operation panel board 300 and manipulation panel 303, the data management section 803 corresponds to the memory 302, 312, 333, and 342a, the ADF section 805 corresponds to the ADF 206, the copy lamp control section 806 and scanner control section 807 correspond to the machine control board 310, etc. However, the correspondence may be modified in any other way.

Next, the management state of an original image read in each document reading mode and the associating change of the pointer information will be explained.

(Reading Four Simplex Documents)

Figure 40:
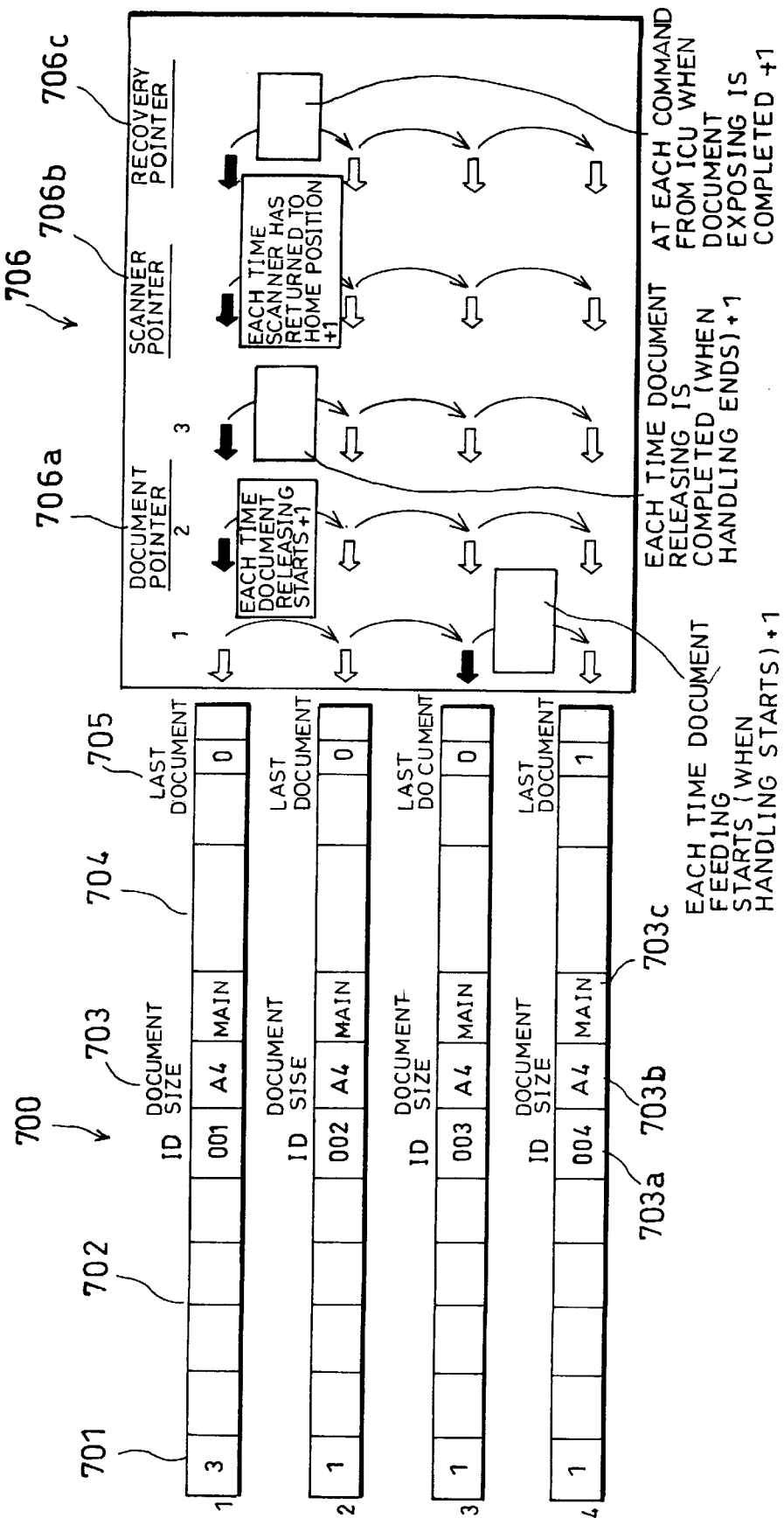
FIG. 40 is a view explaining management tables and the shift of pointers when reading four simplex documents.

FIG. 40 shows the contents of the document management table 700 and the change of the pointer information 706 in a case where four simplex documents (A4 size) are successively fed by the ADF 206 to be read, and the original images thus read are stored into the image memory.

Since the subject documents are simplex documents having images on one side alone, four management tables are created for each original image in the document management table 700, and each kind of data are managed by these management tables.

When the four documents are set on the document tray of the ADF 206, the followings are set as information related to the document of the first management table: "1" is set in the management table mark section 701; "0001" is se t in the document ID information 703a of the document management section 703; "A4" is set in the document size information 703b of the document management section 703; and "MAIN" is set in the document exposing side information 703c of the document management section 703.

As the first document on the document tray of the ADF 206 is fed toward the document table 205, the existence of another document is confirmed on the document tray. Thus, "0" indicating that the first document is not the last document is set in the last document judging bit 705e of the document managing bit 705 in the first management table. In the second management table, "1" is set in the management table mark section 701; "0002" is set in the document ID information 703a of the document management section 703; "A4" is set in the document size information 703b of the document management section 703; "MAIN" is set in the document exposing side information 703c of the document management section 703.

As the second document is pre-fed toward the document table 205, the existence of the third document is confirmed. Thus, "0" indicating that the second document is not the last document is set in the last document judging bit 705e of the document managing bit 705 in the second management table. In the third management table, "1" is set in the management table mark section 701; "0003" is set in the document ID information 703a of the document management section 703; "A4" is set in the document size information 703b of the document management section 703; "MAIN" is set in the document exposing side information 703c of the document management section 703.

The ADF 206 of the present embodiment checks the existence of three documents in the transportation path while the documents are fed from the setting position on the document tray to the document table 205 where the document is exposed. In other words, the document being exposed, the document being pre-fed, and the document on the document tray are checked. Thus, the ADF 206 feeds the documents to be read while creating the management tables of three images ahead.

In the ADF 206, the number of the documents suspended in the document feeding path varies, and so does the number of the management tables to be created.

As the third document is pre-fed and the existence of the fourth document is confirmed, the information related to the fourth original image are set in the fourth management table. When the fourth document is pre-fed, the existence of the fifth document is not confirmed on the document tray. Thus, "1" is set in the last document judging bit in the document managing bit 705 to indicate that the fourth management table is the management table for the last document, which is illustrated in FIG. 40.

Next, the shift of the pointer 706 will be explained.

The pointer 706 mainly includes: the document pointer 706a for managing the document feeding; the scanner pointer 706b for managing the document being read by the scanner unit 210; and the recovery pointer 706c for managing the completion of the reading by the scanner unit 210. The document pointer 706a is composed of: a first pointer for managing the pre-feeding of the document from the document tray; a second pointer for managing the start of the release of the document on the document table 205; and a third pointer for managing the completion of the document release from the ADF 206. It should be appreciated that the number of the pointers in the pointer 706 can be changed in accordance with the control method.

In th e first place, each pointer is positioned to correspond to the first management table, and shifts as the ADF 206 starts the document feeding and the scanner unit 210 starts the reading of the original images.

The first pointer of the document pointer 706a for managing the document feeding shifts to the position corresponding to the second management table when the first document is fed from the document tray.

By the time the first document reaches the document table 205 through the pre-feeding position, the second document reaches the pre-feeding position, and the third and fourth documents are placed on the document tray of the ADF 206.

Thus, the first pointer of the document pointer 706a specifies the original image of the third management table to specify the document to be pre-fed next, which is illustrated in FIG. 40 where each black arrow indicates the position the corresponding pointer is currently specifying.

Then, when the first document is read by the scanner unit 210 on the document table 205, the first document is transported to be released from the document table 205, and subsequently the second document is led onto the document table 205 and the third document is led to the pre-feeding position.

As the documents are fed by the ADF 206 in the above manner, the first pointer of the document pointer 706a shifts to the fourth management table; the second pointer of the same shifts to the second management table as soon as the release of the first document starts; and the third pointer of the same shifts to the second management table when the release of the first document from the ADF 206 is confirmed.

Also, the scanner pointer 706b shifts to the second management table when the return to the home position of the scanner unit 210 is confirmed, and the recovery pointer 706c shifts to the second management table when the read original image is confirmed as true original image information by the image processing section 801.

If a feeding error is detected in the ADF 206 under these conditions, the number of the documents to be returned to the ADF 206 can be found from the position of the document pointer 706a and the position of the recovery pointer 706c.

In addition, since the positions where the documents are suspended in the ADF 206 can be confirmed from the data, such as the document position information 705d of the document managing bit 705, the number of the documents to be returned, and the suspended position of the documents can be displayed on the LCD display section 304 of the manipulation panel 303.

(Reading Two Duplex Documents)

Figure 41:
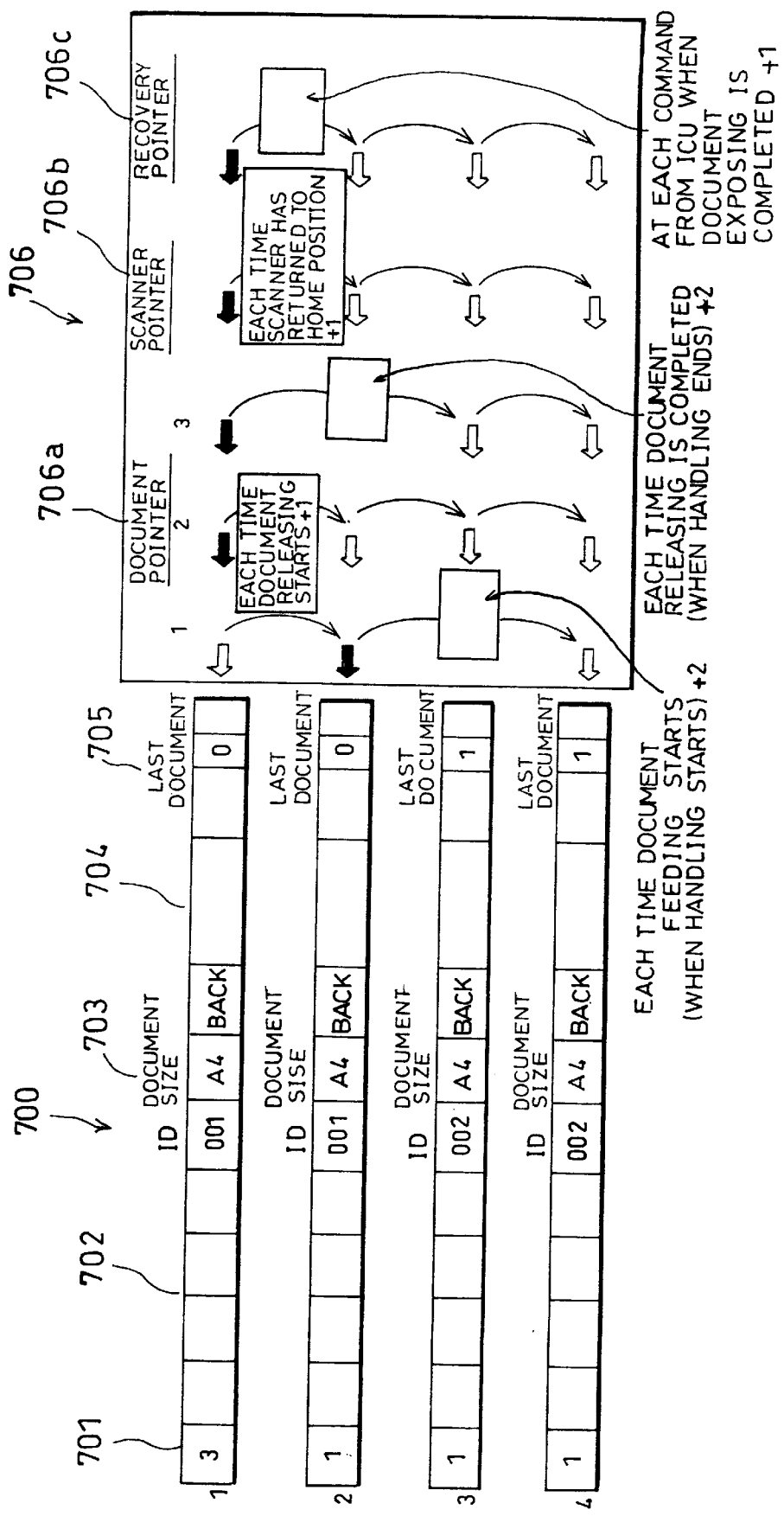
FIG. 41 is a view explaining the management tables and the shift of the pointers when reading two duplex documents.

FIG. 41 shows the document management table 700 when two duplex documents (A4 size) are successively fed by the ADF 206 to be read, and the original images thus read are stored in the image memory.

Since the subject documents are duplex documents having images on both sides, four management tables are created for each original image in the document management table 700, and the data related to the documents are managed by these management tables.

When the two documents are set on the document tray of the ADF 206, the followings are set as information related to the document corresponding to the first management table: "1" is set in the management table mark section 701; "0001" is set in the document ID information 703a of the document management section 703; "A4" is set in the document size information 703b of the document management section 703; and "BACK" is set in the document exposing side information 703c of the document management section 703. Then, in the second management table, "1" is set in the management table mark section 701; "0001" is set in the document ID information 703a of the document management section 703; "A4" is set in the document size information 703b of the document management section 703; "MAIN" is set in the document exposing side information 703c of the document management section 703.

The first document is fed toward the document table 205 from the document tray through the flipping section of the ADF 206, so that the back side of the first document is read first. Here, since the existence of another document is confirmed on the document tray, "0" indicating that the first document is not the last document is set in the last document judging bit 705e of the document managing bit 705 in each of the first and second management tables. In the third management table, "1" is set in the management table mark section 701; "0002" is set in the document ID information 703a of the document management section 703; "A4" is set in the document size information 703b of the document management section 703; "BACK" is set in the document exposing side information 703c of the document management section 703. Then, in the fourth management table, "1" is set in the management table mark section 701; "0002" is set in the document ID information 703a of the document management section 703; "A4" is set in the document size information 703b of the document management section 703; "MAIN" is set in the document exposing side information 703c of the document management section 703.

When the image on the back side of the first document has been read, the first document on the document table 205 is flipped by the flipping section, and set onto the document table 205 again. The first document is released from the ADF 206 after the image on the main side has been read.

Likewise, the second document is fed in such a manner that the image on the back side is read first and thence the image on the main side is read.

When the second document is pre-fed toward the document table 205, the existence of another document is not confirmed on the document tray. Thus, "1" is set in the last document judging bit 705e of the document managing bit 705 in each of the third and fourth management tables to indicate these management tables are for the images on the main and back sides of the last document, which is illustrated in FIG. 41.

Next, the shifting of the pointers will be explained.

Initially, each pointer is set at the position indicated by black arrows, and shifts its position as the ADF 206 starts the document feeding action and the scanner unit 210 starts the original image reading action.

The first pointer of the document pointer 706a for managing the document feeding shifts to the fourth management table when the first document is fed from the document tray.

While the first document is further transported to the document table 205 through the pre-feeding position in such a manner that the back side of the same is read first by the flipping section, the second document is sent to the pre-feeding position.

Then, when an original image on the back side of the first document is read by the scanner unit 210 on the document table 205, the first document is flipped by the flipping section again and set back on the document table 205 so that the main side is read while the second document is suspended at the pre-feeding section.

In this manner, the first document is released from the document table 205 by the ADF 206 after both sides are read. Subsequently, the second document is led toward the document table 205 in the same manner as the first document.

As the documents are fed by the ADF 206 in the above manner, the second pointer of the document pointer 706a shifts to the second, third, and fourth management tables sequentially as soon as the release of the first document onto the document tray starts after both the main and back sides have been read. The third pointer shifts to the third management table when the release of the first document onto the document tray is confirmed after both sides have been read.

The scanner pointer 706b shifts to the second management table when the return to the home position of the scanner unit 210 is confirmed, and the recovery pointer 706c shifts to the second management table when the original image thus read is confirmed as true original image information by the image processing section 801.

If a document feeding error is detected in the ADF 206 under these conditions, the number of the documents to be returned to the ADF 206 can be found from the position of the document pointer 706a and the position of the recovery pointer 706c.

In addition, since the positions where the documents are suspended in the ADF 206 can be confirmed from the data, such as the document position information 705d of the document managing bit 705, the number of the documents to be returned, and the suspended position of the documents can be displayed on the LCD display section 304 of the manipulation panel 303.

FIG. 42 shows an example display indicating the document jam positions and the number of the jammed documents when a document feeding error occurs in the ADF 206.

In the example display, of all the documents managed by the document management table 700, the document causing the document feeding error (jam) and the document(s) existing somewhere in the upper stream of the transportation path are confirmed from the document managing bit information 705 and the pointer information like the document pointer 706a, and displayed on the LCD display section 304 as the jam position information.

Likewise, the message information (information of the number of documents to be returned) displayed on the upper portion of the screen of the LCD display section 304 shown in FIG. 42 is displayed based on the document managing bit information 705 and pointer information like the document pointer 706.

Then, the operator checks the display, and removes the documents in the transportation path of the ADF 206 from the jam position information and the information as to the number of the documents to be returned. Then, the operator returns the removed documents on the document tray of the ADF 206 according to the instructions, and presses the start key 244 on the manipulation panel 303. Accordingly, the digital copying machine 200 resumes the document reading based on the recovery pointer 706c managed as the pointer information.

Further, the digital copying machine 200 of the present invention can be set to the facsimile mode and printer mode in addition to the copy mode as the image processing mode. Thus, if the above document management table 700 is created as the input image management table for each image inputted in each mode, the input image in each mode can be managed in a secure manner. Also, swift and adequate recovery can be carried out not only when normal feeding jam occurs, but also when the image input/output trouble occurs in any of the available modes.

A first image processing apparatus of the present invention is arranged to comprise:

original image reading means for reading an image on a document;

an automatic document feeding device for successively presenting documents to said original image reading means;

a management table created for each document for storing processing information related to a document reading action; and control means for controlling the document reading action based on a content of said management table.

According to the above arrangement, since the document reading action is controlled based on the content of the management table created for each document, the progress of the document reading action for each document can be found.

Accordingly, when the recovery is carried out at the occurrence of document jam in the automatic document feeding device, for example, the management means can find which document(s) should be returned by merely referring to the management table(s).

Consequently, when the documents are jammed, unlike the conventional method demanding complicated computation, the recovery can be carried out readily and precisely by merely referring to the management table created for each document, thereby making it possible to enhance the reliability of the apparatus.

A second image processing apparatus of the present invention is arranged to comprise:

original image reading means for reading an image on a document;

an automatic document feeding device for successively presenting documents to said original image reading means;

a management table created for each document for storing processing information related to a document reading action;

table referring means for referring to said management tables and for specifying specific processing information in said management tables in response to progress of each event carried out by said automatic document feeding device and said image processing apparatus; and control means for controlling operations of said automatic document feeding device and said image processing apparatus based on the processing information in the management tables specified by said table referring means.

According to the above arrangement, the operations of the automatic document feeding device and image processing apparatus are controlled based on the processing information stored in the management table to which the table referring means has shifted. Thus, the operation of the automatic document feeding device, such as the document feeding state, and the operation of the image processing apparatus, such as the document reading state by the scanner, can be readily controlled.

Accordingly, since the current operation states of the automatic document feeding device and image processing apparatus can be found only by referring to the management table to which the table referring means has shifted, the operation of the scanner in the image processing apparatus for each document, the document recovery, the documents in the automatic document feeding device can be readily controlled.

Consequently, when a trouble, such as the document jam, occurs, the information necessary for the recovery, such as the number of the documents to be returned and from which document the job should be resumed, can be obtained readily from the processing information in the management table to which the table referring means has shifted. Thus, the document recovery can be carried out readily and precisely.

In addition, the apparatus can be more easy to manipulate by displaying the information necessary for the recovery, for example, "Please return X'th and following pages of the documents to the document tray", on the display section of the automatic document feeding device or image processing apparatus. Consequently, the document recovery can be carried out more accurately.

The second image processing apparatus may be further arranged in such a manner that said table referring means includes a plurality of pointers for specifying the processing information stored in said management tables.

According to the above arrangement, by referring to a plurality of the pointers, in other words, by referring to the management table currently specified by each pointer, the document feeding state can be readily judged. Consequently, the document reading action can be carried out more precisely.

Also, the second image processing apparatus may be further arranged in such a manner that, as document management pointers, said pointers include:
 a pointer related to start of document feeding;
 a pointer related to a document position; and
 a pointer related to completion of document releasing after the document reading action.

Generally, the document feeding state can be confirmed with the document pre-feeding position information, document reading position information, and the information indicating the completion of the document releasing. Thus, since the above arrangement includes three pointers: the pointer related to the start of the document feeing; the pointer related to the document position with respect to the document reading position; and the pointer related to the completion of the document releasing after the document reading action, the documents can be managed in a secure manner.

Moreover, since only three document pointers are necessary, the documents can be managed easily and programs and the like for controlling the document reading action and document recovery can be simplified. Consequently, the document reading action and document recovery can be carried out accurately, thereby enhancing the reliability of the apparatus.

The above image processing apparatuses may be further arranged in such a manner that said management tables are created in one of a page order of the documents and an order the documents are presented to said original image reading means in accordance with one of a selected image processing mode and a type of said automatic document feeding device.

According to the above arrangement, the management tables are created in time series in response to the image processing mode or the type of the automatic document feeding device. Thus, compared with a case where the management tables are not created in time series, the document management based on the management tables becomes easier. To be more specific, the pointers which shift to the processing information in response to each event can be readily managed.

Consequently, the documents can be managed precisely and the document reading action and recovery can be controlled precisely.

The above image processing apparatuses may be further arranged in such a manner that, as said processing information, said each management table stores:
 document management information for managing the documents individually;
 document exposing information for indicating whether a main side or a back side of the document should be exposed; and
 document feeding information indicating whether idle feeding without reading should be carried out or not.

According to the above arrangement, the documents can be managed by document ID (identification) information by the document management information. Thus, the document (s) to be returned for the resuming job by the recovery can be readily judged from the document ID information. Also, since which side (main or back) of the documents was being exposed at the occurrence of a trouble can be readily judged from the document exposing information, which side of the returned documents should be exposed can be readily found when the job is resumed. Further, whether the idle feeding should be carried out or not can be readily controlled with the document feeding information.

Since the documents can be managed accurately by storing not only the document processing information, but also the document management information, document exposing information, and document feeding information in the management table, the recovery can be carried out precisely and swiftly when a trouble, such as the document jam, occurs.

The above image processing apparatuses may be further arranged in such a manner that, when a document count mode for counting the number of the documents by the idle feeding without reading is executed, said document feeding information indicates that the idle feeding without reading should be carried out.

According to the above arrangement, the information directing the idle feeding is stored in the management table as the document feeding information when the document count mode is effected. Consequently, the document count mode can be readily effected and the number of the documents can be checked easily.

The above image processing apparatuses may be further arranged in such a manner that, as said processing information, said each management table stores one of invalid information indicating that the document reading action is invalid, valid information indicating that the document is valid as existence thereof is confirmed, and unknown information indicating that existence of the document is not confirmed.

According to the above arrangement, since the information indicating whether the document is valid, invalid or unknown is stored in the management table, the existence/absence of the document can be judged precisely.

Consequently, since the existence/absence of the document can be readily judged only by referring to the management table, when the document is judged as valid in case that the image processing apparatus is a copying machine, the copy sheets can be fed in advance, thereby speeding up the copying job.

Moreover, whether the document is necessary or not can be readily judged by storing the invalid information indicating the invalidity of the document in the management table for the document which was transported somewhere in the automatic document feeding device when the document jam occurred. Consequently, the apparatus can be controlled in a manner the operator can understand easily by displaying a message indicating that the document is not necessary.

The above image processing apparatuses may be further arranged in such a manner that as said processing information, said each management table stores document size information indicating a size of the document.

According to the above arrangement, since the document size information indicating the size of the document is stored in the management table, the document size with respect to the document ID information as the document management information can be readily judged.

Consequently, since the automatic sheet selection and automatic magnification selection can be controlled based on the document ID information, the efficiency of the copying job can be increased and the highly reliable control can be carried out.

The above image processing apparatuses may be further arranged in such a manner that, as said processing information, said each management table stores information indicating magnification for image processing.

According to the above arrangement, the magnification when the image is processed with respect to the document ID information as the document management information can be readily judged by storing the information indicating the magnification for the image processing in the management table.

Consequently, since the automatic sheet selection and automatic magnification selection can be controlled based on the document ID information, the efficiency of the copying job can be increased and the highly reliable control can be carried out.

The above image processing apparatuses may be further arranged in such a manner that, as said processing information, said each management table includes a bit information storage section for storing bit information indicating whether a document being read is a last document or not.

According to the above arrangement, the bit information storing section for storing the bit information indicating whether the document being read is the last document or not is provided in the management table. Thus, the last document can be judged readily and swiftly by merely referring to the bit information storing section in the management table.

If the last document can be judged swiftly in the above manner, in a cover copy mode in which the last document is copied as a covering sheet, the last document is copied as the covering sheet in a secure manner.

The above image processing apparatuses may be further arranged in such a manner that, in a document reading mode in which each document is placed manually on a document table of said original image reading means to be read, the bit information indicating the last document is stored in said bit information storage section of said management table each time the document reading action starts.

According to the above arrangement, in case of the above document reading mode, such as the platen mode in the copying machine, the number of the document is fixed to one. Thus, the document reading action can be readily controlled by storing the information indicating that the last document in the bit information storage section each time the document is read. In other words, each time one document is read, the document reading action can be terminated adequately by acknowledging that the document in question as the last document. Consequently, the document reading action can be carried out in a secure manner and terminated adequately, thereby increasing the reliability of the apparatus.

The above image processing apparatuses may be further arranged in such a manner that, in a book copy mode in which two documents are read simultaneously, the bit information indicating the last document is stored in said bit information storage section of said management table for a second document each time the document reading action starts.

According to the above arrangement, since the two opened pages are read in one time in the book copy mode, the information indicating the last document is stored in the bit information storage section of the management table for the second page, thereby making it possible to control the document reading action in a secure manner. Moreover, when the sheets are jammed in a copying machine or the like, whether the first or second page should be exposed when the job is resumed by the recovery can be readily judged by referring to the management tables. Consequently, the reliability of the apparatus can be increased.

The above image processing apparatuses may be further arranged in such a manner that said management tables are initialized after the documents have been processed and before another set of documents are processed, so that processing information of said another set of documents are stored in said management tables.

According to the above arrangement, the documents tables are created for a set of the documents. Thus, when a job for a new set of the documents is started, the document reading action can be controlled in a secure manner without being affected by the preceding job.

The above image processing apparatuses may be further arranged in such a manner that said control means includes storage means for storing said management tables, and when the number of the documents exceeds a first page number which is smaller than a maximum number of said management tables stored in said storage means, said control means re-writes content of said management tables created for the documents before said first page number.

According to the above arrangement, when the number of the documents exceeds the first page number which is smaller than the maximum number of the management tables stored in the storage means, the content of the management tables for the documents before the first page number are re-written. Consequently, the storage area of the storage means can be utilized efficiently.

The above image processing apparatuses may be further arranged in such a manner that, when the number of the documents exceeds a second page number which is not larger than a maximum number of said management tables stored in said storage means and larger than said first page number, said control means re-writes the content of said management tables for the documents between said first page number and second page number.

According to the above arrangement, when the number of the documents exceeds the second page number which is smaller than the maximum number of the management tables stored in the storage means and larger than the first page number, the content of the management tables for the documents between the first and second page numbers is re-written. Consequently, the storage area of the storage means can be utilized efficiently.

The above image processing apparatus may be further arranged in such a manner that said first page number is set to an intermediate between a minimum number and the maximum number of said management tables stored in said storage means, and said second page number is set to the maximum number of said management tables stored in said storage means.

According to the above arrangement, when the number of the documents exceeds the first page number, the content of the management tables for the documents before the first page is re-written to the content of the management tables for the documents exceeding the second page number, and when the number of the documents exceeds the second page number, the content of the management tables for the documents between the first and second page numbers is re-written to the content of the management tables which have not been re-written.

In this case, since the first page number is set to an intermediate between the minimum number and the second page number of the management tables stored in the storage means, the number of the management tables re-written in the first step and second step are equal, and the second page number is equal to the maximum number of the management tables stored in the storage means. Consequently, the storage area of the storage means storing the management tables can be utilized efficiently.

When the pointer, which shifts the management tables in order of the document ID information, has shifted to the management table for the document of the second page number, it is returned to the first management table. Therefore, even when the number of the documents exceeds the maximum number of the management tables stored in the storage means, the documents can be managed adequately, thereby making it possible to control the copying job in a secure manner.

The above image processing apparatuses may be further arranged in such a manner that said control means includes pointers which shift from one management table to another to specify corresponding documents in an order the documents are read, and in case that a mode in which the documents are read while being recirculated by means of said automatic document feeding device is executed, said pointers are returned to a first management table when a document being read is judged as a last document.

According to the above arrangement, when a mode for reading the documents by recirculating the same by means of the automatic document feeding device is effected in the DD mode, all the documents are exposed at the back side first, and thence at the main side by returning the pointer to the first management table when the last document is identified.

Consequently, all the documents are exposed at the back side first, and thence at the main side. Thus, since only the information as to the document exposing side has to be updated in the management tables, the same management tables can be used for the same documents.

Thus, it is not necessary to create two management tables for one document to separately indicate whether the back or main side should be exposed. The document can be exposed at both sides precisely and swiftly by merely creating one management table exhibiting the one exposing document side. Consequently, the management tables can be utilized effectively, and the storage section of the storage means storing the management tables can be utilized efficiently as well.

The above image processing apparatuses may be further arranged in such a manner that, when an interruption request is issued to request a reading action of another document while the documents are being read successively, said control means additionally creates said management table for said another document with the interruption request, and when the reading action of said another document with the interruption request is completed, said control means resumes interrupted document reading action of the documents.

According to the above arrangement, in case of the interruption job, the management tables for the job being interrupted are saved temporarily, and the management table for the interruption job is created separately. Thus, the jobs are not affected with each other, in other words, the document reading action for the interruption job can be carried out precisely.

Moreover, when the interrupted job is resumed when the interruption job has ended, the interrupted job can be resumed without being affected by the interruption job.

Consequently, even if the interruption job is carried out, the interrupted job can be controlled readily and precisely.

The above image processing apparatuses may be further arranged in such a manner that said control means includes document feeding pointers indicating a feeding state of the documents, and when the document reading action is resumed, said control means computes the number of the documents to be returned based on said document feeding pointers.

According to the above arrangement, the document position can be readily found by the document feeding pointer indicating the document feeding state. Thus, the number of the documents can be readily computed when either the documents or sheets are jammed.

The above image processing apparatuses may be further arranged in such a manner that said control means includes an exposure complete pointer indicating that exposure of the document is completed, and said control means resumes the document reading action from the document corresponding to the management table specified by said exposure complete pointer.

According to the above arrangement, since the document corresponding to the management table specified by the exposure complete pointer has been already exposed, the documents which have been exposed can be readily judged by the exposure complete pointer. Accordingly, when the document reading job is resumed, the document reading action is resumed from the document whose management table is specified by the exposure complete pointer. Consequently, the job can be carried out in a more reliable manner.

The above image processing apparatuses may be further arranged in such a manner that, when sheets temporarily withheld in an intermediate tray used in a duplex exposing mode are short, said control means computes the number of the documents to be returned based on said exposure complete pointer and said document feeding pointers.

According to the above arrangement, since the exposure completion or releasing completion for the document can be readily judged, when the sheets in the intermediate tray are short in the duplex exposing mode, the recovery position can be readily confirmed and the number of the documents to be returned can be readily computed. Consequently, the operation reliability of the image processing apparatus can be increased.

The above image processing apparatuses may be further arranged in such a manner that, when recovery must be carried out due to occurrence of jam in an exposing mode in which the documents are recirculated, said control means additionally creates a recovery management table and controls a recovery action using said recovery management table.

According to the above arrangement, when the documents are jammed in the exposing mode where the documents are recirculated, the recovery management table is created for the recovery pattern, and the recovery is controlled by the recovery management table. Thus, the management tables for the job suspended by the document jam are not affected, thereby realizing precise jam recovery.

A third image processing apparatus of the present invention is an image processing apparatus comprising:

mode setting means for setting a processing mode for a document;

original image reading means for reading an original image; and document confirming means for confirming the existence and characteristics of the document to be read by the original image reading means, which is arranged to further comprise:

information management table means for managing document information related to the existence and characteristics of the document confirmed by said document confirming means and document reading means and the document processing information related to the processing mode set by said mode setting means;

processing content determining means for, each time a change in the document information is detected by said document confirming means and/or document reading means, updating the document information, and for determining the document processing information to let the information management table means manage the document processing information; and reading action control means for controlling the reading action of the original image by means of the original image reading means based on the document information and document processing information managed.

According to the above arrangement, the information related to the document can be updated to the information most recently confirmed in each step and then managed. Thus, the control on the document reading action and management after the updating can be carried out in a secure manner.

The third image processing apparatus may be arranged in such a manner that the characteristics of the documents in said document information are defined as at least one of document size information and scanning area information for the document to be scanned.

According to the above arrangement, when the size information confirmed when the document is set on the document tray is wrong, the size information is updated to the correct size information upon the confirmation of an error later, and the other information necessary for the reading action, such as the scanning area for the document size information, is updated correctly as well. Consequently, the control and management can be carried out in a secure manner after the updating.

A fourth image processing apparatus of the present invention is an image processing apparatus comprising:

mode setting means for setting a processing mode for a document;

original image reading means for reading an original image; and document confirming means for confirming the existence and characteristics of the document to be read by the original image reading means, which is arranged to further comprise:

information management table means for managing document information related to the existence and characteristics of the document confirmed by said document confirming means and document processing information related to the processing mode set by said mode setting means;

processing content determining means for, when said document confirming means detects a change in the document information, determining the document information and document processing information to let said information management table means manage the same;

reading action control means for controlling the reading action of the original image by said original image reading means based on the management information confirmed by said processing content determining means;

state detecting means for detecting a first state where the reading action by said original image reading means is impossible, and a second state where the first state is cleared and the document reading action is possible; and resumption confirming means for, when said state detecting means detects the first state, suspending the reading action by said original image reading means, and when said state detecting means detects the second state, for resuming the reading action of the document image reading means based on the management information of said management table means.

According to the above arrangement, the resumption condition of the document reading can be confirmed in response to the processing state when a document reading error occurs while updating the information managing the reading processing state of an original image for the management table for each document. Thus, when a feeding error occurs in the automatic document feeding device when a large volume of the original images are inputted (read), the position and the number of the documents in the automatic document feeding device can be found in a precise manner from the position information and pointer information managed on the management tables, and an adequate message can be displayed to the operator.

Further, when the feeding error is eliminated, the document feeding and document reading actions can be resumed in a normal state, and the images are obtained in a correct order even when a large volume of the documents are processed.

The fourth image processing apparatus may be further arranged in such a manner that, when said state detecting means detects said second state, said control means computes the number of the documents to be returned based on information related to progress of the reading action for an original image on each document managed by said information management table means, and displays a computed value.

According to the above arrangement, the number of the documents which should be returned to resume the reading action is displayed, and at the same time, the reading action is resumed based on the information related to the progress of the document reading action managed by the information management table when the document reading is allowed. Thus, when the feeding error in the automatic document feeding device is cleared, the document feeding and document reading actions can be resumed in a precise state. Consequently, images can be obtained in a precise order even when a large volume of the documents are processed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:

original image reading means for reading an image on a document;

an automatic document feeding device for successively presenting documents to said original image reading means; and management tables, each being created for each document and storing processing information related to a document reading action, wherein at least one of information indicating validity of the image on the document read by said image reading means and information indicating a current position of the document is stored as said processing information.

2. The image processing apparatus of claim 1, wherein said management tables are created in one of a page order of the documents and an order the documents are presented to said original image reading means in accordance with one of a selected image processing mode and a type of said automatic document feeding device.

3. The image processing apparatus of claim 1, wherein, as said processing information, said each management table stores document size information indicating a size of the document.

4. The image processing apparatus of claim 1, wherein, as said processing information, said each management table stores information indicating magnification for image processing.

5. The image processing apparatus of claim 1, wherein said management tables are initialized after the documents have been processed and before another set of documents are processed, so that processing information of said another set of documents are stored in said management tables.

6. An image processing apparatus comprising:

original image reading means for reading an image on a document;

an automatic document feeding device for successively presenting documents to said original image reading means; and management tables, each being created for each document and storing processing information related to a document reading action, wherein, as said processing information, said each management table stores:

document management information for managing the documents individually;

document exposing information for indicating whether a main side or a back side of the document should be exposed; and document feeding information indicating whether idle feeding without reading should be carried out or not.

7. The image processing apparatus of claim 6, wherein, when a document count mode for counting the number of the documents by the idle feeding without reading is executed, said document feeding information indicates that the idle feeding without reading should be carried out.

8. An image processing apparatus comprising:

original image reading means for reading an image on a document;

an automatic document feeding device for successively presenting documents to said original image reading means; and management tables, each being created for each document and storing processing information related to a document reading action, wherein, as said processing information, said each management table stores one of invalid information indicating that the document reading action is invalid, valid information indicating that the document is valid as existence thereof is confirmed, and unknown information indicating that existence of the document is not confirmed.

9. An image processing apparatus comprising:

original image reading means for reading an image on a document;

an automatic document feeding device for successively presenting documents to said original image reading means; and management tables, each being created for each document and storing processing information related to a document reading action, wherein, as said processing information, said each management table includes a bit information storage section for storing bit information indicating whether a document being read is a last document or not.

10. The image processing apparatus of claim 9, wherein, in a document reading mode in which each document is placed manually on a document table of said original image reading means to be read, the bit information indicating the last document is stored in said bit information storage section of said management table each time the document reading action starts.

11. The image processing apparatus of claim 9, wherein, in a book copy mode in which two documents are read simultaneously, the bit information indicating the last document is stored in said bit information storage section of said management table for a second document each time the document reading action starts.

12. An image processing apparatus comprising:

original image reading means for reading an image on a document;

an automatic document feeding device for successively presenting documents to said original image reading means;

management tables, each being created for each document and storing processing information related to a document reading action; and control means for controlling the document reading action based on a content of said management tables, wherein at least one of information indicating validity of the image read on the document by said image reading means and information indicating a current position of the document is stored as said processing information.

13. The image processing apparatus of claim 12, wherein said management tables are created in one of a page order of the documents and an order the documents are presented to said original image reading means in accordance with one of a selected image processing mode and a type of said automatic document feeding device.

14. The image processing apparatus of claim 12, wherein, as said processing information, said each management table stores document size information indicating a size of the document.

15. The image processing apparatus of claim 12, wherein, as said processing information, said each management table stores information indicating magnification for image processing.

16. The image processing apparatus of claim 12, wherein said management tables are initialized after the documents have been processed and before another set of documents are processed, so that processing information of said another set of documents are stored in said management tables.

17. An image processing apparatus comprising:
original image reading means for reading an image on a document;
an automatic document feeding device for successively presenting documents to said original image reading means;
management tables, each being created for each document and storing processing information related to a document reading action; and
control means for controlling the document reading action based on a content of said management tables,
wherein, as said processing information, said each management table stores:
document management information for managing the documents individually; document exposing information for indicating whether a main side or a back side of the document should be exposed; and
document feeding information indicating whether idle feeding without reading should be carried out or not.

18. The image processing apparatus of claim 17, wherein, when a document count mode for counting the number of the documents by the idle feeding without reading is executed, said document feeding information indicates that the idle feeding without reading should be carried out.

19. An image processing apparatus comprising:
original image reading means for reading an image on a document;
an automatic document feeding device for successively presenting documents to said original image reading means;
management tables, each being created for each document and storing processing information related to a document reading action; and
control means for controlling the document reading action based on a content of said management tables,
wherein, as said processing information, said each management table stores one of invalid information indicating that the document reading action is invalid, valid information indicating that the document is valid as existence thereof is confirmed, and unknown information indicating that existence of the document is not confirmed.

20. An image processing apparatus comprising:
original image reading means for reading an image on a document;
an automatic document feeding device for successively presenting documents to said original image reading means;
management tables, each being created for each document and storing processing information related to a document reading action; and
control means for controlling the document reading action based on a content of said management tables,
wherein, as said processing information, said each management table includes a bit information storage section for storing bit information indicating whether a document being read is a last document or not.

21. The image processing apparatus of claim 20, wherein, in a document reading mode in which each document is placed manually on a document table of said original image reading means to be read, the bit information indicating the last document is stored in said bit information storage section of said management table each time the document reading action starts.

22. The image processing apparatus of claim 20, wherein, in a book copy mode in which two documents are read simultaneously, the bit information indicating the last document is stored in said bit information storage section of said management table for a second document each time the document reading action starts.

23. An image processing apparatus comprising:
original image reading means for reading an image on a document;
an automatic document feeding device for successively presenting documents to said original image reading means;
management tables, each being created for each document and storing processing information related to a document reading action; and
control means for controlling the document reading action based on a content of said management tables,
wherein said control means includes storage means for storing said management tables, and when the number of the documents exceeds a first page number which is smaller than a maximum number of said management tables stored in said storage means, said control means rewrites content of said management tables created for the documents before said first page number.

24. The image processing apparatus of claim 23, wherein, when the number of the documents exceeds a second page number which is not larger than a maximum number of said management tables stored in said storage means and larger than said first page number, said control means re-writes the content of said management tables for the documents between said first page number and second page number.

25. The image processing apparatus of claim 24, wherein said first page number is set to an intermediate between a minimum number and the maximum number of said management tables stored in said storage means, and said second page number is set to the maximum number of said management tables stored in said storage means.

26. An image processing apparatus comprising:
original image reading means for reading an image on a document;
an automatic document feeding device for successively presenting documents to said original image reading means;
management tables, each being created for each document and storing processing information related to a document reading action; and
control means for controlling the document reading action based on a content of said management tables,
wherein said control means includes pointers which shift from one management table to another to specify corresponding documents in an order the documents are read, and in case that a mode in which the documents are read while being recirculated by means of said automatic document feeding device is executed, said pointers are returned to a first management table when a document being read is judged as a last document.

27. An image processing apparatus comprising:

original image reading means for reading an image on a document;

an automatic document feeding device for successively presenting documents to said original image reading means;

management tables, each being created for each document and storing processing information related to a document reading action; and control means for controlling the document reading action based on a content of said management tables, wherein, when an interruption request is issued to request a reading action of another document while the documents are being read successively, said control means additionally creates said management table for said another document with the interruption request, and when the reading of said another document with the interruption request is completed, said control means resumes interrupted document reading action of the documents.

28. An image processing apparatus comprising:

original image reading means for reading an image on a document;

an automatic document feeding device for successively presenting documents to said original image reading means;

management tables, each being created for each document and storing processing information related to a document reading action; and control means for controlling the document reading action based on a content of said management tables, wherein said control means includes document feeding pointers indicating a feeding state of the documents, and when the document reading action is resumed, said control means computes the number of the documents to be returned based on said document feeding pointers.

29. The image processing apparatus of claim 28, wherein said control means includes an exposure complete pointer indicating that exposure of the document is completed, and said control means resumes the document reading action from the document corresponding to the management table specified by said exposure complete pointer.

30. The image processing apparatus of claim 29, wherein, when sheets temporarily withheld in an intermediate tray used in a duplex exposing mode are short, said control means computes the number of the documents to be returned based on said exposure complete pointer and said document feeding pointers.

31. An image processing apparatus comprising:

original image reading means for reading an image on a document;

an automatic document feeding device for successively presenting documents to said original image reading means;

management tables, each being created for each document and storing processing information related to a document reading action; and control means for controlling the document reading action based on a content of said management tables, wherein, when recovery must be carried out due to occurrence of jam in an exposing mode in which the documents are recirculated, said control means additionally creates a recovery management table and controls a recovery action using said recovery management table.

32. An image processing apparatus comprising:

original image reading means for reading an image on a document;

an automatic document feeding device for successively presenting documents to said original image reading means;

management tables, each being created for each document and storing processing information related to a document reading action;

table referring means for referring to said management tables and for specifying specific processing information in said management tables in response to progress of each event carried out by said automatic document feeding device and said image processing apparatus; and control means for controlling operations of said automatic document feeding device and said image processing apparatus based on the processing information in the management tables specified by said table referring means.

33. The image processing apparatus of claim 32, wherein said table referring means includes a plurality of pointers for specifying the processing information stored in said management tables.

34. The image processing apparatus of claim 33, wherein, as document management pointers, said pointers include:

a pointer related to start of document feeding;

a pointer related to a document position; and a pointer related to completion of document releasing after the document reading action.

35. The image processing apparatus of claim 32, wherein said management tables are created in one of a page order of the documents and an order the documents are presented to said original image reading means in accordance with one of a selected image processing mode and a type of said automatic document feeding device.

36. The image processing apparatus of claim 32, wherein, as said processing information, said each management table stores:

document management information for managing the documents individually;

document exposing information for indicating whether a main side or a back side of the document should be exposed; and document feeding information indicating whether idle feeding without reading should be carried out or not.

37. The image processing apparatus of claim 36, wherein, when a document count mode for counting the number of the documents by the idle feeding without reading is executed, said document feeding information indicates that the idle feeding without reading should be carried out.

38. The image processing apparatus of claim 32, wherein, as said processing information, said each management table stores one of invalid information indicating that the document reading action is invalid, valid information indicating that the document is valid as existence thereof is confirmed, and unknown information indicating that existence of the document is not confirmed.

39. The image processing apparatus of claim 32, wherein, as said processing information, said each management table stores document size information indicating a size of the document.

40. The image processing apparatus of claim 32, wherein, as said processing information, said each management table stores information indicating magnification for image processing.

41. The image processing apparatus of claim 32, wherein, as said processing information, said each management table includes a bit information storage section for storing bit information indicating whether a document being read is a last document or not.

42. The image processing apparatus of claim 41, wherein, in a document reading mode in which each document is placed manually on a document table of said original image reading means to be read, the bit information indicating the last document is stored in said bit information storage section of said management table each time the document reading action starts.

43. The image processing apparatus of claim 41, wherein, in a book copy mode in which two documents are read simultaneously, the bit information indicating the last document is stored in said bit information storage section of said management table for a second document each time the document reading action starts.

44. The image processing apparatus of claim 32, wherein said management tables are initialized after the documents have been processed and before another set of documents are processed, so that processing information of said another set of documents are stored in said management tables.

45. The image processing apparatus of claim 32, wherein said control means includes storage means for storing said management tables, and when the number of the documents exceeds a first page number which is smaller than a maximum number of said management tables stored in said storage means, said control means re-writes content of said management tables created for the documents before said first page number.

46. The image processing apparatus of claim 45, wherein, when the number of the documents exceeds a second page number which is not larger than a maximum number of said management tables stored in said storage means and larger than said first page number, said control means re-writes the content of said management tables for the documents between said first page number and second page number.

47. The image processing apparatus of claim 46, wherein said first page number is set to an intermediate between a minimum number and the maximum number of said management tables stored in said storage means, and said second page number is set to the maximum number of said management tables stored in said storage means.

48. The image processing apparatus of claim 32, wherein said control means includes pointers which shift from one management table to another to specify corresponding documents in an order the documents are read, and in case that a mode in which the documents are read while being recirculated by means of said automatic document feeding device is executed, said pointers are returned to a first management table when a document being read is judged as a last document.

49. The image processing apparatus of claim 32, wherein, when an interruption request is issued to request a reading action of another document while the documents are being read successively, said control means additionally creates said management table for said another document with the interruption request, and when the reading of said another document with the interruption request is completed, said control means resumes interrupted document reading action of the documents.

50. The image processing apparatus of claim 32, wherein said control means includes document feeding pointers indicating a feeding state of the documents, and when the document reading action is resumed, said control means computes the number of the documents to be returned based on said document feeding pointers.

51. The image processing apparatus of claim 50, wherein said control means includes an exposure complete pointer indicating that exposure of the document is completed, and said control means resumes the document reading action from the document corresponding to the management table specified by said exposure complete pointer.

52. The image processing apparatus of claim 51, wherein, when sheets temporarily withheld in an intermediate tray used in a duplex exposing mode are short, said control means computes the number of the documents to be returned based on said exposure complete pointer and said document feeding pointers.

53. The image processing apparatus of claim 32, wherein, when recovery must be carried out due to occurrence of jam in an exposing mode in which the documents are recirculated, said control means additionally creates a recovery management table and controls a recovery action using said recovery management table.

54. An image processing apparatus comprising:

mode setting means for setting a processing mode for a document;

original image reading means for reading an image on the document;

management table creating means for creating an management table based on document information related to existence and characteristics of the document obtained from said original image reading means and document processing information related to the processing mode set by said mode setting means, said management table creating means also updating said document information in said management table when said document information changes and determining said document processing information; and reading action control means for controlling an action of said original image reading means based on said management table, wherein the characteristics of the document are composed of information related to a largest scanning area allowed when the document is scanned.

55. An image processing apparatus comprising:

mode setting means for setting a processing mode for a document;

original image reading means for reading an image on the document;

state detecting means for detecting a first state in which a reading action by said original image reading means is impossible, and a second state in which said first state is cleared;

management table creating means for creating an information management table based on document information related to existence and characteristics of the document obtained from said original image reading means and document processing information related to the processing mode set by said mode setting means, said management table creating means also updating said document management table when said document information changes and determining said document management information, said management table creating means further suspending the reading action of said original image reading means when said state detecting means detects said first state and resuming the reading action of said original image reading means when said state detecting means detects said second state; and reading action control means for controlling an action of said original image reading means based on said information management table.

56. The image processing apparatus of claim 55 further comprising display means, wherein, when said state detecting means detects said first state, said control means computes the number of the documents to be returned based on information related to progress of the reading action for each document and managed by said management table, and displays a computed value on said display means.

* * * * *